United States Patent
Hirokane et al.

(10) Patent No.: US 7,948,852 B2
(45) Date of Patent: May 24, 2011

(54) OPTICAL STORAGE MEDIUM, OPTICAL READ/WRITE APPARATUS, AND OPTICAL READ/WRITE METHOD

(75) Inventors: Junji Hirokane, Nara (JP); Noboru Iwata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/798,342

(22) Filed: Mar. 31, 2010

(65) Prior Publication Data
US 2010/0262983 A1    Oct. 14, 2010

Related U.S. Application Data

(62) Division of application No. 11/702,820, filed on Feb. 6, 2007, now Pat. No. 7,787,345, which is a division of application No. 10/142,488, filed on May 10, 2002, now Pat. No. 7,180,849.

(30) Foreign Application Priority Data

May 18, 2001  (JP) .................... 2001-150173
May 18, 2001  (JP) .................... 2001-150177
Jun. 13, 2001  (JP) .................... 2001-179330

(51) Int. Cl.
*G11B 7/00* (2006.01)
(52) U.S. Cl. ............. 369/94; 369/272.1; 369/283
(58) Field of Classification Search .......... None
See application file for complete search history.

(56) References Cited

U.S. PATENT DOCUMENTS

| | | | |
|---|---|---|---|
| 4,827,462 A | 5/1989 | Flannagan et al. | |
| 5,414,451 A | 5/1995 | Sugiyama et al. | |
| 5,418,768 A | 5/1995 | Senshu | |
| 5,428,597 A | 6/1995 | Satoh et al. | |
| 5,708,653 A | 1/1998 | Okada et al. | |
| 5,914,926 A * | 6/1999 | Maeno et al. | 369/53.35 |
| 6,005,839 A | 12/1999 | Sako et al. | |
| 6,268,812 B1 | 7/2001 | Yoshimura | |
| 6,272,086 B1 | 8/2001 | Jaquette et al. | |

(Continued)

FOREIGN PATENT DOCUMENTS

EP        0284037 A2    9/1988

(Continued)

OTHER PUBLICATIONS

K. Kurokawa et al.; "*A 16.8 GB Double-Decker Phase Change Disc*"; SPIE; vol. 3864; Jul. 1999; pp. 197-199.

*Primary Examiner* — Lixi Chow

(74) *Attorney, Agent, or Firm* — Edwards Angell Palmer & Dodge LLP; David G. Conlin; David A. Tucker

(57) ABSTRACT

An optical read/write apparatus causes a read/write light beam from illuminating means to strike only one side of an optical storage medium including stacked data storage layers each of which is readable/writeable separately from the other layers. In this case, the optical read/write apparatus operates so that data is read/written from/into a second data storage layer after fully recording a recordable area of a first data storage layer. Thus, light can be shone with uniform intensity across the substantially entire recordable area of the second data storage layer without using a complex read/write system even under such conditions that the transmittance to light of the first data storage layer in the recordable area may vary depending on whether any data is recorded in the recordable area.

3 Claims, 45 Drawing Sheets

U.S. PATENT DOCUMENTS

| | | |
|---|---|---|
| 6,330,215 B1 | 12/2001 | Lim |
| 6,370,091 B1 * | 4/2002 | Kuroda .................. 369/30.08 |
| 6,370,102 B1 | 4/2002 | Mons et al. |
| 6,421,315 B1 | 7/2002 | Satoh et al. |
| 6,621,786 B2 | 9/2003 | Mons et al. |
| 6,646,968 B1 | 11/2003 | Miyaoka et al. |
| 6,720,056 B2 | 4/2004 | Maeda |
| 6,728,174 B1 | 4/2004 | Sako et al. |
| 6,735,158 B1 | 5/2004 | Futakuchi et al. |
| 6,768,712 B2 | 7/2004 | Katsuda |
| 6,850,469 B2 | 2/2005 | Ogawa et al. |
| 6,894,962 B1 | 5/2005 | Nishiuchi et al. |
| 6,904,011 B2 | 6/2005 | Van Woudenberg et al. |
| 7,180,849 B2 * | 2/2007 | Hirokane et al. .......... 369/286 |
| 7,376,058 B2 * | 5/2008 | Narumi et al. ............ 369/47.53 |
| 7,586,824 B2 * | 9/2009 | Hirokane et al. ............. 369/94 |
| 7,609,605 B2 * | 10/2009 | Hirokane et al. .......... 369/59.25 |
| 2001/0026518 A1 | 10/2001 | Shishido |
| 2002/0064124 A1 | 5/2002 | Yamamoto et al. |
| 2002/0080705 A1 | 6/2002 | Van Woudenberg |
| 2002/0159376 A1 | 10/2002 | Ohsawa |
| 2003/0174624 A1 | 9/2003 | Kobayashi |
| 2003/0185121 A1 | 10/2003 | Narumi et al. |
| 2004/0062188 A1 | 4/2004 | Yamamoto et al. |
| 2005/0152242 A1 | 7/2005 | Shishido |
| 2005/0152243 A1 | 7/2005 | Shishido |
| 2005/0157616 A1 | 7/2005 | Shishido |

FOREIGN PATENT DOCUMENTS

| | | |
|---|---|---|
| EP | 1081707 A1 | 3/2001 |
| EP | 1102247 A2 | 5/2001 |
| EP | 1111604 A1 | 6/2001 |
| EP | 1176586 A2 | 1/2002 |
| EP | 1187112 A2 | 3/2002 |
| EP | 1258868 A2 | 11/2002 |
| JP | 03-157816 A | 7/1991 |
| JP | 04-078033 A | 3/1992 |
| JP | 09-231613 | 9/1997 |
| JP | 11-203795 A | 7/1999 |
| JP | 2001-014684 A | 1/2001 |
| JP | 2001-052342 | 2/2001 |
| JP | 2001-127640 A | 5/2001 |
| JP | 2002-92939 | 3/2002 |
| JP | 2002-245628 | 8/2002 |
| JP | 2002-329330 A | 11/2002 |
| JP | 2000-285469 | 10/2003 |
| WO | WO-98/58368 | 12/1998 |
| WO | WO-0023990 A1 | 4/2000 |
| WO | WO 02/23542 A1 | 3/2002 |
| WO | WO 0223542 A1 * | 3/2002 |
| WO | WO 02/075728 A1 | 9/2002 |
| WO | WO 02/757728 A1 | 9/2002 |

* cited by examiner

OPTICAL STORAGE MEDIUM, OPTICAL READ/WRITE APPARATUS, AND OPTICAL READ/WRITE METHOD

This is a divisional patent application of U.S. patent application Ser. No. 11/702,820 filed on Feb. 6, 2007 now U.S. Pat. No. 7,787,345, by Junji Hirokane and Noboru Iwata (the same inventors as of this divisional application), entitled OPTICAL STORAGE MEDIUM, OPTICAL READ/WRITE APPARATUS AND OPTICAL READ/WRITE METHOD, that in turn is a divisional application of U.S. patent application Ser. No. 10/142,488, filed May 10, 2002 (now U.S. Pat. No. 7,180,849 of Feb. 20, 2007) which applications both claim foreign priority from the following Japanese Patent Applications JP-2001-150173 of 18 May 2001; JP-2001-150177 of 18 May 2001 and JP-2001-179330 of 13 Jun. 2001.

FIELD OF THE INVENTION

The present invention relates to optical storage media having a plurality of writeable and/or readable data storage layers, optical read/write apparatus using such media, and optical read/write method using such media.

BACKGROUND OF THE INVENTION

Recent years have seen on-going development of optical read/write apparatus capable of writing a large amount of data, like video data in digital format, and randomly accessing such data. Also, various attempts are being made to increase the storage density of optical disks used as storage media in such optical read/write apparatus.

In optical read/write apparatus, attempts are being made to increase storage density by means of, for example, an increased numerical aperture of an objective lens and the use of short wavelength illumination for a smaller light beam spot. The efforts have been successful and the storage capacity optical disks are getting larger year after year. Technology has already established as to a DVD-ROM (Digital Versatile Discs for Read Only Memory) as an optical disk which now has doubled its capacity owning to double layer structure.

A document entitled "A 16.8 GB Double-Decker Phase Change Disc" distributed in Joint International Symposium on Optical Memory and Optical Data Storage 1999 discloses an optical disk with an added density thanks to the double data storage layers which are writeable and readable.

In the optical disk disclosed in the document, each data storage layer is made of phase change material. Such optical disks are classified into two types: Low-to-high media which has a higher reflectance in recording mark areas than in interval areas interposed between recording mark areas and high-to-low media which conversely has a higher reflectance in interval areas than in recording mark areas. Both types of media enable the readout of data by means of quantities of reflected and transmitted light which vary depending on whether the phase change material is in polycrystal or amorphous phase. Similar optical disks using phase change material are disclosed in, for example, Japanese Laid-open Patent Application 2001-52342 (Tokukai 2001-52342, published on Feb. 23, 2001).

However, for example, on the high-to-low medium having a higher reflectance in interval areas than in recording mark areas, mark rows which include low reflectance amorphous areas are formed along guiding grooves in recorded areas. In the optical disk, data is written or read on a first data storage layer close to the light-striking side and on a second data storage layer far from the light-striking side using light incident to the same side of the disk, the light beam first travels through the first data storage layer before writing or reading data on the second data storage layer. Accordingly, upon writing or reading on the second data storage layer, the intensity of light beam reaching the second data storage layer after passing through the first data storage layer must differ depending on whether or not the first data storage layer already holds any records, so as to produce different writing or reading power sensitivities with respect to the second data storage layer.

Therefore, to write or read data on the second data storage layer, the first data storage layer must be checked first to determine whether there are any records on it, so that the write or read light beam intensity can be specified. This adds complexity to the write/read system. A problems arises here that optical writing/reading system using such an optical disk is hardly practicable.

As mentioned above, Japanese Laid-open Patent Application 2001-52342 discloses an optical disk having a double data storage layer structure in which address information is provided in the form of wobbling groove so as to achieve stable writing and readout.

Referring to FIG. 64, an optical disk 501 provided with conventional double data storage layers has a center hole 502 at the center. Data is written/read in a recordable area 503 in which a spiral guiding groove is provided for data write and readout.

The optical disk 501 has an address area 504 occupying a certain angular part. Address information is stored in the address area 504 as address pit rows extending radially. Throughout this text, this configuration, in which address information is stored collectively in one place, i.e., the address area 504 in the case of the optical disk 501, will be referred to as a lumped address scheme.

FIG. 65 shows the optical disk 501 in vertical cross section. The optical disk substrate 506 has thereon a guiding-groove-formed layer 507 on whose surface a spiral guiding groove is formed from depressions and projections, a second storage layer 508, a guiding-groove-formed intermediate layer 509, a first storage layer 510, surface-coating layer 511 which are deposited in the order. To write/read data on the first storage layer 510 and the second storage layer 508 in the optical disk 501, a focused light beam 512 is shone onto the first and second storage layers 510, 508 via only one side of the disk, that is, the side of the surface-coating layer 511.

FIG. 66 shows an enlarged view of a guiding groove 513 and a part of address pit rows 515 in the address area 504. On the optical disk 501, recording marks 1114 are formed along the spiral guiding groove 513, and the address pit rows 515 are formed extending from the guiding groove 513 in the address area 504.

To read/write data on the first storage layer 510 in the optical disk 501, as shown in FIG. 67, the light beam 512 to focused to illuminate the first storage layer 510 by means of tracking along the guiding groove 513 on the first storage layer 510 while controlling the intensity of the light beam. To read/write data on the second storage layer 508, the light beam 512 is focused to illuminate the second storage layer 508 by means of tracking along the guiding groove 513 on the second storage layer 508 while controlling the intensity of the light beam.

Under these conditions, let us suppose that the optical disk 501 is a phase change storage medium of a high-to-low type in which, for example, interval areas have high reflectance, i.e., lower transmittance, than the recording marks 1114 on the first storage layer 510 and the second storage layer 508.

In the event, to read/write data on the second storage layer 508, a light beam 512d passes through the area where there is the guiding groove 513 on the first storage layer 510 and is focused onto the second storage layer 508, only after having passed through the area where there exist the recording marks 1114 which have relatively better transmittance. In contrast, a light beam 512d passes through the address area 504 of the first storage layer 510 and is focused onto the second storage layer 508, only after having passed through the area where there are no recording marks 1114 which have higher transmittance, that is, a low transmittance area. Therefore, the intensity of the light beam 512e having passed through the area where there is the guiding groove 513 on the first storage layer 510 becomes greater than that of the light beam 512d having passed through the address area of the first storage layer 510.

Therefore, referring back to FIG. 66, as to the optical disk 501 having address area where address pit rows 515 are lumped together, the intensity of a light beam focused onto the second storage layer 508 varies between the address area 504 and the other area where the guiding groove 513 is provided. This makes it impossible perform stable write/readout.

To solve these problems, in the aforementioned prior art patent publication, no address area 504 with address pit rows 515 in FIG. 66 is provided. Instead, it suggests that the variations in intensity of the light beam focused on the second storage layer 508 be restrained by providing a wobbling guiding groove to record address information in the form of wobbles. Throughout this text, the configuration, in which address information is not stored collectively in one place, but distributed will be referred to as a distributed address scheme.

However, in the configuration disclosed in the prior art patent publication, address information is stored on the guiding groove in the form of its wobbles. Therefore, the guiding groove needs be scanned over a relatively long period of time to retrieve a single set of address information.

Specifically, each address pit in the address pit rows 515 in FIG. 66 has a diameter which is more or less equal to the width of the guiding groove 513: typically, 0.3 microns to 0.5 microns, and each set of address information is recorded over about 1 mm or less of the guiding groove 513 in the address area 504.

In contrast, in the case of wobbling guiding grooves, to ensure that the quantity of reflected light does not vary in tracking, each wobble must be several tens of microns long, that is, each address area storing a set of address information must be about 100 mm long in a wobbling guiding groove.

In a lumped address scheme using address pit rows 515, address information is completely reproduced when about 1 mm or less of the address area is scanned. Meanwhile, in a distributed address scheme using a wobbling guiding groove, address information is completely reproduced only when about 100 mm of the guiding groove is scanned, which is relatively long. Distributed address scheme is therefore not to achieve high speed randomly access in optically reading/writing data on optical disks. Lumped address scheme should hence be employed to reproduce address information instantly.

Now referring to FIG. 68, another conventional optical disk 601 has a center hole 602, a recordable area 603, innermost part 604, an outermost part 605, and prepit areas 606.

The optical disk 601 is provided with a guiding groove (not shown) which is, for example, spiral. Tracking is done along the guiding groove to read/write data in the recordable areas 603 by shining a light beam 621 onto first and second storage layers (double layers) 611, 612 as shown in FIG. 69. In the prepit areas 606, or the inner prepit area 606a and outer prepit area 606b, of the first and second storage layer 611, 612, are there formed pit rows (not shown) which form, for example, a spiral. Tracking is done along the pit rows, and a light beam 621 is shone to reproduce prerecorded information from the pit rows.

FIG. 70 shows an enlarged view around the border between the recordable area 603 and a prepit area 606. FIG. 71 shows its cross section in which only the first storage layer 611 and the second storage layer 612 are depicted. The following description assumes that the first and second storage layers 611, 612 are formed in a phase change storage medium of a low-to-high type whose transmittance is higher in produced recording marks than in non-recorded areas.

As shown in FIG. 70 and FIG. 71, if the first storage layer 611, located on the light-striking side, has a prepit area 606, light beams 621a, 621b are focused and shone onto the second storage layer 612 after recording marks M are formed along the guiding groove G in the recordable area 603 of the first storage layer 611. In this case, intensity differs between the light beam 621a, which is transmitted through the recordable area 603 and then focused, and the light beam 621b, which is transmitted through the prepit area 606 and then focused.

In the recordable area 603 do there exist multiple recording marks M with high transmittance, and the light beam 621,a transmitted through the recordable area 603 of the first storage layer 611 has a relatively high intensity. In the prepit area 606 do there exist no recording marks M, and the light beam 621b transmitted through the prepit area 606 of the first storage layer 611 has a relatively low intensity. As could be understood from this, the provision of a prepit area 606 in the first storage layer 611 causes undesirable variations in reading/writing power in reading/writing and makes it impossible to read/write data on the second storage layer 612 in a stable manner.

SUMMARY OF THE INVENTION

The present invention has an objective to offer an optical storage medium, an optical read/write apparatus, and an optical read/write method, with which light can be shone with uniform intensity across the substantially entire recordable area of the second data storage layer without using a complex read/write system even under such conditions that the transmittance to light of the first data storage layer in the recordable area may vary depending on whether any data is recorded in the recordable area.

In order to achieve the foregoing object, an optical storage medium of the present invention includes stacked data storage layers each of which is readable/writeable separately from the other layers by means of only a light beam striking one side of the optical storage medium, and is characterized in that a recordable area of a first data storage layer has adjacent to an end thereof an extended area covering more than an area directly above a recordable area of a second data storage layer in a direction in which the first and second data storage layers are stacked, the first data storage layer being one of the data storage layers which is located closest to a light-striking surface of the medium, the second data storage layer being another of the data storage layers which is located next to the first data storage layer, opposite the light-striking surface.

According to the arrangement, the recordable area of the first data storage layer has adjacent to an end thereof an extended area covering more than an area directly above a recordable area of a second data storage layer in a direction in which the first and second data storage layers are stacked.

Therefore, if data is read/written from/in the recordable area of the second data storage layer after fully recording the recordable area of the first data storage layer, substantially all the read/write light striking the second data storage layer after passing through the first data storage layer passes through the recorded recordable area of the first data storage layer upon reading/writing on the second data storage layer.

Therefore, light can be projected at uniform intensity on substantially all recordable areas of the second data storage layer even when the optical transmittance of the recordable area of the first data storage layer varies depending whether the recordable area is fully recorded or not. Therefore, desirable read/write characteristics can be imparted without using a complex read/write system.

An optical read/write apparatus of the present invention causes a read/write light beam from illuminating means to strike only one side of an optical storage medium, and is characterized in that the apparatus includes controlling means for controlling the illuminating means so that the extended area of the optical storage medium is fully recorded before a recordable area of the first data storage layer of the optical storage medium is recorded except for the extended area.

An optical read/write method of the present invention includes the step of fully recording the extended area before recording a recordable area of the first data storage layer of the optical storage medium except for the extended area.

According to the arrangement, since the optical storage medium has an extended area in the recordable area of the first data storage layer, light can be projected at uniform intensity on substantially all recordable areas of the second data storage layer. Therefore, desirable read/write characteristics can be imparted without using a complex read/write system.

The part of the recordable area of the first data storage layer other than the extended area is as large as the recordable area of the second data storage layer. The illuminating means is controllable in terms of its position relative to the optical storage medium in the same manner in reading/writing in the part of the recordable area of the first data storage layer other than the extended area and the recordable area of the second data storage layer.

Another object of the present invention is to provide an optical storage medium, an optical read/write apparatus, and an optical read/write method, with which a desirable reading/writing property can be realized in an arrangement, using a lumped address scheme, which includes data storage layers.

In order to achieve the foregoing object, an optical storage medium of the present invention includes stacked data storage layers each of which is readable/writeable separately from the other layers by means of only a light beam striking one side of the optical storage medium, and each of the data storage layers has at least one address area where there are collectively formed address information portions representing address information, and the optical storage medium exhibits an optical transmittance which varies when data is written by means of the light beam, wherein the address area of a first data storage layer includes a recorded area exhibiting a varied transmittance and a non-recorded area exhibiting an original transmittance, and the first data storage layer is one of the data storage layers which is located closest to a light-striking surface of the medium, and a second data storage layer is another of the data storage layers which is located next to the first data storage layer, opposite the light-striking surface.

An optical read/write apparatus of the present invention causes a read/write light beam from illuminating means to strike only one side of an optical storage medium including stacked data storage layers each of which is readable/writeable separately from the other layers by means of only a light beam striking one side of the optical storage medium, and each of the data storage layers has at least one address area where there are collectively formed address information portions representing address information, and the optical storage medium exhibits an optical transmittance which varies when data is written by means of the light beam, and the optical read/write apparatus includes controlling means for controlling the illuminating means so that the address area of a first data storage layer includes a recorded area exhibiting a varied transmittance and a non-recorded area exhibiting an original transmittance, and the first data storage layer is one of the data storage layers which is located closest to a light-striking surface of the medium, and a second data storage layer is another of the data storage layers which is located next to the first data storage layer, opposite the light-striking surface.

An optical read/write method of the present invention includes the step of causing a read/write light beam to strike only one side of an optical storage medium including stacked data storage layers each of which is readable/writeable separately from the other layers by means of only a light beam striking one side of the optical storage medium, and each of the data storage layers has at least one address area where there are collectively formed address information portions representing address information, and the optical storage medium exhibits an optical transmittance which varies when data is written by means of the light beam, wherein the address area in a first data storage layer includes a recorded area exhibiting a varied transmittance and a non-recorded area exhibiting an original transmittance, and the first data storage layer is one of the data storage layers which is located closest to a light-striking surface of the medium, and a second data storage layer is another of the data storage layers which is located next to the first data storage layer, opposite the light-striking surface.

According to the arrangement, upon writing or reading on the second data storage layer, the intensity of light beam reaching the second data storage layer after passing through the address area of the first data storage layer on the light-striking side can be made to be almost the same as the intensity of a light beam reaching the second data storage layer after passing through the non-address area in the recordable area of the first data storage layer. As a result, it is possible to read/write data from/in the second data storage layer steadily and desirably.

That is, as to the optical storage medium, the non-address area in the recordable area of the first data storage layer has a recorded area, for example, a recording mark is formed, so that the optical transmittance varies at the portion. In a case where the address area does not have the recorded area exhibiting a varied transmittance, upon reading or writing on the second data storage layer, there is a great difference between the intensity of the light beam reaching the second data storage layer after passing the non-address area and the intensity of the light beam reaching the second data storage layer after passing the address area.

On the other hand, the present invention is arranged so that the address area in the first data storage layer of the optical storage medium includes a recorded area exhibiting a varied transmittance and a non-recorded area exhibiting an original transmittance. Thus, also in the address area, an optical transmittance is varied due to the recorded area as in the non-address area. Therefore, as described above, the intensity of the light beam reaching the second data storage layer, after passing through the address area of the first data storage layer on the light-striking side can be made to be almost the same as the intensity of light beam reaching the second data storage layer after passing through the non-address area in the recordable area of the first data storage layer. As a result, it is possible to read/write data from/in the second data storage layer steadily and desirably.

According to the optical read/write apparatus or the optical read/write method, in a case where the recorded area is formed on the address area in the first data storage layer of the optical storage medium, it is possible to manufacture the optical storage medium at a lower cost since the manufacturing process of the optical storage medium is simplified.

Further, still another object of the present invention is to provide an optical storage medium, an optical read/write apparatus, and an optical read/write method, with which data can be read/written steadily without being influenced by a prepit area. This is realized in an optical disc having two or more storage layers.

In order to achieve the foregoing object, an optical storage medium of the present invention includes: one light-striking-side storage layer provided as a data storage layer on a light-striking side; and one or more opposite-side storage layers provided as data storage layers opposite the light-striking side from the light-striking-side storage layer, wherein, in order to solve the foregoing problems, one of the opposite-side storage layers which is, as a last data storage layer, most distanced from the light-striking-side storage layer has a prepit area which includes preformed pits representative of data.

According to the arrangement, since the last data storage layer, most distanced from the light-striking-side storage layer, has a prepit area, intensity of the striking light is not varied by the prepit area. Thus, it is possible to read/write data from/in the last data storage layer steadily without being influenced by the prepit area.

An optical read/write apparatus of the present invention causes a read/write light beam from an illuminating section to strike only one side of the optical storage medium, wherein the optical read/write apparatus includes: the optical read/write apparatus includes: an envelope detecting section for detecting an envelope of a reproduction signal obtained from the prepit area; a mean level producing section for producing a mean level of the detected envelope; and a digital converting section for converting the reproduction signal to a digital signal using the mean level as a reference.

An optical read/write method of the present invention causes a read/write light beam from an illuminating section to strike only one side of the optical storage medium, wherein the method further includes the steps of: producing a mean level of an envelope of a reproduction signal obtained from the prepit area; and converting the reproduction signal to a digital signal using the mean level as a reference.

According to the foregoing apparatus and method, an envelope of a reproduction signal obtained when the prepit area is reproduced is detected by the envelope detecting section. Then, the mean level producing section produces a mean level of the detected envelope. Thereafter, the digital converting section converts the reproduction signal to a digital signal using the mean level as a reference. Thus, the mean level is always detected, and the detected mean level is used as a reference in the digital conversion, so that it is possible to perform the digital conversion without being influenced by variance in amplitude of the reproduction signal. For example, in a case where there exist a fully recorded portion exhibiting high transmittance after recording and an unrecorded portion which holds no record, when a light beam that is projected so as to cover the fully recorded portion and the unrecorded portion is focused on the second storage layer, it is possible to steadily obtain a digital signal from the reproduction signal even though the reproduction signal strength of prepit data varies in connection with rotation of the optical storage medium. Thus, it is possible to steadily reproduce the prepit data on the second storage layer of the optical storage medium.

For a fuller understanding of the nature and advantages of the invention, reference should be made to the ensuing detailed description taken in conjunction with the accompanying drawings.

DESCRIPTION OF THE EMBODIMENTS

Embodiment 1

The following will describe an embodiment of the present invention in reference to FIGS. 1-8.

Figure 2:
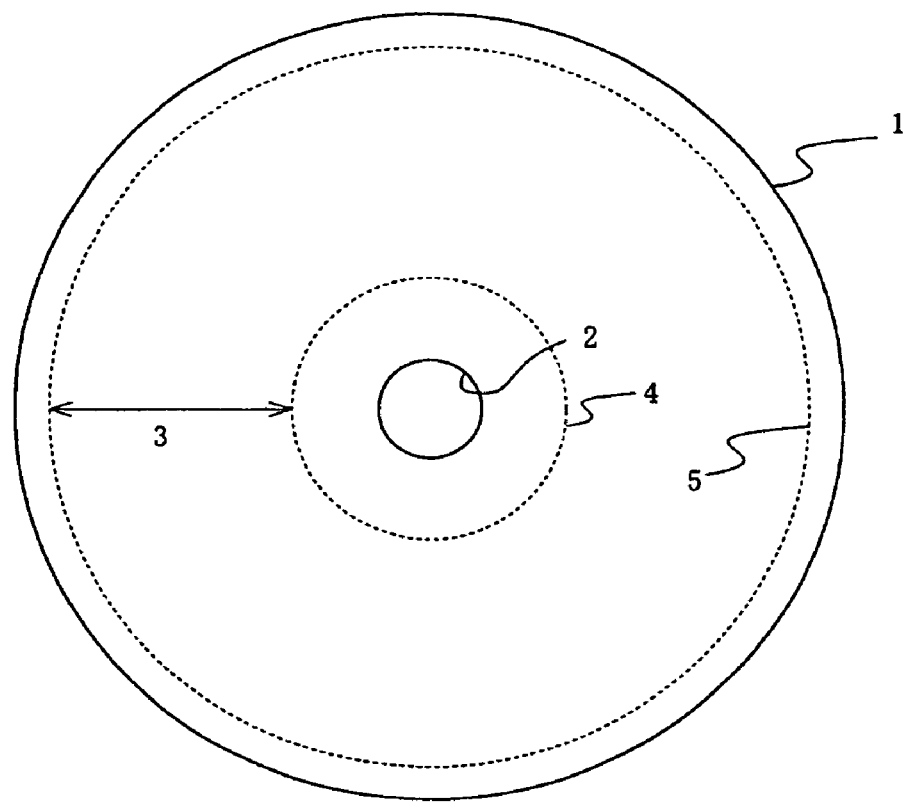
FIG. 2 is a plan view of the optical disk shown in FIG. 1.

Referring to FIG. 2, an optical disk (optical storage medium) 1 of the present embodiment has a center hole 2 at its center and a recordable area 3 relatively close to the circumference in relation to the center hole 2. On the recordable area 3, a spiral read/write guiding groove is formed enabling data readout and write. Broken lines in the figure indicates an innermost part 4 and an outermost part 5 of the recordable area 3.

Figure 3:
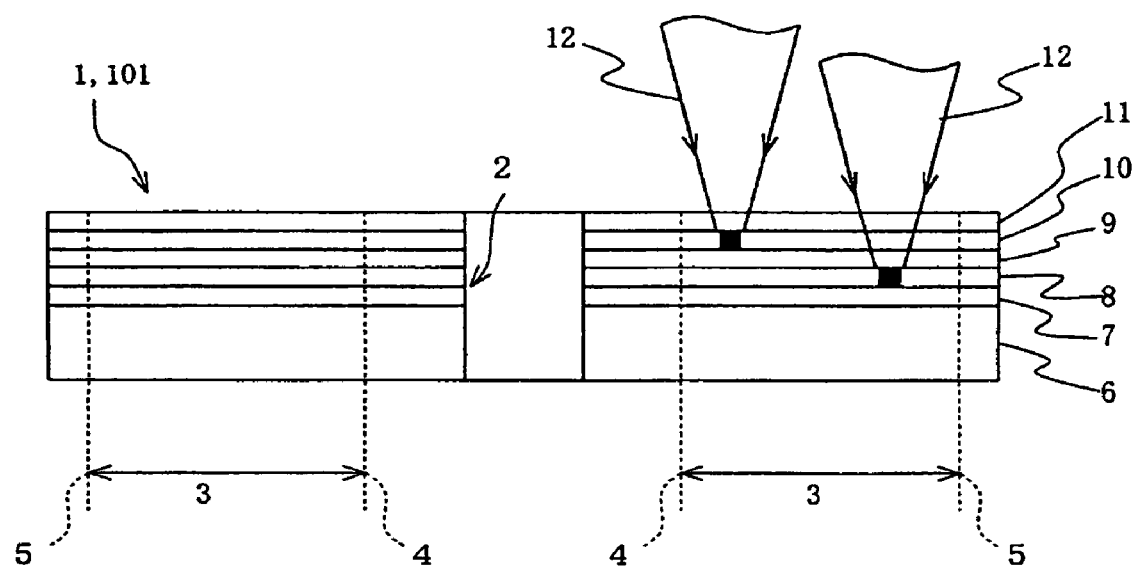
FIG. 3 is a vertical cross-sectional view showing the structure of the optical disk shown in FIG. 1.

Referring to FIG. 3 showing a vertical cross-sectional view of the optical disk 1, the disk 1 has on a disk substrate 6 a guiding-groove-formed layer 7, a second storage layer (second data storage layer) 8, a guiding-groove-formed intermediate layer 9, a first storage layer (first data storage layer) 10, and a surface-coating layer 11, all the layers being stacked in this order. To read/write data in the first storage layer 10 or the second storage layer 8 of the optical disk 1, a light beam 12 is always projected on the same side of the disk 1, i.e., the side where the surface-coating layer 11 is provided, so that the light beam is concentrated on the targeted, first or second storage layer 10, 8.

Figure 4:
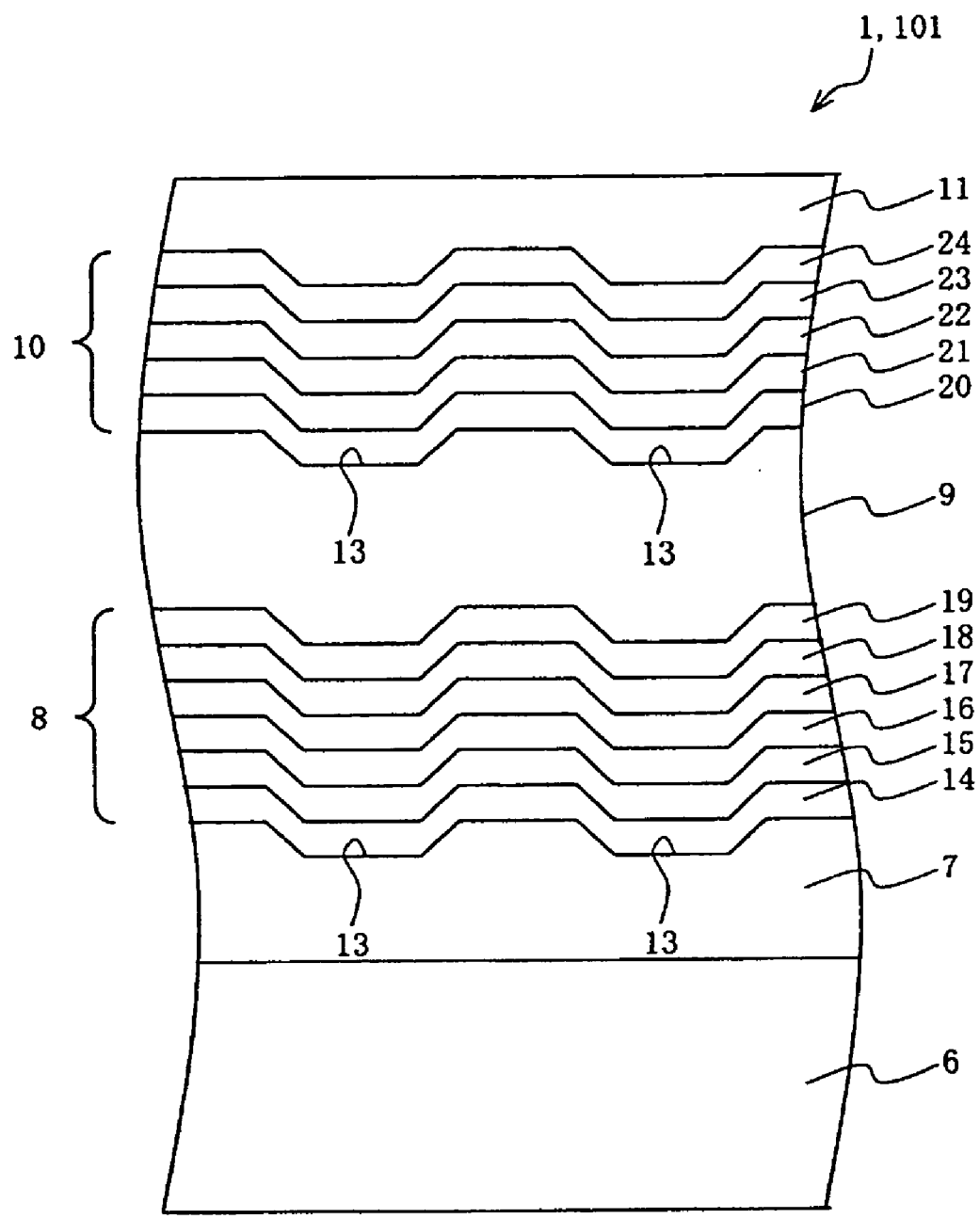
FIG. 4 is an enlarged vertical cross-sectional view showing a major part of the optical disk shown in FIG. 3 in more detail.

The structure of the optical disk 1 is shown in FIG. 4 in more detail. In the figure, the disk substrate 6 is made of, for example, a transparent polycarbonate substrate which is 1.2 mm thick. The guiding-groove-formed layer 7 is made of, for example, an ultraviolet-ray-setting resin layer which is 20 microns thick. On the surface of the layer 7 which interfaces the second storage layer 8, a spiral guiding groove 13 is formed from depressions and projections. The guiding-groove-formed layer 7 is formed, for example, by a pattern transfer technology termed 2P method.

The second storage layer 8 is made up of, for example, an AlTi-alloy reflective film 14, a ZnS—SiO$_2$ interference film 15, a SiN protective film 16, a GeSbTe phase change recording layer 17, a SiN protective film 18, and a ZnS—SiO$_2$ interference film 19. These layers are sequentially stacked on the guiding-groove-formed layer 7 by sputtering.

As with the guiding-groove-formed layer 7, the guiding-groove-formed intermediate layer 9 is made of, for example, an ultraviolet-ray-setting resin layer which is 20 microns thick. On the surface of the intermediate layer 9 which interfaces the first storage layer 10, the guiding groove 13 is formed. The guiding-groove-formed layer 9 is again similarly formed, for example, by a pattern transfer technology termed 2P method.

As with the second storage layer 8, the first storage layer 10 is made up of, for example, a ZnS—SiO$_2$ interference film 20, a SiN protective film 21, a GeSbTe phase change recording layer 22, a SiN protective film 23, and a ZnS—SiO$_2$ interference film 24. These layers are sequentially stacked on the guiding-groove-formed intermediate layer 9 by sputtering.

The surface-coating layer 11 is made of, for example, an ultraviolet-ray-setting resin layer which is 80 microns thick. To form the layer 11, an ultraviolet-ray-setting resin is applied on the first storage layer 10 by spin coating and then cured by ultraviolet ray illumination.

The optical disk substrate 6 is, as mentioned in the foregoing, a transparent polycarbonate substrate. However, if the light beam 12 is incident only to the side of the surface-coating layer 11 as is the case with the optical disk 1 of the present embodiment, the disk substrate 6 is not necessarily transparent and may be an opaque metallic substrate.

The optical disk 1 of the present embodiment has the guiding-groove-formed layer 7 with the guiding groove 13, and the guiding-groove-formed layer 7 is formed by 2P method. Alternatively, for example, the optical disk 1 may be formed by preparing the disk substrate 6 by injection molding and directly forming the guiding groove 13 on the optical disk substrate 6, in which case the guiding-groove-formed layer 7 is unnecessary.

The surface-coating layer 11 is formed on the first storage layer 10 by spin coating. Alternatively, the layer 11 may be a transparent sheet of uniform thickness pasted onto the first storage layer 10.

The optical disk 1 has the guiding-groove-formed layer 7, the second storage layer 8, the guiding-groove-formed intermediate layer 9, the first storage layer 10, and the surface-coating layer 11 sequentially stacked on the optical disk substrate 6. Alternatively, the layers may be stacked on the optical disk substrate 6 in the order to the guiding-groove-formed layer 7, the first storage layer 10, the guiding-groove-formed intermediate layer 9, the second storage layer 8, and the surface-coating layer 11, with the light beam 12 being projected onto the side on which the optical disk substrate 6 is located, in which case the films which will eventually constitute the first storage layer 10 and the second storage layer 8 must be formed in the reverse order from the case illustrated in FIG. 4.

Figure 5:
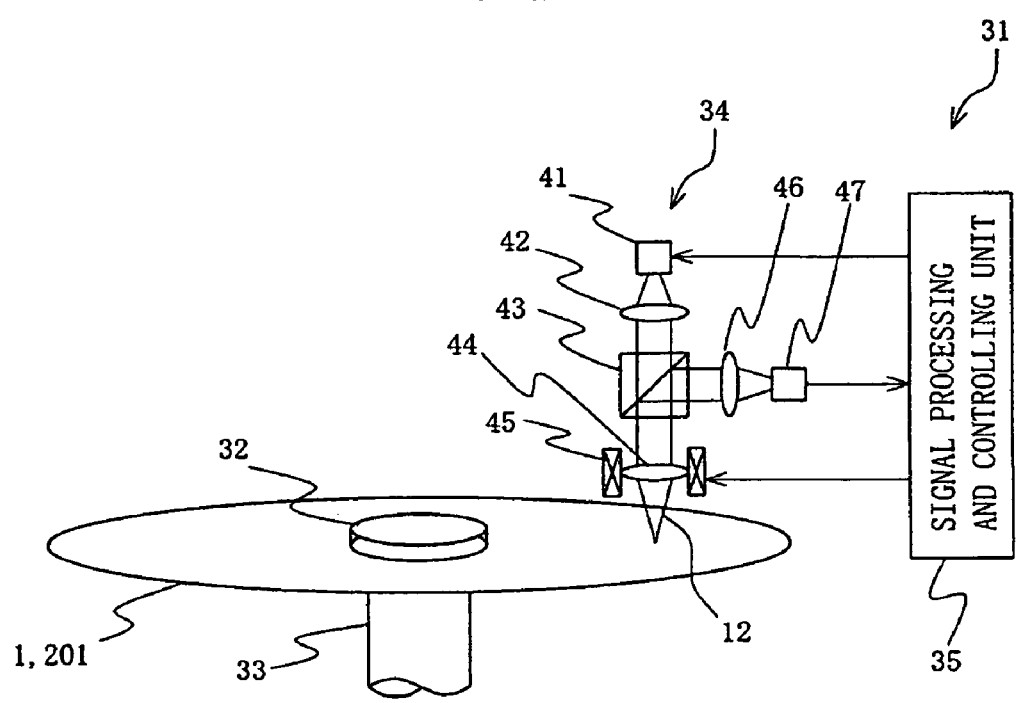
FIG. 5 depicts the structure of an optical-disk-read/write apparatus of an embodiment of the present invention.

An optical-disk-read/write apparatus (optical read/write apparatus) to read/write data on the optical disk 1 has the structure shown in FIG. 5. In the optical-disk-read/write apparatus 31, the optical disk 1 is fixed to the spindle 33 of the motor at the center hub and rotated.

The optical-disk-read/write apparatus 31 includes an optical system unit 34 and a signal processing and controlling unit (controlling means) 35. The optical system unit 34 includes an illumination source 41, such as a semiconductor laser, a collimator lens 42, a beam splitter 43, an objective lens 44, a double-axis actuator 45, a collective lens 46 and a light-receiving element 47. The objective lens 44 is supported by the double-axis actuator 45 and moved along a focusing direction and a tracking direction. The light-receiving element 47 includes a reproduction signal detecting element, a focus error signal detecting element, and a tracking error signal detecting element. The outputs of the detecting elements are fed to the signal processing and controlling unit 35.

The optical system unit 34 is driven by a slide driving unit (not shown) so as to reciprocally move along the radius of the optical disk 1.

The signal processing and controlling unit 35 implements various signal processing and controlling operations. For example, the illumination source 41 is controlled in terms of output power in read/write operations. The double-axis actuator 45 is controlled in response to the outputs of the focus error signal detecting element and the tracking error signal detecting element, to control the focusing and tracking actions of the objective lens 44. The signal processing and controlling unit 35 further controls the slide driving unit and hence the movement of the optical system unit 34 along the radius of the optical disk 1. Thereby, the optical system unit 34, hence the objective lens 44, is moves to a position where the unit 34 can read/write data on a predetermined track. Other control actions of the signal processing and controlling unit 35 will be described later.

In the optical-disk-read/write apparatus 31, the light beam 12 is concentrated on either the first storage layer 10 or the second storage layer 8 by the mechanism discussed in the foregoing, so that data is read/written from/into either the first storage layer 10 or the second storage layer 8 along the guiding groove 13.

In the present embodiment, in the optical-disk-read/write apparatus 31, data is read/written from/into the second storage layer 8 only after the recordable area 3 of the first storage layer 10 is fully recorded. Actions in this case are implemented by the signal processing and controlling unit 35 which controls the optical system unit (illuminating means) 34 and the slide driving unit (illuminating means).

Figure 1:
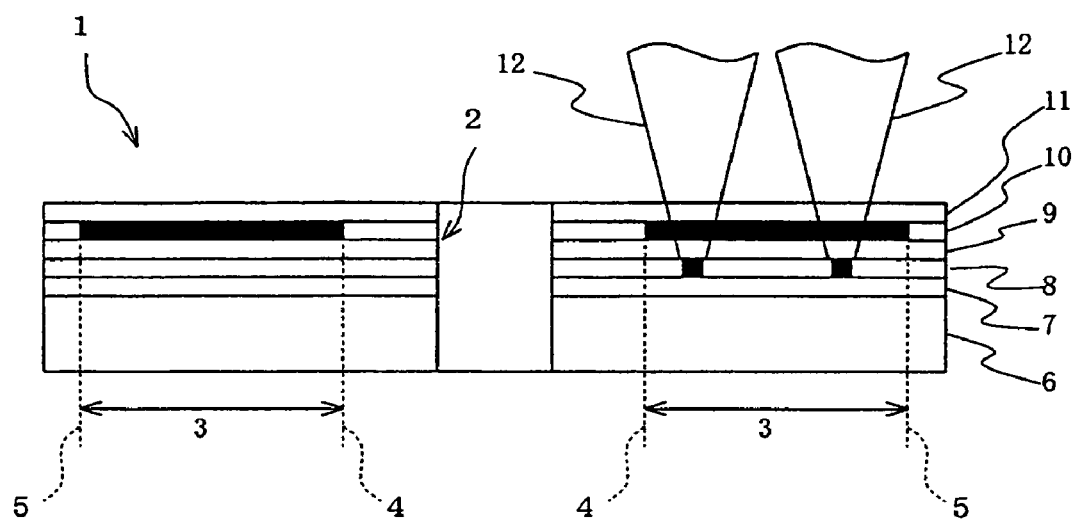
FIG. 1 is a vertical cross-sectional view illustrating how an optical-disk-read/write apparatus of an embodiment of the present invention reads/writes data on the second storage layer of an optical disk.

Actions in this case are shown in FIG. 1. Referring to that figure, when the read/write light beam 12 is projected to the second storage layer 8, the recordable areas 3 of the first storage layer 10 are fully recorded in advance (shown in black). Therefore, the light beam 12 is transmitted through the fully recorded, first storage layer 10 and projected to the second storage layer 8.

Assuming the foregoing structure, the following will describe how the optical-disk-read/write apparatus 31 reads/writes data on the optical disk 1.

In the optical-disk-read/write apparatus 31, the light beam 12 emitted by the illumination source 41 is collimated by the collimator lens 42, transmitted through the beam splitter 43, before entering the objective lens 44. Then, the light beam 12 is focused by the objective lens 44 on either the first storage layer 10 or the second storage layer 8 of the optical disk 1. The reflection from the optical disk 1 passes through the objective lens 44, deflected by the beam splitter 43, and focused by the collective lens 46 on the light-receiving element 47.

Thereafter, based on the output of the light-receiving element 47, the signal processing and controlling unit 35 controls the double-axis actuator 45 and hence the objective lens 44 for its precise focusing and tracking actions. Thus, in the optical-disk-read/write apparatus 31, to read/write data from/into either the first storage layer 10 or the second storage layer 8, the light beam 12 is focused on that storage layer along the guiding groove 13.

In the foregoing situation, the following will describe how the optical-disk-read/write apparatus 31 reads/writes data on the optical disk 1, provided that data is recorded starting with the innermost part 4 of the recordable area 3 of the first storage layer 10 of the optical disk 1 until data fills part of the recordable area 3 of the first storage layer 10 and then the operation moves to reading/writing data in the second storage layer 8. It is also supposed that the optical disk 1 is a high-to-low medium such that the interval area is more reflective than the recording mark area and data is recorded by phase change.

Figure 6:
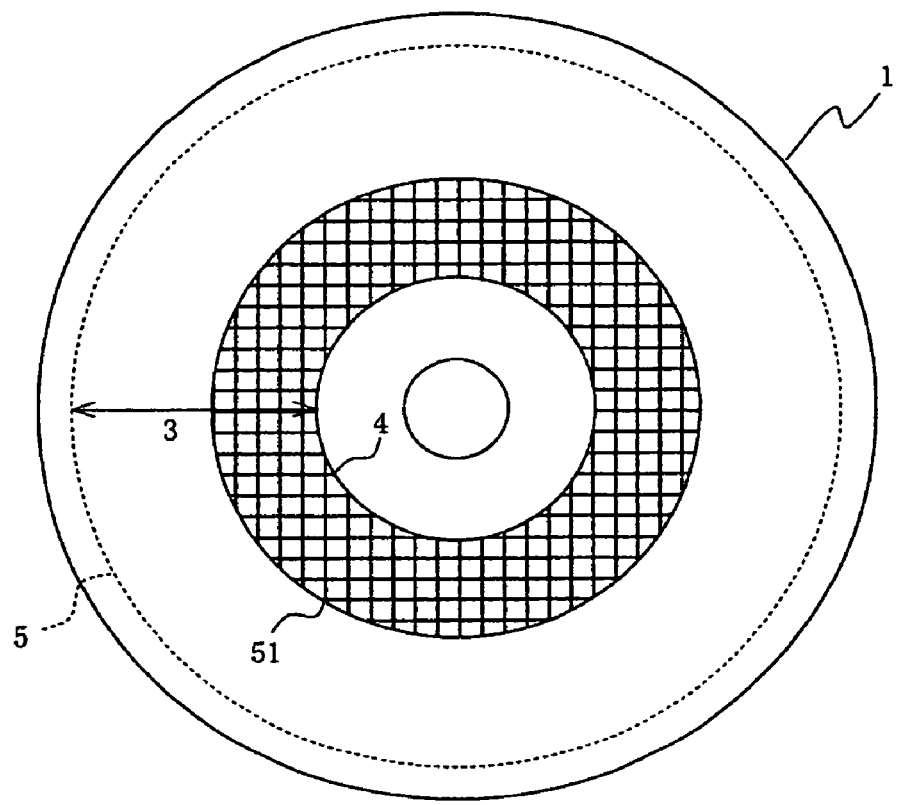
FIG. 6 depicts the optical disk shown in FIG. 2 on which a recorded area occupies a part of the recordable area of the first storage layer.
Figure 7:
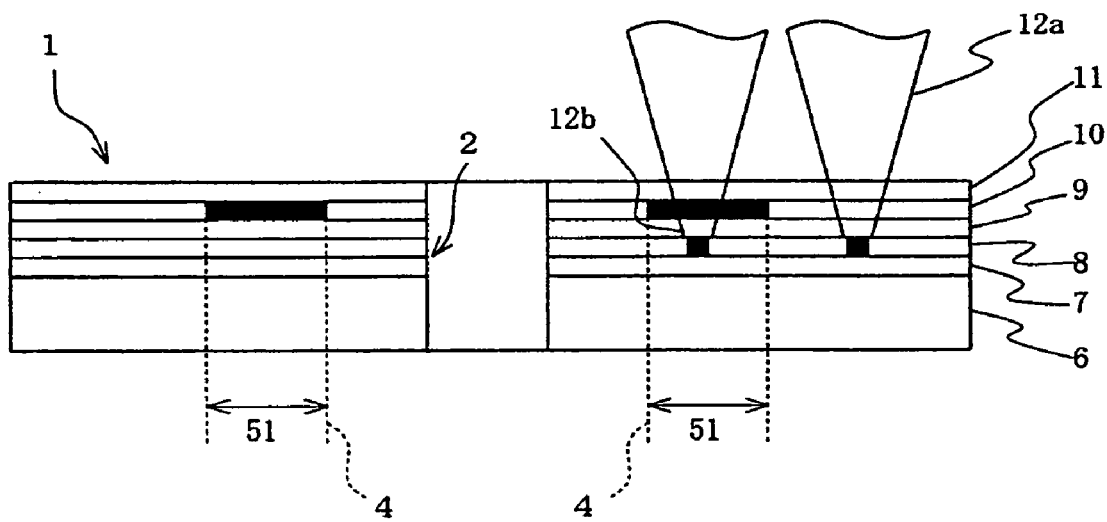
FIG. 7 is a vertical cross-sectional view illustrating how data is read/written on the second storage layer of the optical disk shown in FIG. 6.

As a result of recording in the first storage layer 10, as shown in FIGS. 6, 7, a recorded area 51 (shown by hatched lines) shown is produced covering the innermost part 4 of the recordable area 3 of the first storage layer 10 up to partway of the recordable area 3.

Here, the first storage layer 10 is more optically transmissive in the recorded area 51 than other areas. As a result, the light beam 12 projected on the second storage layer 8 is more intense when it is concentrated on the second storage layer 8 if it has passed through the recorded area 51 than if it has passed through an area other than the recorded area 51 (a non-recorded area). In other words, in recording data into the second storage layer 8, the light beam 12 varies in intensity when it reaches the second storage layer 8 after passing through the first storage layer 10, depending on whether it has come through the recorded area 51. In this case, to record data into the second storage layer 8, a complex write system is required which can vary the light beam 12 in intensity depending on whether there are any records stored in the first storage layer 10.

The same description applies to the case where data is read from the second storage layer 8, and a similarly complex read system is required, because the return light reflected off the second storage layer 8 changes in quantity depending on whether the light beam 12 has passed through the recorded area 51 of the first storage layer 10.

Accordingly, in the optical-disk-read/write apparatus 31 of the present embodiment, as shown in FIG. 1, data is read/written from/into the second storage layer 8 only after the recordable area 3 of the first storage layer 10 is fully recorded. In other words, to record data on the optical disk 1, the optical-disk-read/write apparatus 31 first writes data in the first storage layer 10, and only after the recordable area 3 of the first storage layer 10 is recorded to its full capacity, starts writing or reading data into/from the second storage layer 8.

The operation ensures that in the read/write operation as to the second storage layer 8, the light beam 12 projected on the second storage layer 8 always passes through the fully recorded, first storage layer 10 before entering the second storage layer 8. In both read and write operations, the light beam 12 has a constant intensity when it reaches the second storage layer 8, which eliminates the need to use a complex read/write system to control the intensity of the light beam 12. Stable read/write operations are thus achieved.

Figure 8:
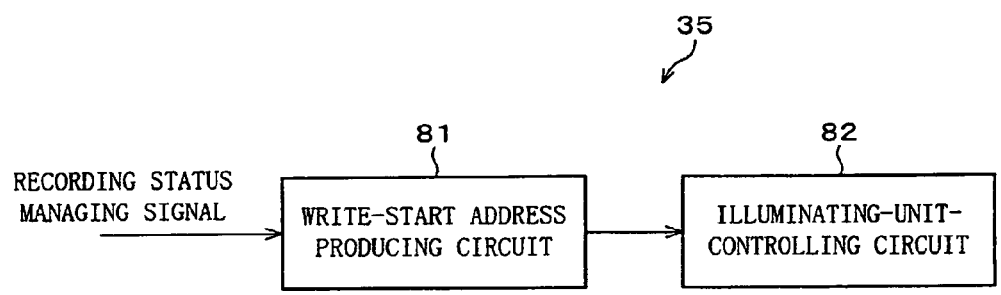
FIG. 8 is a block diagram showing a configuration by which data is read/written on the second storage layer after the first storage layer of the optical disk in FIG. 1 is fully recorded by means of the signal processing and controlling unit shown in FIG. 5.

To carry out such operations, the signal processing and controlling unit 35 is provided with a write-start address producing circuit 81 and an illuminating-unit-controlling circuit 82 as shown in FIG. 8. The illuminating unit controlled by the illuminating-unit-controlling circuit 82 is inclusive of, for example, the optical system unit 34 and the slide driving unit.

To write data on the optical disk 1, first, a recording status managing signal is reproduced from data recorded in a recording status managing area of the optical disk 1, and the signal is all recorded in the write-start address producing circuit 81 in the signal processing and controlling unit 35. The recording status managing area is provided at a particular position in the first storage layer 10. The recording status managing area may contain the title of the recorded material, as well as an address representing a recording range.

Thereafter, the write-start address producing circuit 81 produces a write-start address for the optical disk 1, and the illuminating-unit-controlling circuit 82 controls focus and tracking so as to move the light beam spot to the write-start address. This action triggers recording in the recordable area 3 of the first storage layer 10.

Thereafter, data is written to the first storage layer 10 to its full capacity, that is, until the last address of the first storage layer 10 is detected. If data is written to the second storage layer 8 without a break, the light beam 12 is concentrated on the second storage layer 8 to similarly carry out recording in the recordable area 3 of the second storage layer 8.

Embodiment 2

Figure 9:
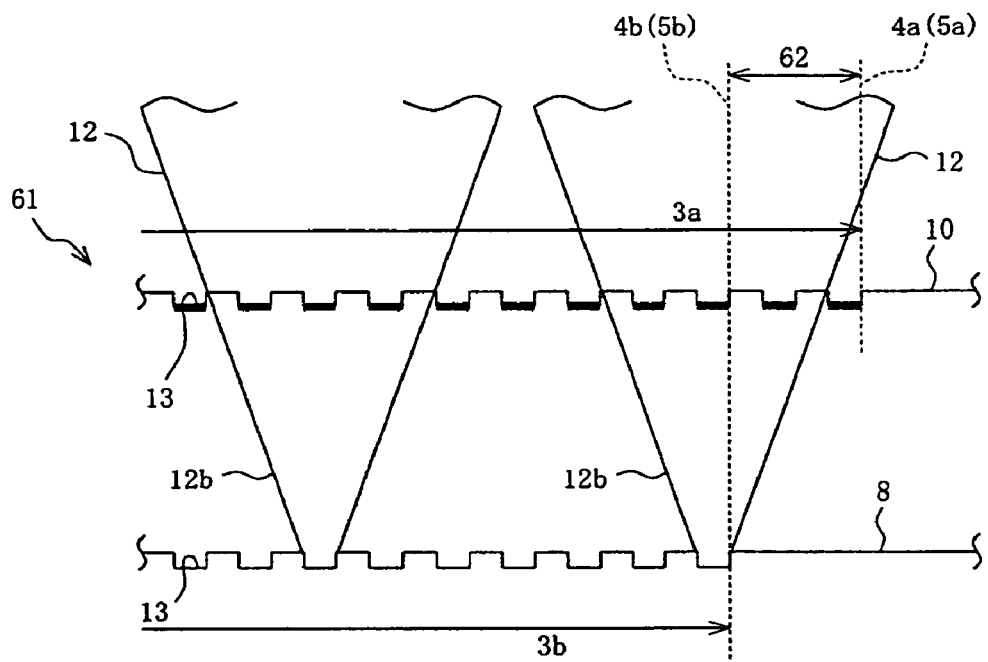
FIG. 9 depicts the structure of the first and second storage layers of an optical disk of an embodiment of the present invention and how data is read/written on the second storage layer.
Figure 10:
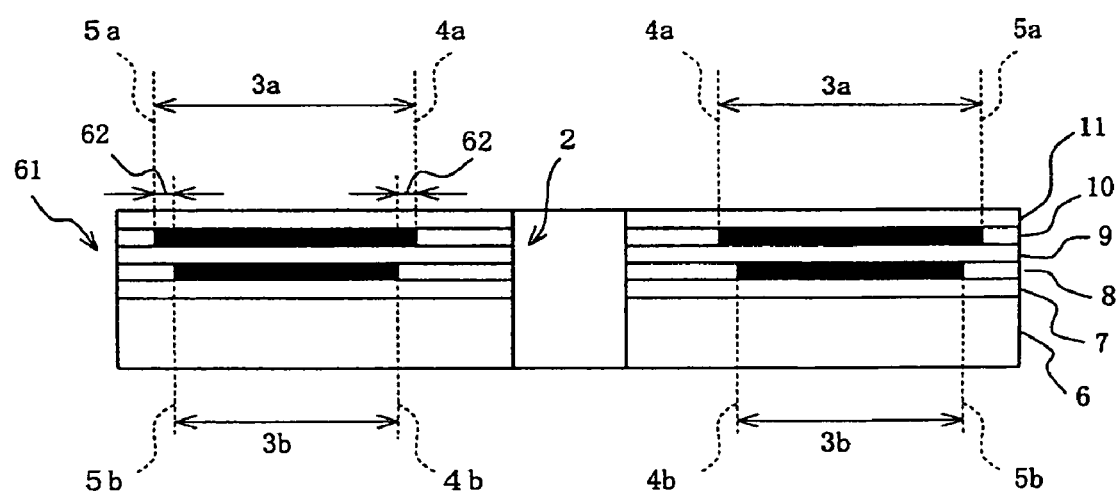
FIG. 10 is a vertical cross-sectional view showing an optical disk which has the first and second storage layers shown in FIG. 9.
Figure 11:
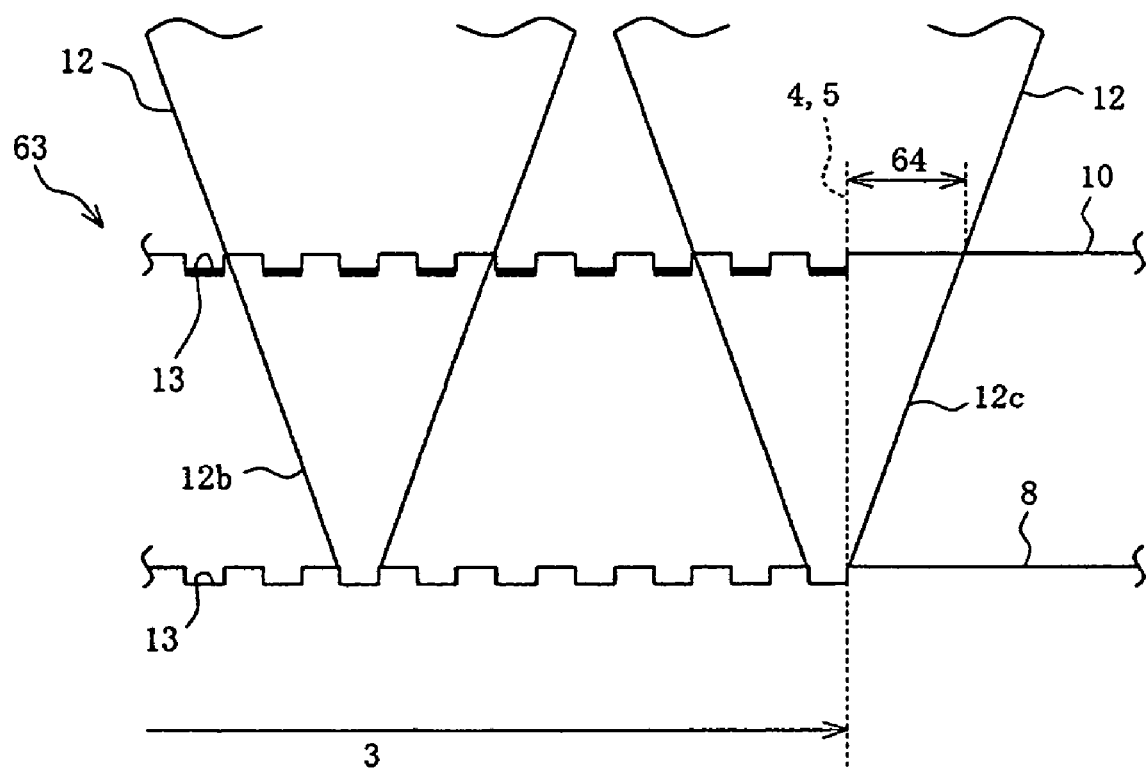
FIG. 11 depicts the structure of the first and second storage layers of an optical disk which is a comparative example of the optical disk shown in FIG. 9 and how data is read/written on the second storage layer.

The following will describe another embodiment of the present invention in reference to FIGS. 9-11. An optical disk 61 of the present embodiment is operational with the optical-disk-read/write apparatus 31 which works as described in the foregoing.

The optical disk 61 of the present embodiment has extended areas 62 in the innermost part 4a and the outermost part 5a of the recordable area 3a of the first storage layer 10 as shown in FIGS. 9, 10. Therefore, the innermost part 4a of the first storage layer 10 extends further inwards in relation to the diameter of the optical disk 1 when compared to the innermost part 4b of the second storage layer 8. The outermost part 5a of the first storage layer 10 extends further outwards in relation to the diameter when compared to the outermost part 5b of the second storage layer 8.

In other words, the recordable area 3a of the first storage layer 10 is greater than the recordable area 3b of the second storage layer 8 by the extended areas 62 in the innermost part 4a and in the outermost part 5a. FIG. 9 is used to show the innermost parts 4a, 4b and the outermost parts 5a, 5b for convenience.

No matter how large or small the extended areas 62 are, their mere provision reduces the loss in intensity of a light beam projected to the recordable area 3b of the second storage layer 8 as will be described later. To further and preferably reduce the loss in intensity of such a light beam, each extended area 62 should be specified enough wide (or long when measured along a diameter of the optical disk 1) that the light beam 12 may not spill out of the recordable area 3a, inclusive of the extended area 62, of the first storage layer 10 regardless whether the light beam 12 is focused on the innermost part 4b or the outermost part 5b of the recordable area 3b of the second storage layer 8.

FIG. 11 shows an optical disk for comparison to explain the functions of the optical disk 61. In the optical disk 63, the recordable area of the first storage layer 10 is as large as that of the second storage layer 8. The innermost part 4 and the outermost part 5 in the first storage layer 10 are positioned directly above and occupy the same area as their equivalents of the second storage layer 8.

As shown in FIGS. 9, 11, in both optical disks 61, 63, the first storage layer 10 and the second storage layer 8 each have a guiding groove 13, and the first storage layer 10 is fully recorded along the guiding groove 13 up to either the innermost part 4a, 4 or the outermost part 5a, 5 of the recordable area 3a, 3. In the figures, the fully recorded status of the guiding groove 13 is shown by bold lines. In other words, in the readout/write on the optical disks 61, 63, the optical-disk-read/write apparatus 31, again, first writes data in the recordable area 3a, 3 of the first storage layer 10 to its full capacity before data is read/written in the recordable area 3b, 3 of the second storage layer 8.

In the arrangement, as to the optical disk 63 equipped with recordable areas 3 with no extended area 62 on the first storage layer 10, the light beam 12b projected on the recordable area 3 of the second storage layer 8 somewhere midway in relation to the radius of the disk to read/write data in the second storage layer 8 passes entirely through the recordable area (fully recorded area) 3 where the first storage layer 10 exhibits a relatively high transmittance.

By contrast, the light beam 12c, if projected close to the innermost part 4 or the outermost part 5 of the second storage layer 8, does not entirely passes through the recordable area (fully recorded area) 3 where the first storage layer 10 exhibits a relatively high transmittance, but partially passes through unrecordable areas 64 other than the recordable area 3 where the first storage layer 10 exhibits a relatively lower transmittance. Accordingly, the light beam 12c is less intense than the light beam 12b. Therefore, in reading/writing data in the second storage layer 8, the light beam decreases, i.e., varies, in intensity in the innermost part 4, the outermost part 5, and their neighborhoods of the recordable area 3 of the second storage layer 8, making it difficult to perform stable read/write operations across the entire recordable area 3 of the second storage layer 8.

By contrast, the optical disk 61 of the present embodiment is provided with recordable areas 3a with extended areas 62 on the first storage layer 10. Thus, the light beam projected on the recordable area 3b of the second storage layer 8 to read/write data in the second storage layer 8 illuminates passes through the recordable area (fully recorded area) 3a where the first storage layer 10 exhibits a relatively high transmittance not only when the light is directed on the second storage layer 8 somewhere midway in relation to the radius of the disk, but also when the light is directed on the innermost part 4b or the outermost part 5b of the second storage layer 8.

Thus, with the optical disk 61 of the present embodiment, the light beam projected on the recordable area 3b of the second storage layer 8 always becomes the light beam 12b which has passed through the recordable area (fully recorded) 3a where the first storage layer 10 exhibits a relatively high transmittance. The light beam does not vary in intensity whether data is read/written from/into any part of the recordable area 3b of the second storage layer 8. Stable read/write operations are thus achieved.

To perform read/write operation on the second storage layer 8, the light beam 12 projected on the first storage layer 10 has a radius not exceeding the thickness of the guiding-groove-formed intermediate layer 9. Therefore, the extended area 62 is sufficiently wide (or long when measured along a diameter of the optical disk) if it is as wide (or long) as the guiding-groove-formed intermediate layer 9 is thick. If the guiding groove 13 on the first storage layer 10 is not concentric to the guiding groove 13 on the second storage layer 8, the extended area 62 should be designed as wide as the guiding-groove-formed intermediate layer 9 is thick, plus the deviation.

FIG. 9 is a schematic view, and the extended area 62 is shown as wide as the area covering two guiding grooves 13. However, in practice, the extended area 62 is as wide as the area covering at least 60 guiding grooves 13, because the guiding grooves 13 have a pitch of about 0.3 microns and the guiding-groove-formed intermediate layer 9 has a thickness of about 20 microns.

In addition, the extended area 62 may be formed in only one of the innermost part 4a and the outermost part 5a of the first storage layer 10, in which case the extended area 62 is functional as described in the foregoing where it is formed.

Embodiment 3

The following will describe a further embodiment of the present invention in reference to FIGS. 12-20. An optical disk 71 of the present embodiment is operational with the optical-disk-read/write apparatus 31 which works as described in the foregoing.

Figure 12:
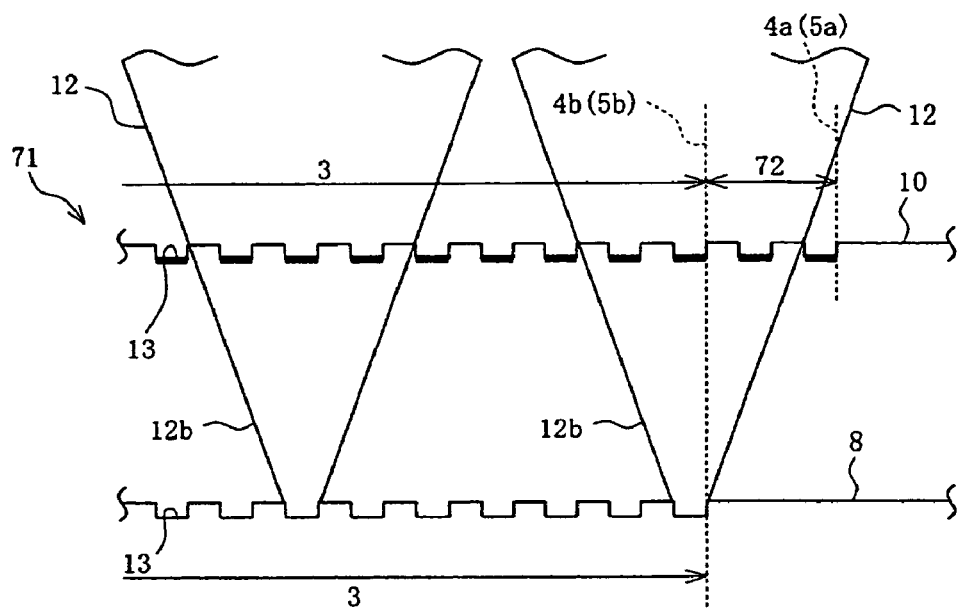
FIG. 12 depicts the structure of the first and second storage layers of an optical disk of another embodiment of the present invention and how data is read/written on the second storage layer.
Figure 13:
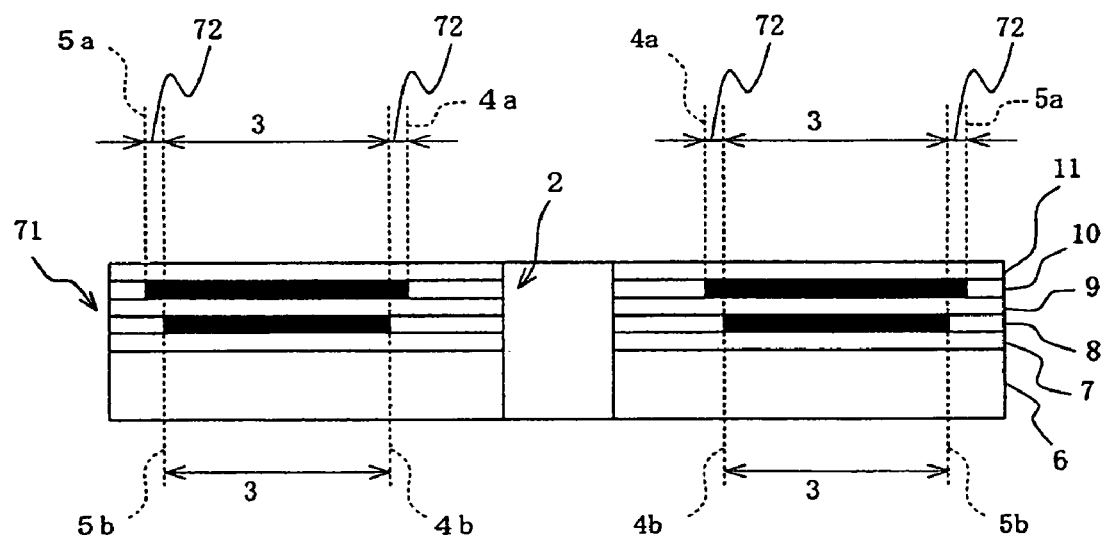
FIG. 13 is a vertical cross-sectional view showing an optical disk equipped with the first and second storage layers shown in FIG. 12.

The optical disk 61 has an extended area 62 in the innermost part 4a and the outermost part 5a of the recordable area 3a of the first storage layer 10. The optical disk 71 of the present embodiment has a fully prerecorded pseudo-recording area 72 in an area which is an equivalent of the extended area 62 as shown in FIGS. 12, 13. Therefore, on the optical disk 71 of the present embodiment, the recordable area 3 where ordinary information is recorded is as great on the first storage layer as it is on the second storage layer 8. The pseudo-recording area 72 may be provided before the optical disk 71 is shipped out, for example.

In the arrangement, to perform normal read/write on the optical disk 71, similarly to the foregoing case, the optical-disk-read/write apparatus 31 first writes data in the first storage layer 10, and only after the recordable area 3 is recorded to its full capacity, starts writing or reading in recordable area 3 of the second storage layer 8, in which case, the pseudo-recording area 72 is already fully recorded.

As mentioned in the foregoing, the optical disk 71 of the present embodiment has a pseudo-recording area 72 inside the innermost part 4b and outside the outermost part 5b of the recordable area 3 of the first storage layer 10 in relation to the diameter of the disk 71. Therefore, to perform read/write in the second storage layer 8, similarly to the case of the optical disk 61, the light beam projected on the recordable area 3 of the second storage layer 8 always becomes the light beam 12b having passed through a fully recorded area where the first storage layer 10 has a relatively high transmittance. The light beam does not vary in intensity whether data is read/written from/into any part of the recordable area 3 of the second storage layer 8. Stable read/write operations are thus achieved.

Further, unlike the optical disk 61, the optical disk 71 has the recordable area 3 which is as large on the first storage layer 10 as on the second storage layer 8, and the guiding grooves 13 on the recordable area 3 may share a common format. As a result, the optical system unit 34 is controlled in terms of its position in performing read/write on the first storage layer 10 in the same manner as in performing read/write on the second storage layer 8.

The pseudo-recording area 72 may be formed on the optical disk 61 with an extended area 62, by the optical-disk-read/write apparatus 31 recording data in that extended area 62 to the full capacity. The optical disk 71 can be thus made from an optical disk 61. In such an arrangement, it is not necessary to fabricate an optical disk 71 by forming a pseudo-recording area 72 on an optical disk 61 prior to shipment. The omission of the step allows for reduction of the cost of the optical disk 61 (71).

The optical-disk-read/write apparatus 31 forms a pseudo-recording area 72 by fully recording the extended area 62 prior to ordinary recording in the first storage layer 10, for example, when the optical disk 61 is loaded into the optical-disk-read/write apparatus 31. In this case, the optical-disk-read/write apparatus 31 first reads data from an extended area 62 of the loaded optical disk 61, and if the extended area 62 is not fully recorded, records data in the area 62 to its full capacity. The process is controlled by the signal processing and controlling unit 35 of the optical-disk-read/write apparatus 31.

Figure 14:
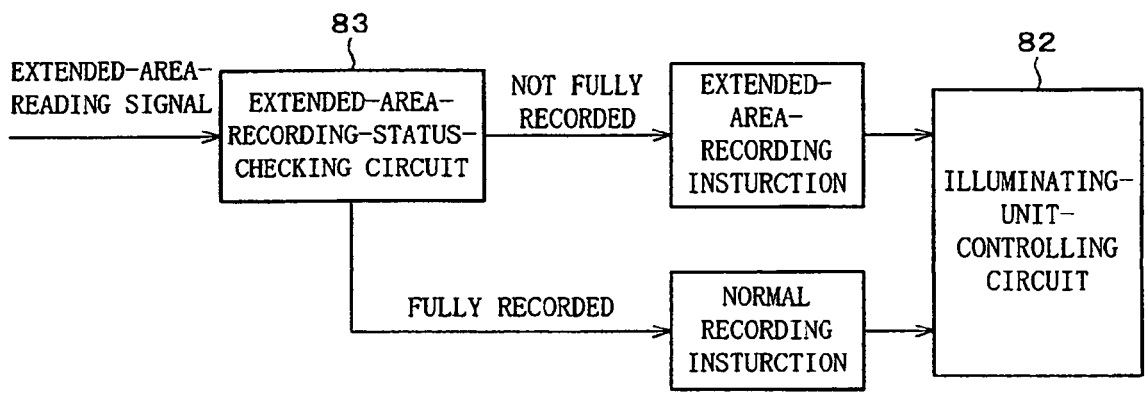
FIG. 14 is a block diagram showing the configuration of part of the signal processing and controlling unit shown in FIG. 5 by which an extended area of the optical disk shown in FIG. 9 is fully recorded.

To implement such control, the signal processing and controlling unit 35 is provided with an extended-area-recording-status-checking circuit 83 and an illuminating-unit-controlling circuit 82 (detailed in the foregoing) as shown in FIG. 14.

In the arrangement, as the optical disk 61 is loaded, the optical-disk-read/write apparatus 31 first reads data from its extended area. The extended-area-recording-status-checking circuit 83 checks based on a reproduction signal from the extended area 62 whether or not the extended area 62 is fully recorded. If the check turns out that the extended area 62 is not fully recorded, the extended-area-recording-status-checking circuit 83 regards the loaded optical disk 61 as being never used, and supplies an extended-area-writing-instruction signal to the illuminating-unit-controlling circuit 82 prior to the start of a recording action carried out on the first storage layer 10. Upon receiving that signal, the illuminating-unit-controlling circuit 82 controls the illuminating unit so as to make the extended area 62 on the optical disk 61 fully recorded.

Meanwhile, if the check turns out that the extended area 62 is fully recorded, the extended-area-recording-status-checking circuit 83 regards the loaded optical disk 61 as being already used, and supplies a normal writing-instruction signal to the illuminating-unit-controlling circuit 82. Upon receiving that signal, the illuminating-unit-controlling circuit 82 controls the illuminating unit so as to perform an ordinary recording action on the optical disk 61.

The pseudo-recording area 72 may store absolutely nonsense or meaningless information. Alternatively, if the optical disk 61 is provided with the pseudo-recording area 72 before being shipped out, the pseudo-recording area 72 may contain a disk ID (identification information) or encryption code information (encryption information) which match that particular optical disk 61, but not the other disks.

If the pseudo-recording area 72 contains encryption code information, the optical-disk-read/write apparatus 31 may record information in the recordable area 3 of the optical disk 71 only after the apparatus 31 encrypts the information based on the encryption code information. In this case, to record information on the optical disk 71, the optical-disk-read/write apparatus 31 first reads the encryption code information of pseudo-recording area 72 and encrypts information to be recorded, based on the encryption code information. In addition, to reproduce information from an encrypted optical disk 71, the optical-disk-read/write apparatus 31 decrypts information after readout from the recordable area 3. These processes are controlled by the signal processing and controlling unit 35.

In this case, the optical-disk-read/write apparatus 31 cannot decrypt information which is read out from the optical disk 71 unless the apparatus 31 is equipped with a function to decrypt the encrypted information, which makes it possible to prevent the illegal copying and other uses of the optical disk 71.

Figure 15:
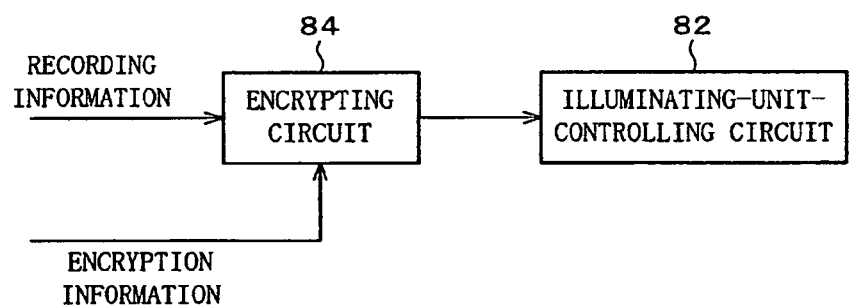
FIG. 15 is a block diagram showing the configuration of part of the signal processing and controlling unit shown in FIG. 5 by which data is encrypted before written on the optical disk.

As mentioned in the foregoing, to record information on the optical disk 71 after encrypting it based on the encryption code information in the pseudo-recording area 72, the signal processing and controlling unit 35 is provided with the encrypting circuit 84 and the illuminating-unit-controlling circuit 82 as shown in FIG. 15.

In the arrangement, prior to taking a recording action on the optical disk 71, the encryption code information is reproduced which is recorded in advance in the pseudo-recording area 72 of the optical disk 71. The encrypting circuit 84 encrypts recording information based on the encryption code information and supplies the encrypted recording information to the illuminating-unit-controlling circuit 82. The illuminating-unit-controlling circuit 82 controls the illuminating unit so that the recording information is recorded on the optical disk 71.

In addition, if the pseudo-recording area 72 contains disk identification information, it is possible to prevent the illegal copying and other uses of the optical disk 71 by managing the disk identification information in the optical-disk-read/write apparatus 31 or in a server or the like connected to the optical-disk-read/write apparatus 31. The managing of the disk identification information refers to the processing to count the times the optical disk 71 is used to limit the times the disk is used, for example.

In addition, provided that the pseudo-recording area already contains disk identification information or encryption code information, designing the pseudo-recording area 72 as a read-only area prohibits rewriting these sets of information. This further appropriately prevents the illegal copying and other uses of the optical disk 71.

In addition, as mentioned earlier, when the optical-disk-read/write apparatus 31 forms the pseudo-recording area 72 on the optical disk 61 to form the optical disk 71 from the optical disk 61, the optical-disk-read/write apparatus 31 may record, in the pseudo-recording area 72, the apparatus ID information which is unique to the optical-disk-read/write apparatus 31 or encryption code information which is unique to the optical-disk-read/write apparatus 31.

Figure 16:
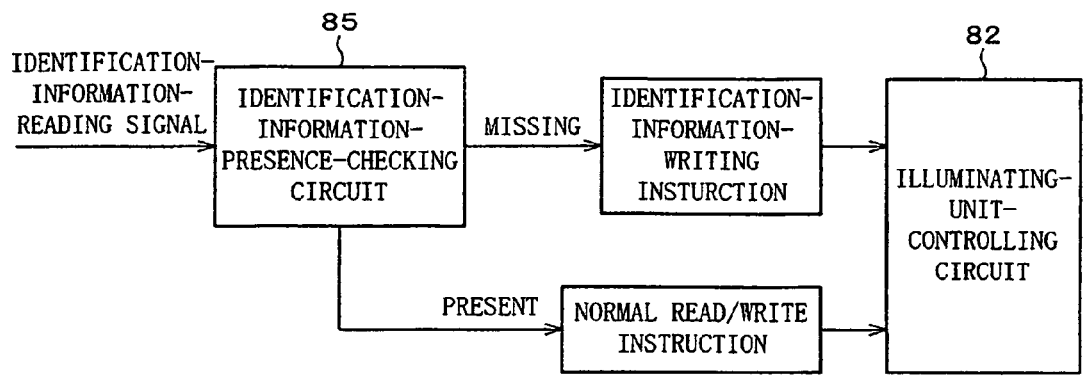
FIG. 16 is a block diagram showing the configuration of part of the signal processing and controlling unit shown in FIG. 5 by which apparatus ID information is recorded in an extended area of the optical disk shown in FIG. 9.

When the optical-disk-read/write apparatus 31 records the apparatus ID information on the pseudo-recording area 72, the signal processing and controlling unit 35 in the optical-disk-read/write apparatus 31 is equipped with an identification-information-presence-checking circuit 85 and the illuminating-unit-controlling circuit 82 as shown in FIG. 16.

In the arrangement, as the optical disk 61 is loaded, the optical-disk-read/write apparatus 31 first reads the extended area. The identification-information-presence-checking circuit 85 checks based on a reproduction signal from the extended area 62 whether the apparatus ID information is present in the extended area 62. If the check turns out that the extended area 62 contains no apparatus ID information, the identification-information-presence-checking circuit 85 regards the loaded optical disk 61 as being as being never used, and supplies an identification-information-writing-instructing signal to the illuminating-unit-controlling circuit 82 prior to the start of a recording action on the first storage layer 10. Upon receiving that signal, the illuminating-unit-controlling circuit 82 controls the illuminating unit so as to record the apparatus ID information in the extended area 62 of the optical disk 61. The apparatus ID information is contained in the signal processing and controlling unit (identification information storing means) 35.

Meanwhile, if the check turns out that the extended area 62 holds apparatus ID information, the identification-information-presence-checking circuit 85 regards the loaded optical disk 61 as being already used, and supplies a normal read/write-instructing signal to the illuminating-unit-controlling circuit 82. Upon receiving that signal, the illuminating-unit-controlling circuit 82 controls the illuminating unit so as to perform an ordinary read/write action on the optical disk 61.

Figure 17:
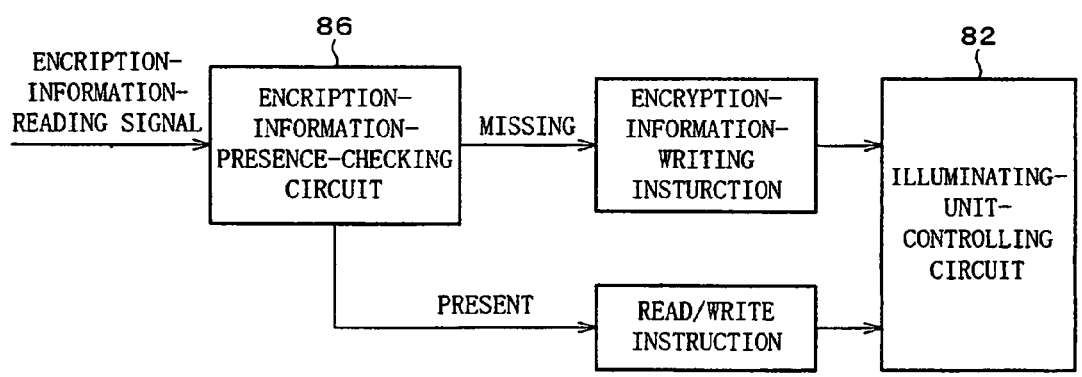
FIG. 17 is a block diagram showing the configuration of part of the signal processing and controlling unit shown in FIG. 5 by which encryption code information is recorded in an extended area of the optical disk shown in FIG. 9.

In addition, to record encryption code information in the pseudo-recording area 72 using the optical-disk-read/write apparatus 31, the signal processing and controlling unit 35 in the optical-disk-read/write apparatus 31 is equipped with an encryption-information-presence-checking circuit 86 and the illuminating-unit-controlling circuit 82 as shown in FIG. 17.

In the arrangement, as the optical disk 61 is loaded, the optical-disk-read/write apparatus 31 first reads the extended area 62. The encryption-information-presence-checking circuit 86 checks based on a reproduction signal from the extended area 62 whether the encryption code information (encryption information) is present in the extended area 62. If the check turns out that the extended area 62 contains no encryption code information, the encryption-information-presence-checking circuit 86 regards the loaded optical disk 61 as being never used, and supplies an encryption-information-reading signal to the illuminating-unit-controlling circuit 82 prior to the start of a recording action on the first storage layer 10. Upon receiving the signal, the illuminating-unit-controlling circuit 82 controls the illuminating unit to record encryption code information in the extended area 62 of the optical disk 61. The encryption code information is contained in the signal processing and controlling unit (encryption information storing means) 35.

Meanwhile, if the check turns out that the extended area 62 holds encryption code information, the encryption-information-presence-checking circuit 86 regards the loaded optical disk 61 as being already used, and supplies an ordinary read/write-instructing signal to the illuminating-unit-controlling circuit 82. Upon receiving the signal, the illuminating-unit-controlling circuit 82 controls the illuminating unit so as to perform an ordinary read/write action on the optical disk 61.

In addition, as mentioned earlier, when the optical-disk-read/write apparatus 31 records apparatus ID information or encryption code information in the pseudo-recording area 72 (extended area 62), an arrangement may be made so that only the optical-disk-read/write apparatus 31 which did that recording can reproduce information from the recordable area 3 of the optical disk 71 (61).

Processing in this case is done as below, for example. Supposing that the pseudo-recording area 72 of the optical disk 71 holds apparatus ID information, to read the optical disk 71, the optical-disk-read/write apparatus 31 first reproduce the apparatus ID information from the pseudo-recording area 72 of the optical disk 71, and then reads data from the optical disk 71 only when the apparatus ID information readout matches the apparatus ID information of the optical-disk-read/write apparatus 31 as a result of checking.

Figure 18:
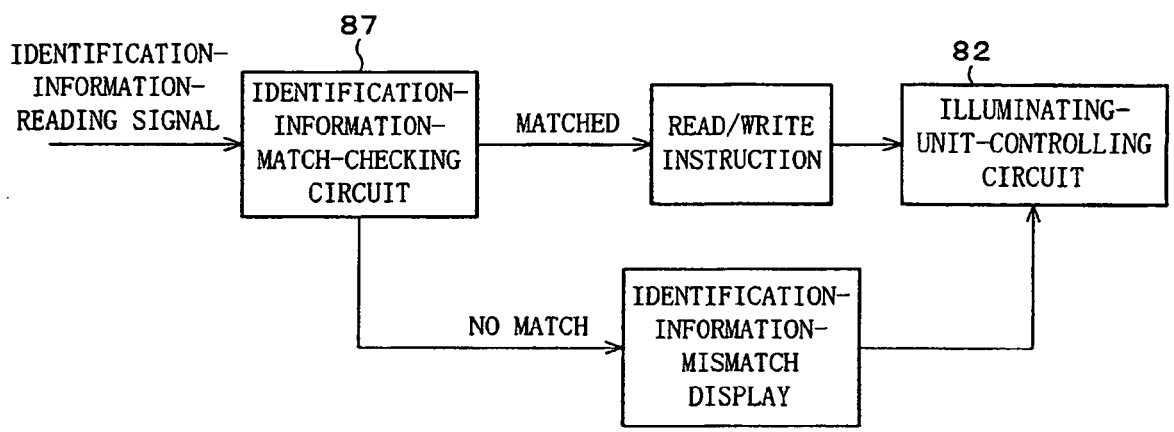
FIG. 18 is a block diagram showing the configuration of part of the signal processing and controlling unit shown in FIG. 5 by which actions are taken according to whether or not the apparatus ID information stored in an extended area of the optical disk shown in FIG. 9 matches the apparatus ID information of the optical-disk-read/write apparatus.

To realize these actions, the signal processing and controlling unit 35 is equipped with an identification-information-match-checking circuit 87 and the illuminating-unit-controlling circuit 82 as shown in FIG. 18.

In the arrangement, as the optical disk 71 is loaded, the optical-disk-read/write apparatus 31 first reads the pseudo-recording area 72. The identification-information-match-checking circuit 87 compares the apparatus ID information obtained from the reproduction signal read out from the pseudo-recording area 72 with the apparatus ID information assigned to the optical-disk-read/write apparatus 31 to check whether the two sets of apparatus ID information match. If the check turns out that the two sets of apparatus ID information match each other, a read/write-instructing signal is supplied to the illuminating-unit-controlling circuit 82. Upon receiving the signal, the illuminating-unit-controlling circuit 82 controls the illuminating unit so as to perform a read/write action on the optical disk 71.

Meanwhile, if the two sets of apparatus ID information does not match each other, the identification-information-match-checking circuit 87 supplies an identification-information-match-display signal representing the situation to the illuminating-unit-controlling circuit 82. Upon receiving that signal, the illuminating-unit-controlling circuit 82 causes a display unit (not shown) to display a notice to that situation, for example. In this case, no data is read nor written on the optical disk 71.

Figure 19:
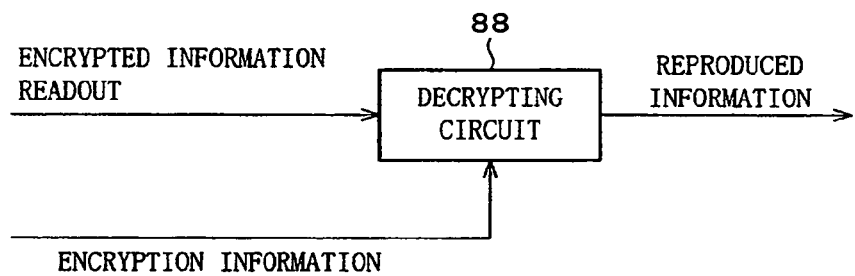
FIG. 19 is a block diagram showing the configuration of part of the signal processing and controlling unit shown in FIG. 5 by which encrypted information stored on the optical disk is decrypted.

In addition, if the recordable area 3 of the optical disk holds information which is encrypted based on encryption code information, to read the optical disk 71, the optical-disk-read/write apparatus 31 decrypts the information read out from the recordable area 3 based on the encryption code information of the optical-disk-read/write apparatus 31. The decryption is done, as shown in FIG. 19, in a decrypting circuit 88 in the signal processing and controlling unit 35. In these circumstances, the information read out from the recordable area 3 can be decrypted only when the encryption code information used with the optical disk 71 matches the encryption code information provided to the optical-disk-read/write apparatus 31. The arrangement enables prevention of copying, legal or illegal, of the optical disk 71.

In addition, the extended area 62 of the optical disk 61 can be used as a test write area as follows.

For example, the most suitable light beam intensity to write data on the optical disk 61, that is the most suitable writing power, varies depending on changes in various factors including ambient temperature. Therefore, the optical-disk-read/write apparatus 31 usually test writes data on the optical disk to calculate the most suitable writing power. Accordingly, on the optical disk 61, the extended area 62 is at least partly used as a test write area. The arrangement eliminates the need to separately provide a test write area on the optical disk 61 and enables efficient use of the recordable area 3 of the optical disk 61.

Figure 20:
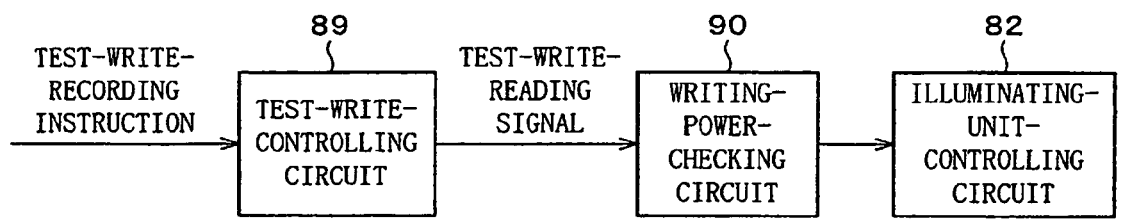
FIG. 20 is a block diagram showing the configuration of part of the signal processing and controlling unit shown in FIG. 5 by which data is test written in an extended area of the optical disk shown in FIG. 9.

To implement these actions, the signal processing and controlling unit 35 is provided with a test-write-controlling circuit 89, a writing-power-checking circuit 90, and the illuminating-unit-controlling circuit 82 as shown in FIG. 20.

In the arrangement, to write data on the optical disk 61, a test-write-recording instruction is given to the test-write-controlling circuit 89 prior to writing in the first storage layer 10. Thus, the extended area 62 of the optical disk 61 is test written (recorded as test write). The test write is done with the writing power varied by little amounts.

Next, the data recorded in the test write is reproduced, and the reproduction signal is supplied to the writing-power-checking circuit 90. The writing-power-checking circuit 90 determines the most suitable writing power to record data on the optical disk 61 based on the reproduction signal. Thereafter, the information representative of the most suitable writing power is supplied to the illuminating-unit-controlling circuit 82 which controls the illuminating unit so that data is written on the optical disk 61 using the most suitable writing power. The arrangement always enables recording under the most suitable conditions regardless of changes in various factors including ambient temperature and resultant changes in the recording sensitivity of the optical disk 61.

Throughout the embodiments above, it was supposed that the optical disks are all high-to-low phase change types of storage media whose interval areas have higher reflectance, i.e., lower transmittance, than the recording mark areas. The foregoing arrangements are however applicable to those optical disks that may be low-to-high phase change types of storage media whose interval areas have lower reflectance, i.e., higher transmittance, than the recording mark areas.

Embodiment 4

The following will describe another embodiment of the present invention in reference to FIGS. 21-25.

Figure 23:
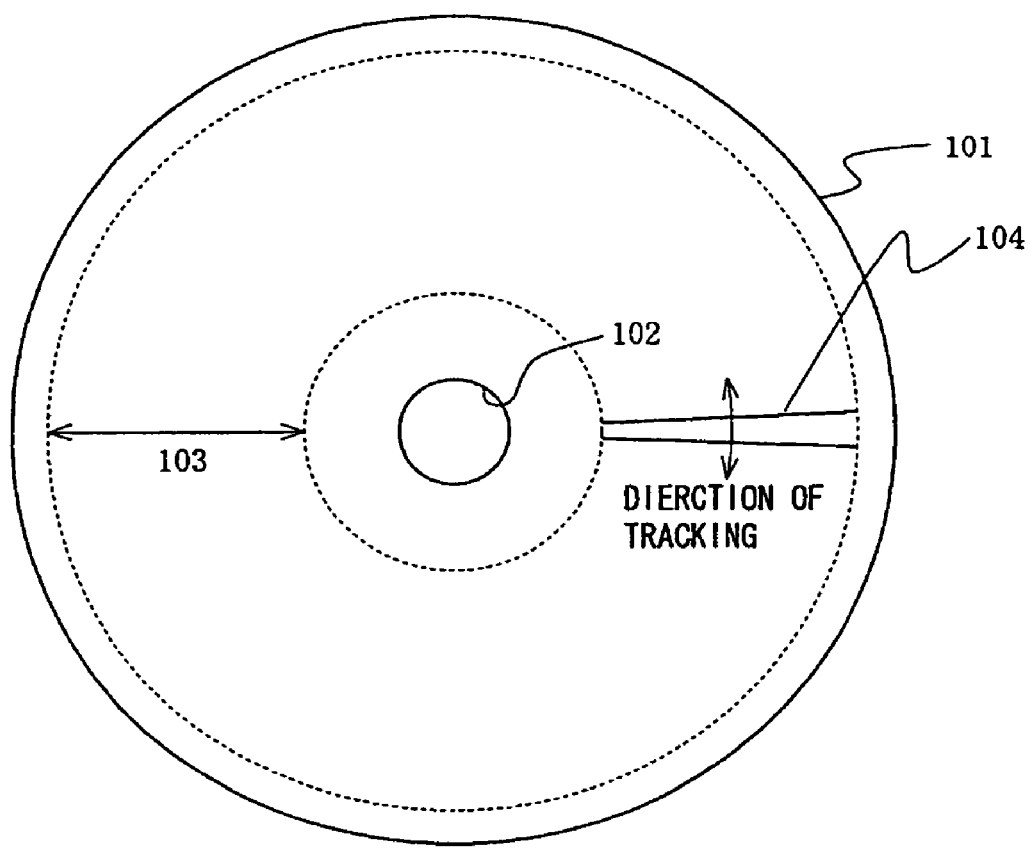
FIG. 23 is a plan view of the optical disk shown in FIG. 21.

As shown in FIG. 23, an optical disk (optical storage medium) 101 of the present embodiment has a center hole 102 at its center and a recordable area 103 outside the center hole 102 in relation to a diameter. The innermost part and the outermost part of the recordable area 103 are shown by broken lines. The optical disk 101 employs a lumped address scheme: an address area 104 is provided occupying a predetermined angular part of the recordable area 103, and address information is represented by radially arranged address pit rows in the address area 104. In a non-address area 105, which is the part of the recordable area 103 other than the address area 104, there is provided a spiraling read/write guiding groove along which information can be read/written.

Like the optical disk 1, the optical disk 101 is arranged as shown in FIG. 3 and FIG. 4.

Figure 21:
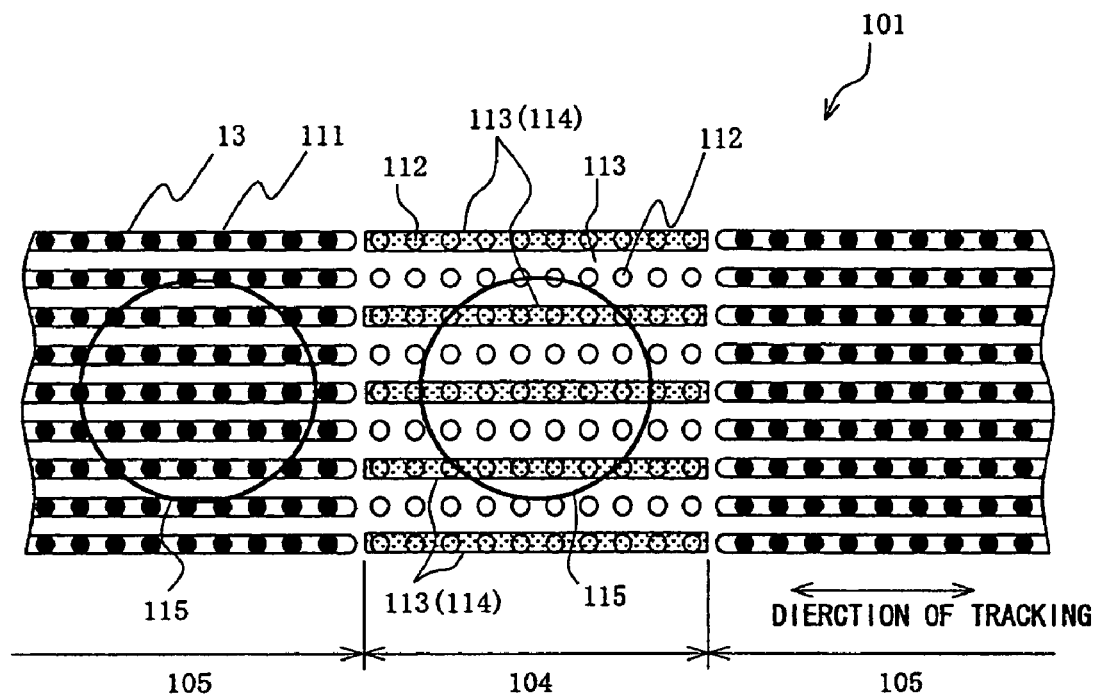
FIG. 21 is an enlarged view showing part of a recordable area and an address area of an optical disk as an optical storage medium of a further embodiment of the present invention.

FIG. 21 shows an enlarged view of a part of the optical disk 101, where an address area 104 and non-address areas 105 adjacent to the address area 104 are depicted. Each non-address area 105 stores recording marks 111 formed by projection of a light beam 12 along the spiraling guiding groove 13. The recording mark 111 differs from surrounding portions in optical transmittance.

In the address area 104, address tracks 113 made of address pits 112 are provided to extend from the guiding grooves 13 in the non-address areas 105. The address area 104 includes recorded areas where transmittance has changed and non-recorded areas where transmittance has not changed. Concretely, the (continuous) address area 104 where transmittance has changed is formed by continuously recording alternate address tracks 113 in relation to a diameter of the optical disk 101 by continuously projecting a light beam 12. In other words, one of two address tracks 113 in the address area 104 which are adjacent in the relation to a diameter of the optical disk 101 is continuously recorded, whereas the other is unrecorded.

The optical-disk-read/write apparatus (optical read/write apparatus) for reading/writing the optical disk 101 was already described in reference to FIG. 5, as with the optical disk 1.

Figure 22:
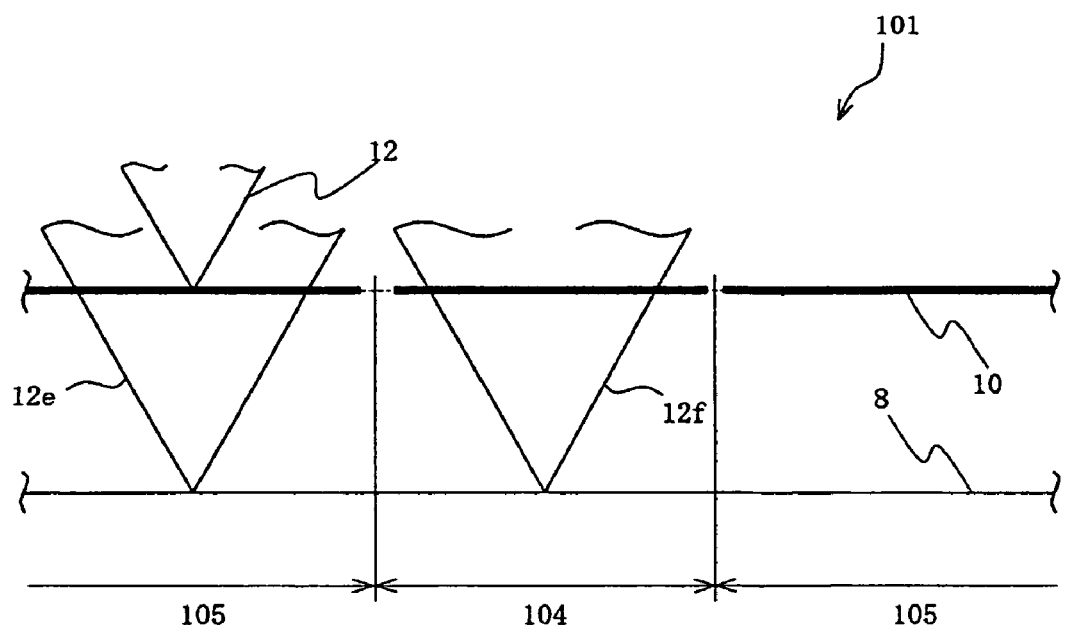
FIG. 22 depicts how data is read/written in the recordable area and the address area of the second storage layer shown in FIG. 21.

For the optical-disk-read/write apparatus 31 to read/write data on the optical disk 101, the first storage layer 10 is read/written as shown in FIG. 22 by focusing and projecting the light beam 12 onto the first storage layer 10 while tracking the guiding groove 13 on the first storage layer 10 and controlling the light beam intensity. In addition, the second storage layer 8 is read/written by focusing and projecting the light beam 12 onto the second storage layer 8 while tracking the guiding groove 13 on the second storage layer 8 and controls the light beam intensity.

In this situation, it is supposed that the optical disk 101 is, for example, a high-to-low phase change type of storage medium in which in the first storage layer 10 and the second storage layer 8, interval areas between the recording marks 111 have a higher reflectance, i.e., lower transmittance, than the recording marks 111.

In this case, in the non-address area 105 on the first storage layer 10, the recording marks 111 have a higher transmittance. Therefore, referring to FIG. 22, the light beam 12e projected onto the second storage layer 8 after passing trough a portion of the first storage layer 10 where the recording marks 111 are present has a greater intensity than the light beam projected onto the second storage layer 8 without passing through that portion where the recording marks 111 are present. Likewise, since the address area 104 on the first storage layer 10 has continuous storage areas 114, the light beam 12f projected onto the second storage layer 8 after passing through the address area 104 has a greater intensity than the light beam projected onto the second storage layer 8 after passing through the address area in the case where there are no continuous storage areas 114. Therefore, as to the optical disk 101, the intensity of the light beam 12f projected onto the second storage layer 8 after passing through an address area 104 on the first storage layer 10 can be made closer to the intensity of the light beam 12e projected onto the second storage layer 8 after passing through the non-address area 105 on the first storage layer 10.

As a result, as to the optical disk 101 employing a lumped address scheme, the light beam intensity on the second storage layer 8 can be retained at a substantially constant value regardless of whether the light is the light beam 12e passing through the non-address area 105 on the first storage layer 10 or the light beam 12f passing through the address area 104 on the first storage layer 10, enabling stable and desirable read/write on the second storage layer 8.

Besides, on the optical disk 101 of the present embodiment, a continuous storage area 114 appears on alternate address tracks 113 in relation to a diameter of the optical disk 101. Therefore, when the light beam 12 is focused on the second storage layer 8 as shown in FIG. 22, in the case where a beam spot 115 formed by the light beam 12 forms on the first storage layer 10 as shown in FIG. 21, the sum of the areas of the recording marks 111 included in the area of the beam spot 115 in the non-address area 105 on the first storage layer 10 is substantially equal to the sum of the continuous storage areas 114 included in the area of the beam spot 115 in the address area 104. Thus, the intensity of the light beam 12f projected onto the second storage layer 8 after passing through an address area 104 on the first storage layer 10 can be made substantially equal to the intensity of the light beam 12e projected onto the second storage layer 8 after passing through the non-address area 105 on the first storage layer 10.

In FIG. 21, ten address pits 112 are shown forming an address track 113. However, FIG. 21 is only a schematic figure, and in practice, an address track 113 is made up of 1000 or more address pits 112 of various lengths.

The continuous storage area 114 on the optical disk 101 may be formed prior to the shipment of the optical disk 101 or by the optical-disk-read/write apparatus 31 based on reproduced address information when the optical disk 101 is loaded in the optical-disk-read/write apparatus 31. In the arrangement, the optical disk 101 does not need any particular arrangement that enables the determination whether to form a continuous storage area 114 in the address track 113.

Figure 24:
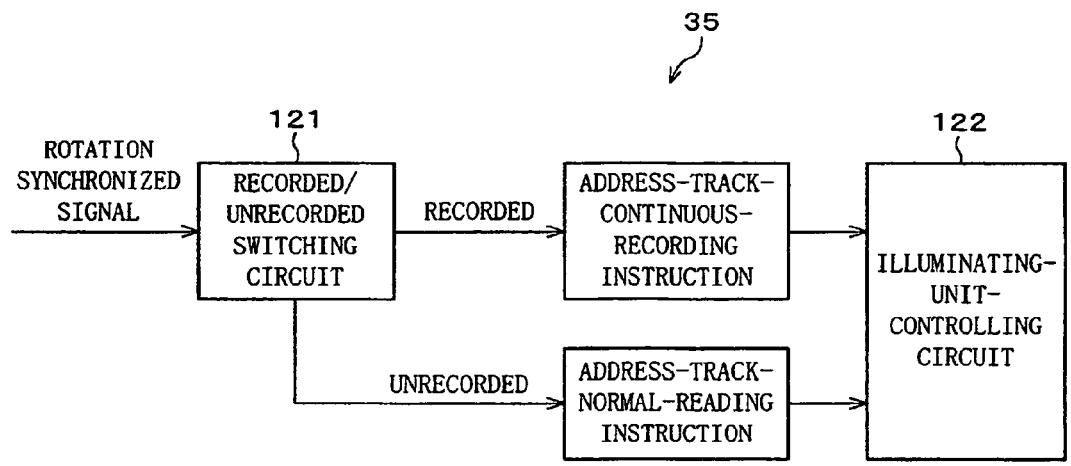
FIG. 24 is a block diagram showing the configuration of part of a signal processing and controlling unit, in an optical-disk-read/write apparatus of the present embodiment by which a continuous storage area is formed in an address area of the optical disk shown in FIG. 21 based on a rotation synchronized signal.

To implement the actions, the signal processing and controlling unit 35 in the optical-disk-read/write apparatus 31 has a recorded/unrecorded switching circuit 121 and an illuminating-unit-controlling circuit 122 as shown in FIG. 24. The illuminating unit controlled by the illuminating-unit-controlling circuit 122 is inclusive of an optical system unit 34 and a slide driving unit.

In the arrangement, the signal processing and controlling unit 35 feeds a rotation synchronized signal produced in synchronism with the rotation of the optical disk 101 to the recorded/unrecorded switching circuit 121. The recorded/unrecorded switching circuit 121 checks based on the rotation synchronized signal for every turn of the optical disk 101 whether to make the address track 113 a continuous storage area 114, that is, whether to continuously recorded the address track 113. Here, as mentioned earlier, the check is done so that alternate address tracks 113 are continuous storage areas 114.

If the address track 113 is caused to be a continuous storage area 114, the recorded/unrecorded switching circuit 121 feeds an address-track-continuous-recording-instructing signal to the illuminating-unit-controlling circuit 122. Upon receiving the signal, the illuminating-unit-controlling circuit 122 controls the illuminating unit and continuously record the address track 113.

Meanwhile, if the address track is caused to be unrecorded, the recorded/unrecorded switching circuit 121 feeds an address-track-normal-reading-instructing signal to the illuminating-unit-controlling circuit 122. Upon receiving the signal, the illuminating-unit-controlling circuit 122 controls the illuminating unit so as to read the address track 113 at a laser intensity which is incapable of recording data. In this case, address information is reproduced.

Figure 25:
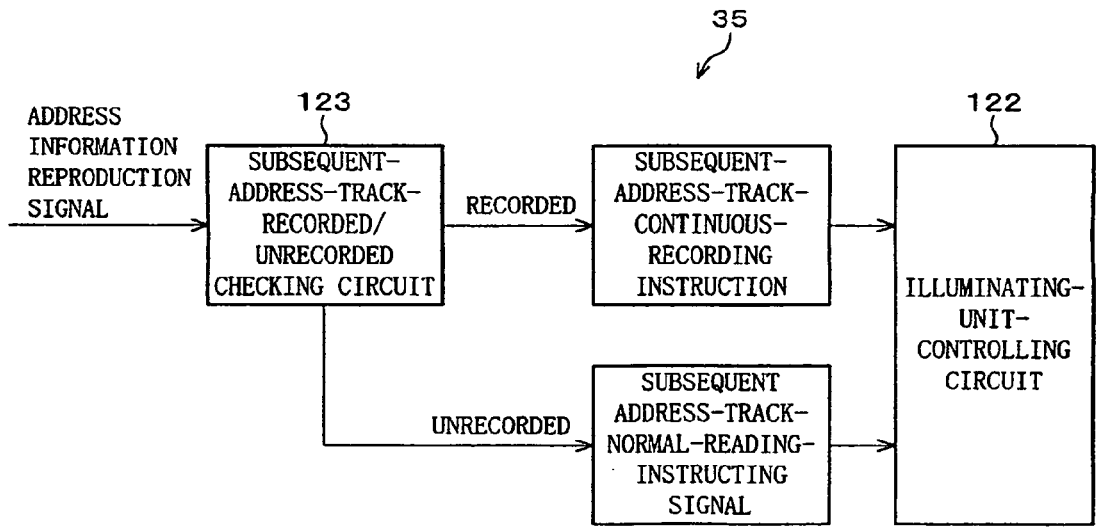
FIG. 25 is a block diagram showing the configuration of part of the signal processing and controlling unit by which a continuous storage area is formed in an address area of the optical disk shown in FIG. 21 based on address information.

In addition, to implement the actions, the signal processing and controlling unit 35 in the optical-disk-read/write apparatus 31 may include an arrangement shown in FIG. 25 which differs from the arrangement in FIG. 24. In that arrangement, the signal processing and controlling unit 35 has a subsequent-address-track-recorded/unrecorded checking circuit 123 and the illuminating-unit-controlling circuit 122.

In this arrangement, the subsequent-address-track-recorded/unrecorded checking circuit 123 determines based on the address information obtained from the address area 104 whether to make the address track 113 a continuous storage area 114. In other words, as mentioned in the foregoing, in the case where alternate address tracks 113 are designated as continuous storage areas 114, regardless whether to make the currently scanned address track 113 a continuous storage area 114, that address track 113 is read first of all, and it is determined based on the obtained address information whether to make a subsequent address track 113 a continuous storage area 114.

In the arrangement, in the signal processing and controlling unit 35, the illuminating-unit-controlling circuit 122 controls the illuminating unit so as to first read that address track 113 with which the process is started and obtain an address information reproduction signal of the address track 113. The address information reproduction signal is fed to the subsequent-address-track-recorded/unrecorded checking circuit 123.

Upon receiving the address information reproduction signal, the subsequent-address-track-recorded/unrecorded checking circuit 123 based on that signal determines whether to make a subsequent address track a continuous storage area 114.

If the subsequent address track 113 is to be continuously recorded, the subsequent-address-track-recorded/unrecorded checking circuit 123 transmits a subsequent-address-track-continuous-recording-instructing signal to the illuminating-unit-controlling circuit 122. Upon receiving the signal, the illuminating-unit-controlling circuit 122 controls the illuminating unit so as to make the subsequent address track 113 a continuous storage area 114.

Meanwhile, if the subsequent address track 113 is to be unrecorded, the subsequent-address-track-recorded/unrecorded checking circuit 123 feeds a subsequent address-track-normal-reading-instructing signal to the illuminating-unit-controlling circuit 122. Upon receiving the signal, the illuminating-unit-controlling circuit 122 controls the illuminating unit so as to read the address track 113 at a laser intensity which is incapable of recording data.

In the arrangement in FIG. 24, if the process of forming a continuous storage area 114 in the address area 104 is suspended before completion and resumed again thereafter, it is unknown whether the last address track 113 processed before the suspension is now a continuous storage area 114 or not. Therefore, adjacent address tracks 113 are possibly both continuous storage areas 114. In contrast, such situations are prevented from happing in the arrangement in FIG. 25, the address information is being always checked to determine whether to make the subsequent address track 113 continuously recorded or unrecorded at all.

Embodiment 5

Figure 26:
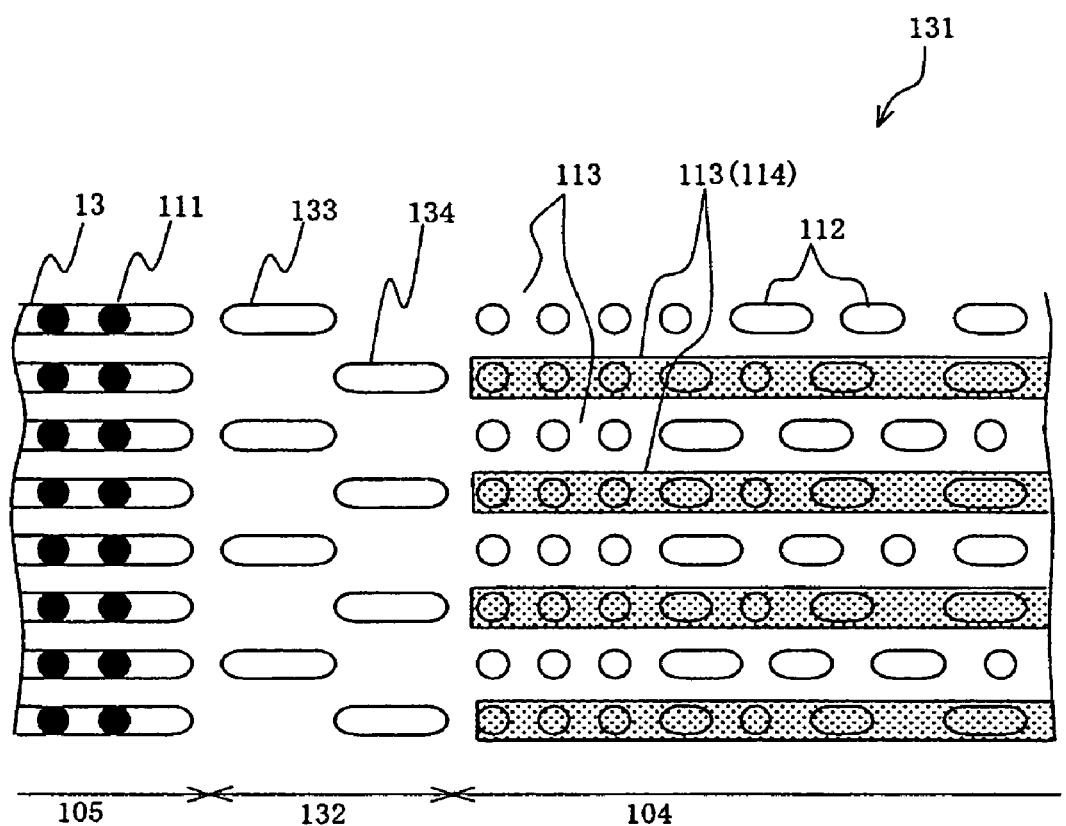
FIG. 26 is an enlarged view showing part of a recordable area, address area, and judgement mark area of an optical disk as an optical storage medium of still a further embodiment of the present invention.
Figure 27:
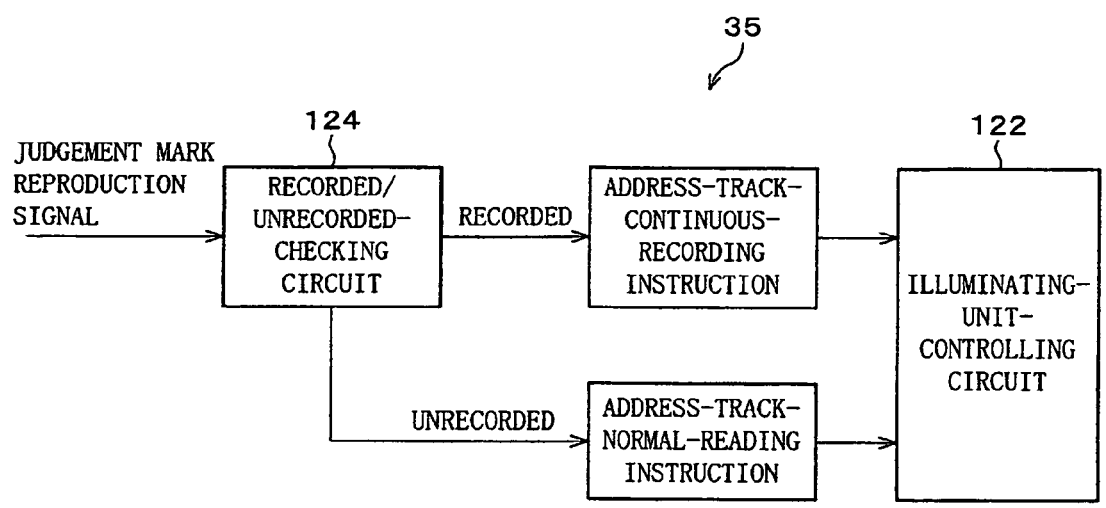
FIG. 27 is a block diagram showing the configuration of part of the signal processing and controlling unit by which a continuous storage area is formed based on a signal reproduced from the judgement mark area of the optical disk shown in FIG. 26.

The following will describe another embodiment of the present invention in reference to FIG. 26 and FIG. 27.

An optical disk 131 of the present embodiment has a judgement mark area 132 between a non-address area 105 and the head of an address area 104 as shown in FIG. 26 which is an enlarged view around the head of the address area 104.

In the judgement mark area 132 there are formed judgement pits (judgement marks) 133, 134 by which it is determined whether the address track 113 in the address area 104 is made a continuous storage area 114 or not. The judgement pits 133, 134 are located between the guiding groove 13 in a non-address area 105 and its succeeding address track 113 in the address area 104.

The judgement pits 133 show that the address tracks 113 are not to be made continuous storage areas 114 and are positioned in the judgement mark area 132 near the non-address area 105. Meanwhile, the judgement pits 134 show that the address tracks 113 are to be made continuous storage areas 114 and are positioned in the judgement mark area 132 near the address area 104. The judgement pits 133 exist at positions shifted along the tracks when compared to the judgement pits 134. In the present embodiment, as mentioned earlier, alternate address tracks 113 are made continuous storage area 114; therefore, the judgement pits 133, 134 appear alternately along a diameter of the optical disk 131.

To appropriately make the address tracks 113 in the address area 104 continuous storage areas 114 using the judgement pits 133, 134, the signal processing and controlling unit 35 in the optical-disk-read/write apparatus 31 is provided with a recorded/unrecorded-checking circuit 124 and the illuminating-unit-controlling circuit 122 as shown in FIG. 27.

In the arrangement, upon detecting a judgement mark reproduction signal which is a signal reproduced from the judgement pits 133, 134, the signal processing and controlling unit 35 feeds that signal to the recorded/unrecorded-checking circuit 124. Based on the judgement mark reproduction signal, the recorded/unrecorded-checking circuit 124 determines whether or not the address tracks 113 associated with the judgement pits 133, 134 are to be made continuous storage areas 114.

To make an address track 113 a continuous storage area 114, the recorded/unrecorded-checking circuit 124 feeds an address-track-continuous-recording-instructing signal to the illuminating-unit-controlling circuit 122. Upon receiving the signal, the illuminating-unit-controlling circuit 122 controls the illuminating unit so as to make the associated address track 113 a continuous storage area 114.

Meanwhile, to not make an address track 113 a continuous storage area 114 (to make the address track 13 unrecorded), the recorded/unrecorded-checking circuit 124 fees an address-track-normal-reading-instructing signal to the illuminating-unit-controlling circuit 122. Upon receiving the signal, the illuminating-unit-controlling circuit 122 controls the illuminating unit so as to read the address track 113 at a laser intensity which is incapable of recording data.

As mentioned in the foregoing, as to the optical disk 131 of the present embodiment, it can be immediately determined owning to the judgement pits 133, 134 in the judgement mark area 132 whether to make an address track 113 in the address area 104 a continuous storage area 114. Therefore, the processing velocity of the optical-disk-read/write apparatus 31 can be increased without reading the address track 113 in the address area 104, i.e., address information.

Embodiment 6

The following will describe another embodiment of the present invention in reference to FIGS. 28-31.

Figure 28:
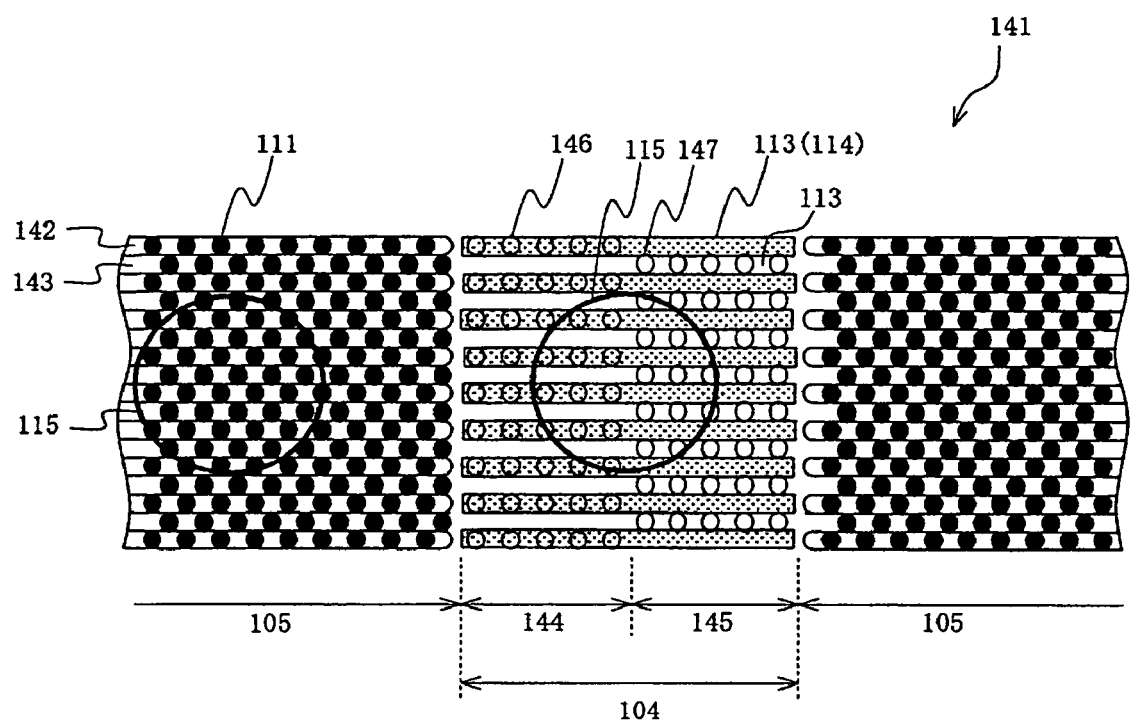
FIG. 28 is an enlarged view showing part of a recordable area and an address area of an optical disk as an optical storage medium of another embodiment of the present invention.

As shown in FIG. 28, an optical disk 141 of the present embodiment is readable/writeable on both a groove 142 and a land 143 which are formed alternately as viewed along a diameter of the optical disk 141 in the non-address area 105. The groove 142 and land 143 are spiral and recording marks 111 are formed on the groove 142 and land 143 by projection of a light beam 12.

The address area 104 is made up of a first address area 144 and a second address area 145 which are adjacent to each other along tracks. In the first address area 144 constituting a head part of the address area 104, there are formed first address pits 146 along imaginary lines extending from the groove 142. In the second address area 145 constituting the tail part of the address area 104, there are formed second address pits 147 along imaginary lines extending from the land 143. Relatively shifting the positions of the first address area 144 and the second address area 145 along the tracks so that they do not overlap in a direction normal to the tracks eliminates crosstalk in signals reproduced from the first and second address pits 146, 147. The positions of the first address area 144 and the second address area 145 may be reversed.

In addition, some of the address tracks 113 in the address area 104 extend from the groove 142, while the others extend from the land 143. In the present embodiment, those address track 113 extending from the groove 142 are made continuous storage areas 114. In addition, the address track 113 is formed in both the first address area 144 and the second address area 145. Those address tracks 113 extending from the groove 142 have the first address pits 146 in the first address area 144, and those extending from the land 143 have the second address pits 147 in the second address area 145.

As mentioned in the foregoing, as to an optical disk 141 of the present embodiment, continuous storage areas 114 are formed in those address tracks 113 extending from the groove 142, that is, in the first address area 144 and the second address area 145 of the address track 113. Therefore, like the foregoing optical disks 101, 131, to read/write the second storage layer 8, the sum of the areas of the recording marks 111 included in the area of the beam spot 115 in the non-address area 105 on the first storage layer 10 is substantially equal to the sum of the continuous storage areas 114 included in the area of the beam spot 115 in the address area 104.

Thus, the intensity of the light beam 12f projected onto the second storage layer 8 after passing through an address area 104 on the first storage layer 10 can be made substantially equal to the intensity of the light beam 12e projected onto the second storage layer 8 after passing through the non-address area 105 on the first storage layer 10. As a result, as to the optical disk 141 employing a lumped address scheme, the light beam intensity on the second storage layer 8 can be retained at a substantially constant value regardless of whether the light is the light beam 12e passing through the non-address area 105 on the first storage layer 10 or the light beam 12f passing through the address area 104 on the first storage layer 10, enabling stable and desirable read/write on the second storage layer 8.

In the present embodiment, the continuous storage area 114 is supposed to be formed in those address tracks 113 which extend from the groove 142. The present embodiment is not limited by this: the continuous storage area 114 may be formed in those address tracks 113 which extend from the land 143.

In addition, as in previous cases, the continuous storage area 114 may be formed prior to the shipment of the optical disk 141 or by using the optical-disk-read/write apparatus 31 after shipment. If the optical-disk-read/write apparatus 31 is used to from an continuous storage area 114, the aforementioned methods are all applicable.

Figure 29:
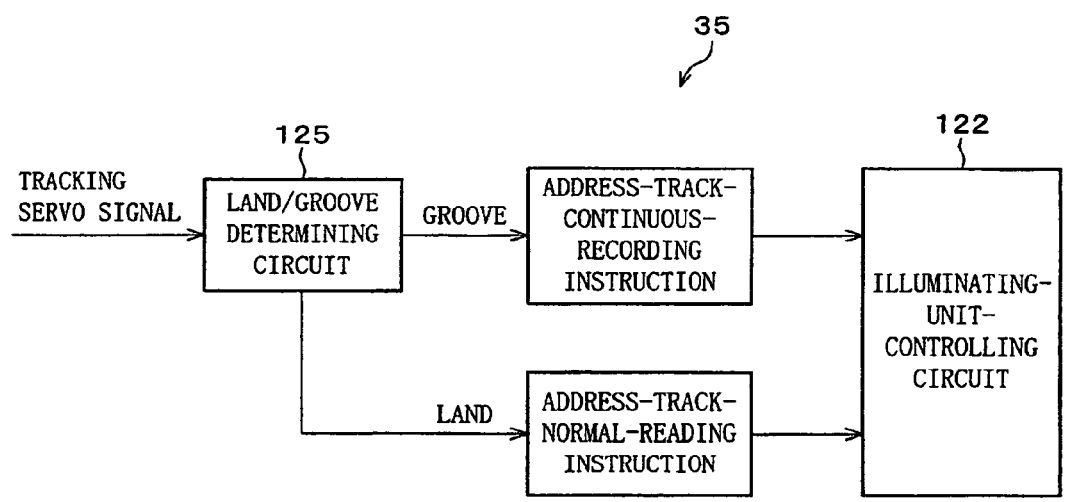
FIG. 29 is a block diagram showing the configuration of part of the signal processing and controlling unit by which a continuous storage area is formed on the optical disk shown in FIG. 28 based on a tracking servo signal.

Further, to form a continuous storage area 114, the signal processing and controlling unit 35 may have a land/groove determining circuit 125 and the illuminating-unit-controlling circuit 122 as shown in FIG. 29. In this arrangement, for example, it is determined whether the track currently being scanned is the groove 142 or the land 143, and those address tracks 113 which extend from either the groove 142 or the land 143 in the address area 104 are made continuous storage areas 114 according to a result of the determination.

In the arrangement, the land/groove determining circuit 125 determines whether the track currently being scanned is the groove 142 or the land 143 from a tracking servo signal or an address information reproduction signal. If the determination turns out that it is the groove 142, the land/groove determining circuit 125 feeds an address-track-continuous-recording-instructing signal to the illuminating-unit-controlling circuit 122 to make an address track 113 a continuous storage area 114. Upon receiving the signal, the illuminating-unit-controlling circuit 122 controls the illuminating unit so as to make an address track 113 which extends from the groove 142 a continuous storage area 114.

Meanwhile, if the determination turns out that it is the land 143, the recorded/unrecorded-checking circuit 124 feeds an address-track-normal-reading-instructing signal to the illuminating-unit-controlling circuit 122. Upon receiving the signal, the illuminating-unit-controlling circuit 122 controls the illuminating unit so as to read the address track 113 at a laser intensity which is incapable of recording data.

Figure 30:
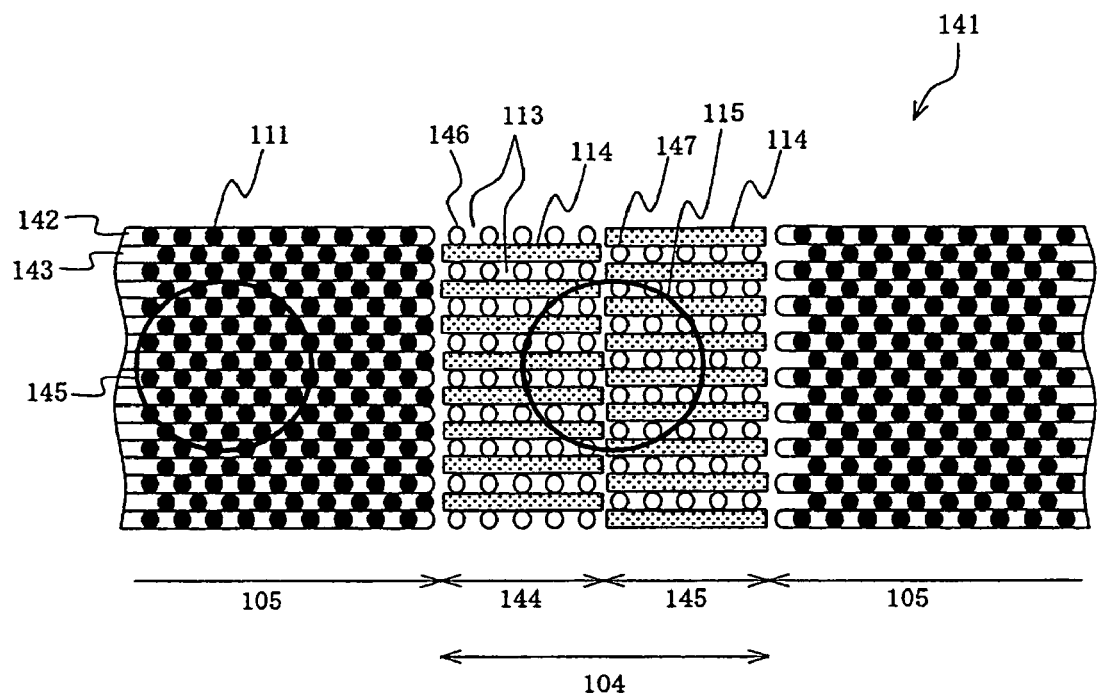
FIG. 30 is an enlarged view showing part of a recordable area and an address area of an optical disk as an optical storage medium of another embodiment of the present invention.

In addition, as to the optical disk 141, as shown in FIG. 30, the continuous storage area 114 may be formed in the second address area 145 in those address tracks 113 which extend from the groove 142, in the first address area 144 in those address tracks 113 which extend from the land 143, and in each address track 113. The first address area 144 and the second address area 145 may be reversed in position. Further, the continuous storage area 114 may be formed only at places where the first address pit 146 and the second address pit 147 are provided, conversely to the formation places in FIG. 30.

In the arrangement, like the foregoing cases, the intensity of the light beam 12f projected onto the second storage layer 8 after passing through an address area 104 on the first storage layer 10 can be made substantially equal to the intensity of the light beam 12e projected onto the second storage layer 8 after passing through the non-address area 105 on the first storage layer 10. As a result, as to an arrangement employing a lumped address scheme, the light beam intensity on the second storage layer 8 can be retained at a substantially constant value, enabling stable and desirable read/write on the second storage layer 8.

Likewise, the continuous storage area 114 may be formed in advance, before the optical disk 141 is shipped or by using the optical-disk-read/write apparatus 31 when the optical disk 141 is loaded into the optical-disk-read/write apparatus 31. The aforementioned methods are all applicable in these cases. For example, the continuous storage area 114 may be formed based on reproduced address information or whether the track being scanned is the groove 142 or the land 143.

Figure 31:
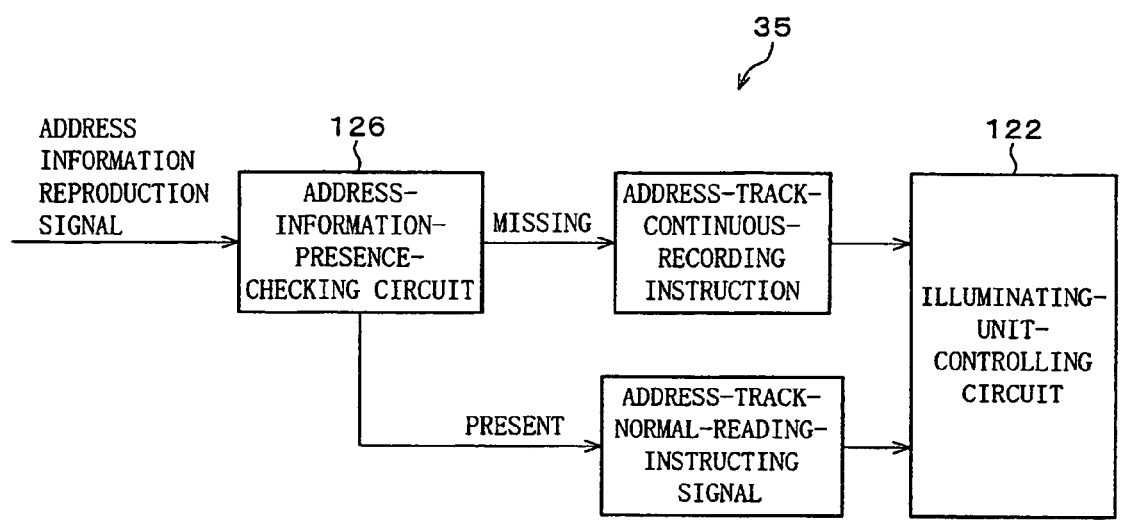
FIG. 31 is a block diagram showing the configuration of part of the signal processing and controlling unit by which a continuous storage area is formed on the optical disk shown in FIG. 30 based on an address information reproduction signal.

To implement the actions, the signal processing and controlling unit 35 in the optical-disk-read/write apparatus 31 is equipped with, for example, an address-information-presence-checking circuit 126 and the illuminating-unit-controlling circuit 122 as shown in FIG. 31.

In the arrangement, the signal processing and controlling unit 35 feeds an address information signal reproduced from the address area 104 to the address-information-presence-checking circuit 126 where the address-information-presence-checking circuit 126 determines whether the input signal is carrying address information.

If the determination turns out that no address information is present, the address-information-presence-checking circuit 126 feeds an address-track-continuous-recording-instructing signal to the illuminating-unit-controlling circuit 122 to make an area where address information is missing for the address track 113, that is, an area of the first address area 144 or the second address area 145, a continuous storage area 114. Upon receiving that signal, the illuminating-unit-controlling circuit 122 controls the illuminating unit so as to form a continuous storage area 114 in an area where there is no address information for the address track 113.

Meanwhile, if address information is present, the address-information-presence-checking circuit 126 controls the illuminating unit and reads the address track 113 at a laser intensity which is incapable of recording data, so that no continuous storage area 114 is formed in an area where address information is present for the address track 113.

In this and foregoing embodiments, if the optical-disk-read/write apparatus 31 is used to form the continuous storage area 114 on an optical disk, the cost of the optical disk can be reduced by reducing the manufacturing steps of the optical disk.

In addition, in this and foregoing embodiments, the optical disks were supposed to be high-to-low phase change types of storage media such that the interval areas between recording marks 111 exhibit a higher reflectance, i.e., a lower transmittance, than the recording mark 111 in the first storage layer 10 and the second storage layer 8. The foregoing arrangements are applicable even when the optical disks are low-to-high phase change types of storage media such that the interval areas exhibit a lower reflectance, i.e., a higher transmittance, than the recording marks 111.

Embodiment 7

Figure 62:
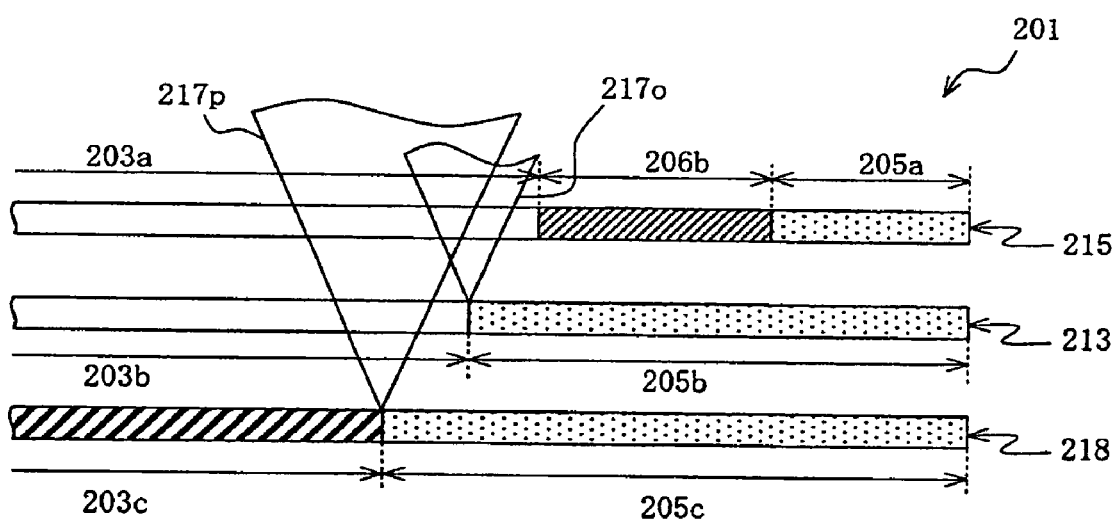
FIG. 62 is an enlarged vertical cross-sectional view showing the structure of a part of the first storage layer which has a prepit area and the second and the third storage layers which do not, in an optical disk of another embodiment of the present invention.
Figure 63:
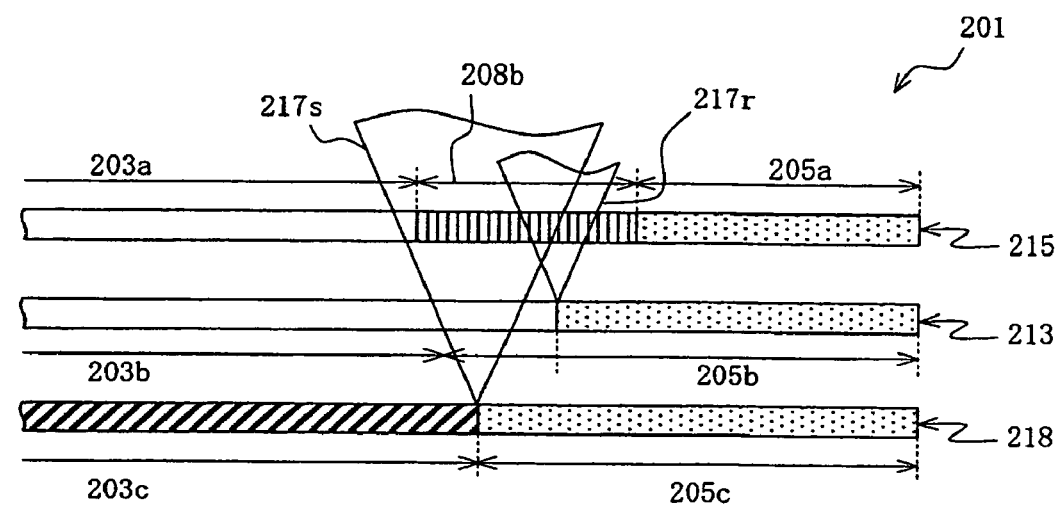
FIG. 63 is an enlarged vertical cross-sectional view showing the structure of a part of the optical disk shown in FIG. 62, where the prepit area is replaced by a prepit area in which is there provided a continuous storage area.
Figure 64:
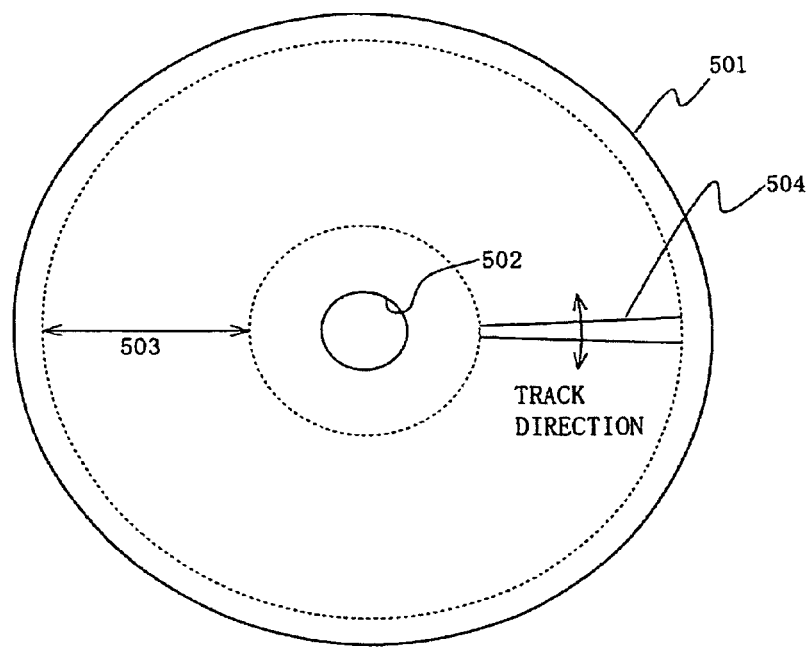
FIG. 64 is a plan view showing a conventional optical disk.
Figure 65:
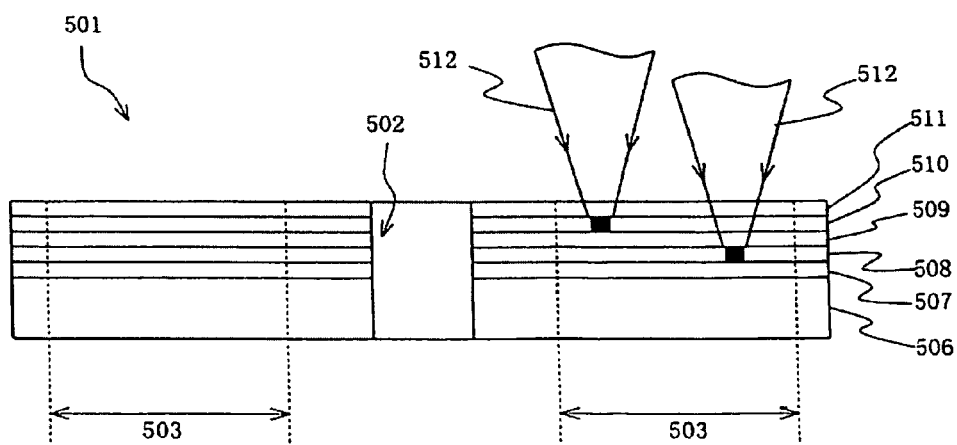
FIG. 65 is a vertical cross-sectional view showing the structure of the optical disk shown in FIG. 64.
Figure 66:
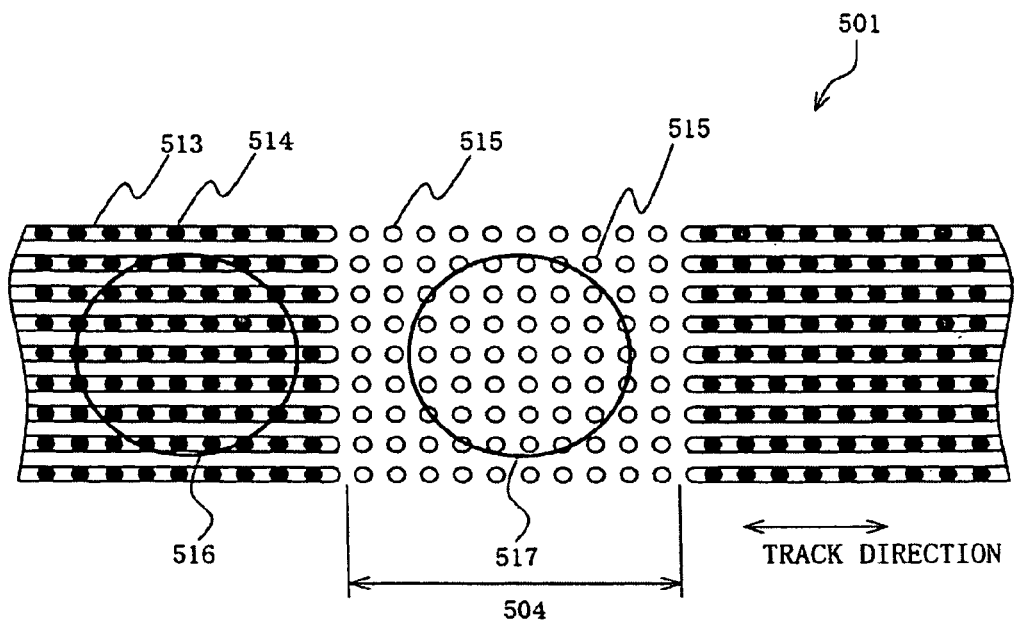
FIG. 66 is an enlarged view showing a part of a recordable area and an address area of the optical disk shown in FIG. 64.
Figure 67:
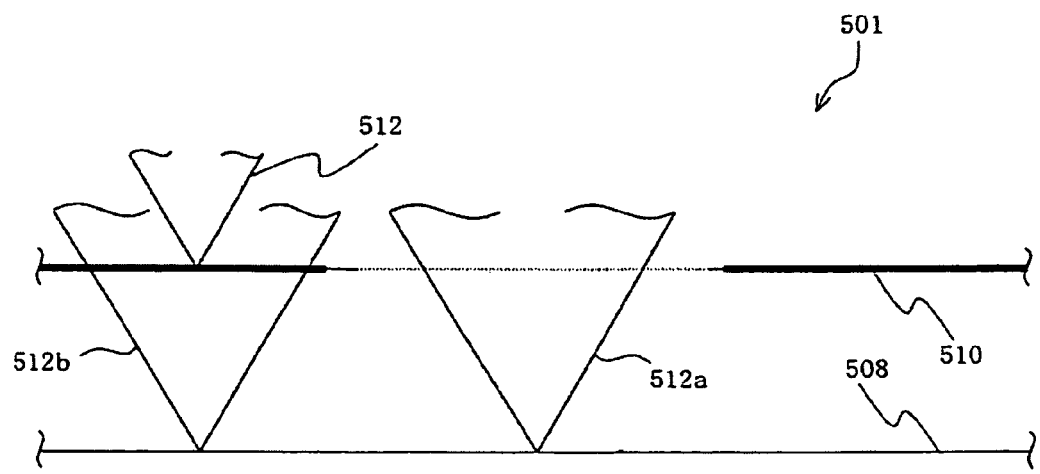
FIG. 67 depicts the readout and write in a recordable area and an address area of the second storage layer shown in FIG. 66.
Figure 68:
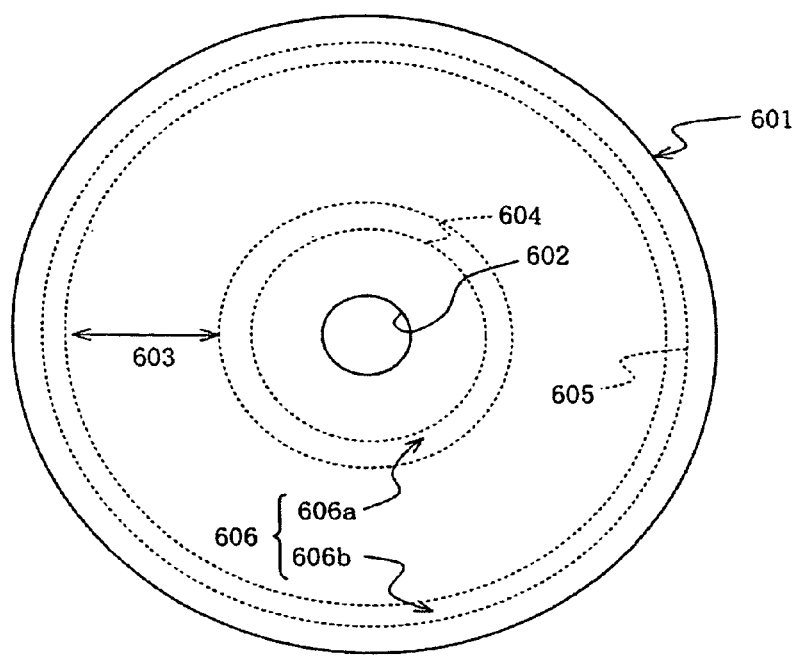
FIG. 68 is a plan view showing the structure of another conventional optical disk.
Figure 69:
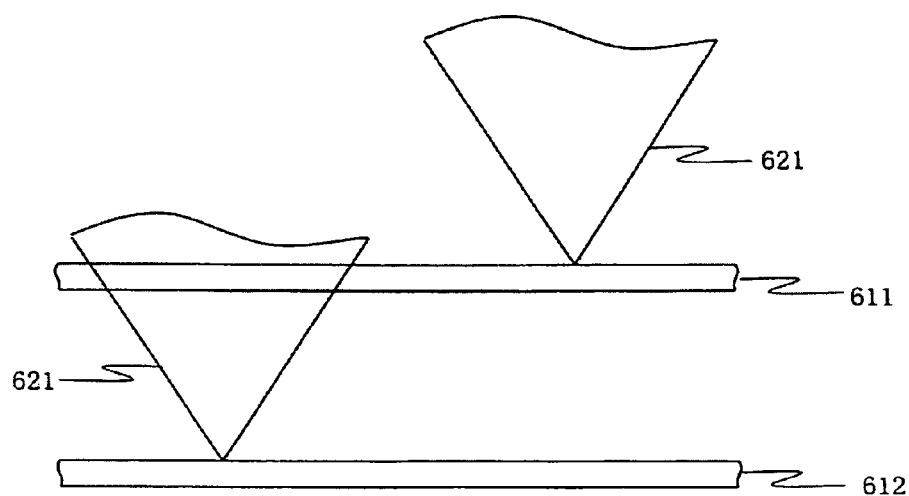
FIG. 69 is an enlarge vertical cross-sectional view showing light beams being focused on the first and second storage layer in the optical disk shown in FIG. 68.

The following will describe an embodiment of the present invention in reference to FIG. 62 and FIG. 63.

Figure 35:
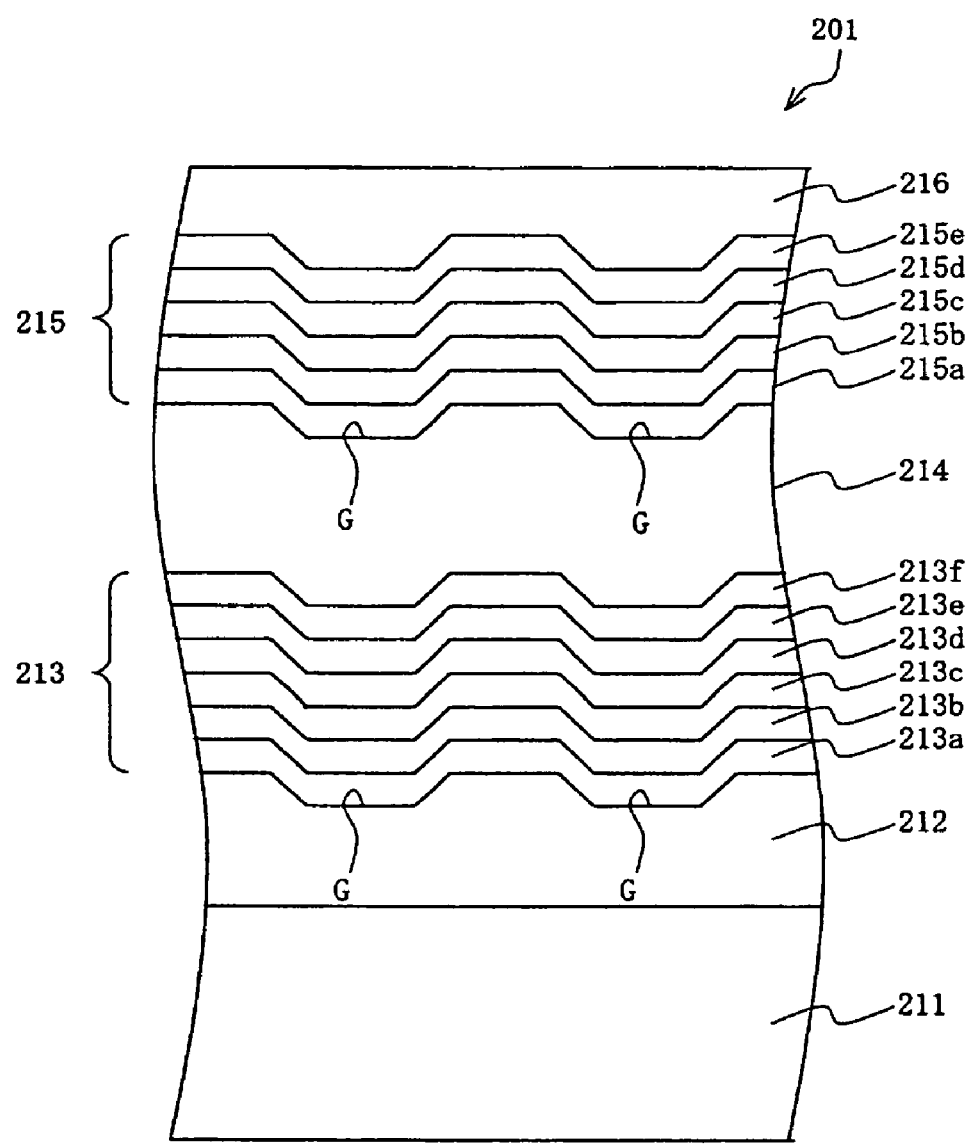
FIG. 35 is an enlarged vertical cross-sectional view showing the structure of a major part in FIG. 34.
Figure 36:
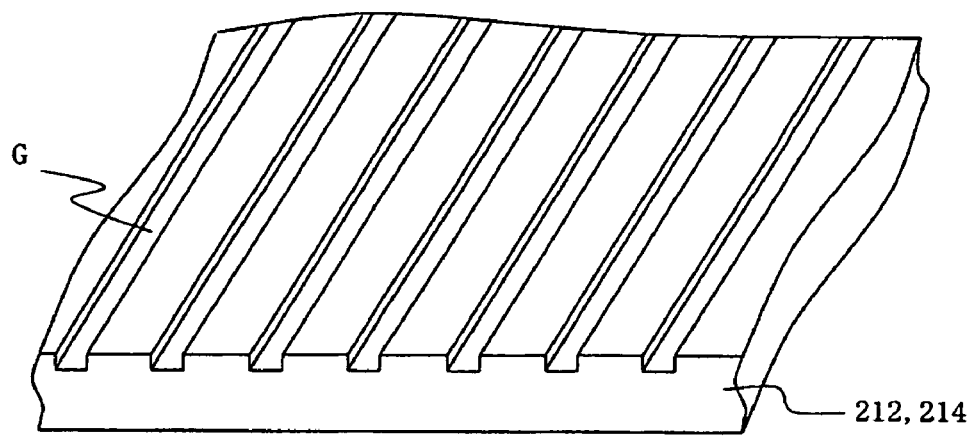
FIG. 36 is a perspective view showing the structure of a guiding-groove-and-pits-formed layer and a part of a guiding-groove-and-pits-formed intermediate layer where a guiding groove is formed on the optical disk.

Referring to FIG. 63, an optical disk (optical storage medium) 201 of the present embodiment has a center hole 202 at its center and a recordable area 203 outside the center hole 202 in relation to a diameter. As shown in FIG. 35 and FIG. 36, in the recordable area 203, a spiral (or concentric) read/write guiding groove G is formed in a guiding-groove-and-pits-formed layer 212 and a guiding-groove-and-pits-formed intermediate layer 214 along which information can be read/written. In addition, an innermost part 204 is formed around the center hole 202 and an outermost part 205 is formed near the circumference of the optical disk 201.

Figure 37:
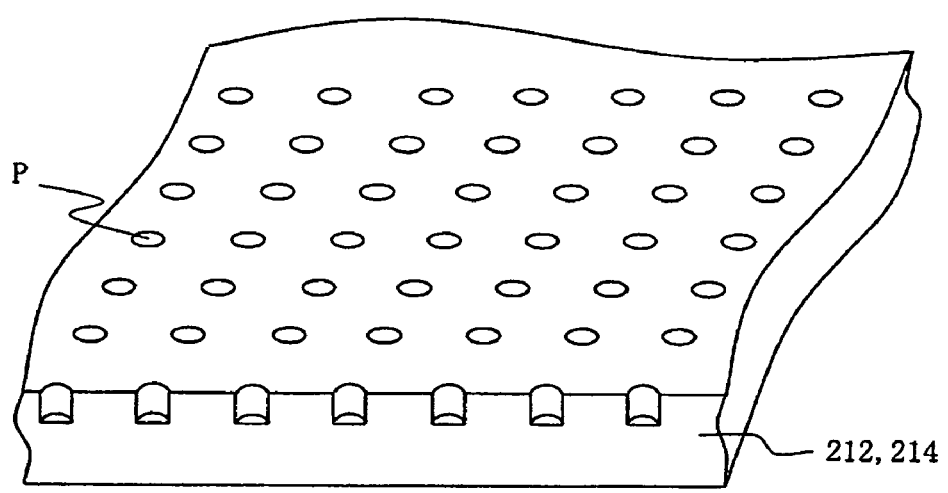
FIG. 37 is a perspective view showing the structure of a guiding-groove-and-pits-formed layer and a part of a guiding-groove-and-pits-formed intermediate layer where pits are formed on the optical disk.

The optical disk 201 has prepit areas 206 made up of an inner prepit area 206a and an outer prepit area 206b. The inner prepit area 206a is provided adjacently outside the innermost part 204, and the outer prepit area 206b is provided adjacently inside the outermost part 205. As shown in FIG. 37, in the prepit area 206, pits P are arranged forming a spiral (or concentric circles) in the guiding-groove-and-pits-formed layer 212 and the guiding-groove-and-pits-formed intermediate layer 214. Prepit information is read from the pit row of the pits P. In the pit row, typically, the writing power, reading power, and other kinds of information on the optical disk 201 is prerecorded in the concave or convex form (not shown) of the pits P.

Figure 34:
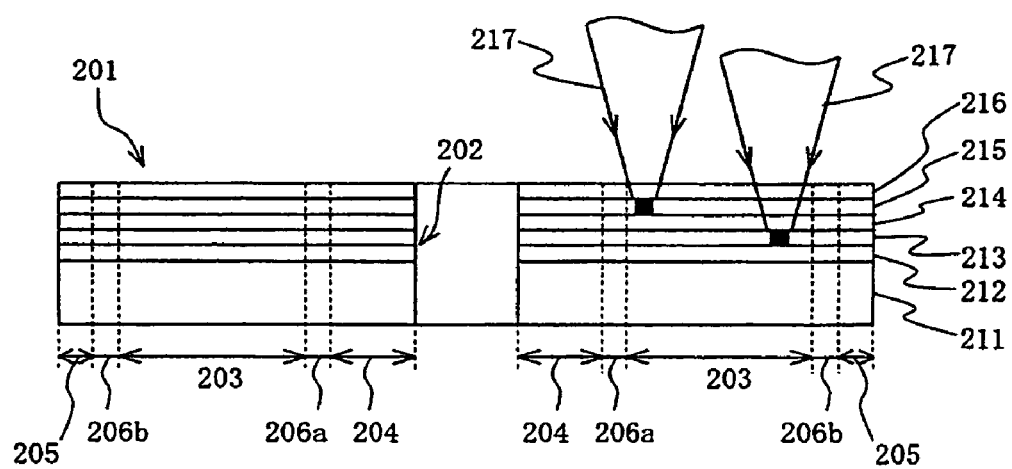
FIG. 34 is a vertical cross-sectional view showing the structure of those types of optical disks which light enters on their surface-coating layer sides, among the foregoing optical disks.

As shown in FIG. 34 which is a vertical cross-sectional view of the optical disk 201, the optical disk 201 is structured from the guiding-groove-and-pits-formed layer 212, a second storage layer (last data storage layer) 213, the guiding-groove-and-pits-formed intermediate layer 214, a first storage layer (light-striking-side storage layer) 215, and a surface-coating layer 216, with the layers sequentially stacked on a disk substrate 211. To read/write the first storage layer 215 and the second storage layer 213 on the optical disk 201, a light beam 217 projected from one side of the disk, i.e., the side on which the surface-coating layer 216 exists, is concentrated on the first and second storage layers 215, 213.

FIG. 35 shows the arrangement of the optical disk 201 in more detail. In FIG. 35, the disk substrate 211 is made of, for example, a 1.2-mm thick, transparent polycarbonate substrate. The guiding-groove-and-pits-formed layer 212 is made of, for example, a 20-micron thick, ultraviolet-ray-setting resin layer and formed, for example, by a pattern transfer technology termed 2P method. On one of the surfaces of the guiding-groove-and-pits-formed layer 212 which is closer to the second storage layer 213, the guiding groove G is provided in the recordable area 203 and the pits P (not shown in FIG. 35) are provided in the prepit area 206.

The second storage layer 213 includes, for example, an AlTi-alloy reflective film 213a, a ZnS-SiO$_2$ interference film 213b, a SiN protective film 213c, a GeSbTe phase change recording layer 213d, a SiN protective film 213e, and a ZnS-SiO$_2$ interference film 213f. These films are formed as they are sequentially deposited on the guiding-groove-and-pits-formed layer 212 by means of sputtering.

Like the guiding-groove-and-pits-formed layer 212, the guiding-groove-and-pits-formed intermediate layer 214 is made of, for example, a 20-micron thick, ultraviolet-ray-setting resin layer and formed by, for example, a pattern transfer technology termed 2P method. On one of the surfaces of the guiding-groove-and-pits-formed intermediate layer 214 which is closer to the first storage layer 215, the guiding groove G is provided in the recordable area 203 and the pits P (not shown in FIG. 35) are provided in the prepit area 206.

Like the second storage layer 213, the first storage layer 215 includes, for example, a ZnS-SiO$_2$ interference film 215a, a SiN protective film 215b, a GeSbTe phase change recording layer 215c, a SiN protective film 215d and a ZnS-SiO$_2$ interference film 215e. The first storage layer 215 is formed by sequentially depositing these films on the guiding-groove-and-pits-formed intermediate layer 214 by means of sputtering.

The surface-coating layer 216 is made of, for example, a 80-micron thick, ultraviolet-ray-setting resin layer, and formed by spin coating the first storage layer 215 with an ultraviolet-ray-setting resin and setting the resin by the projection of ultraviolet rays.

The optical disk substrate 211 is, as mentioned in the foregoing, a substrate made of a transparent polycarbonate. However, when a light beam 217 is incident to the surface-coating layer 216 as is the case with the optical disk 201 of the present embodiment, the disk substrate 211 does not need be transparent, and may be an opaque, metallic substrate.

In addition, the optical disk 201 of the present embodiment is provided with the guiding-groove-and-pits-formed layer 212 and the guiding-groove-and-pits-formed intermediate layer 214 which are formed by 2P method and which have the guiding groove G and the pits P. However, a disk substrate 211 provided on its surface directly with a guiding groove G and pits P may be formed by, for example, injection molding. The structure including the disk substrate 211 does not require the guiding-groove-and-pits-formed layer 212 and the guiding-groove-and-pits-formed intermediate layer 214.

In addition, although the surface-coating layer 216 is formed on the first storage layer 215 by spin coating, the layer 216 may be provided instead in the form of uniformly thick, transparent sheet pasted on the first storage layer 215.

Figure 38:
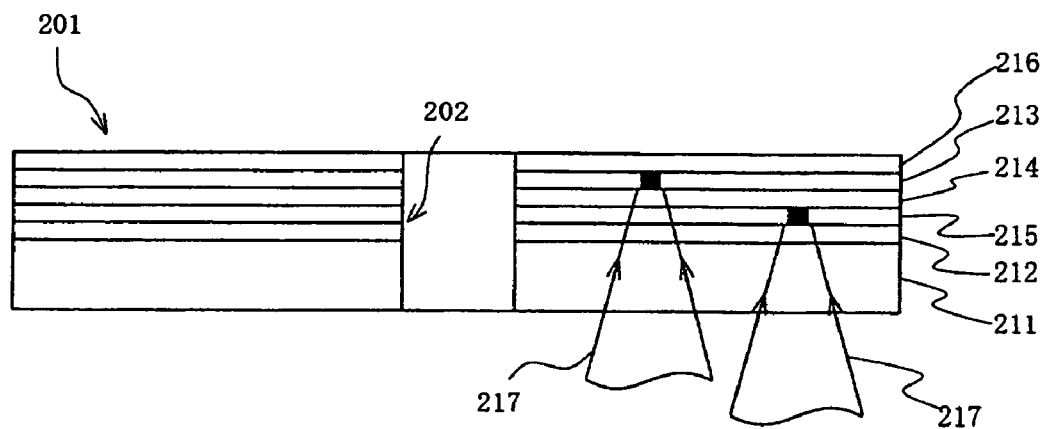
FIG. 38 is a vertical cross-sectional view showing the structure of those types of optical disks which light enters on their disk substrate sides, among the foregoing optical disks.

In addition, the optical disk 201 has a structure including the guiding-groove-and-pits-formed layer 212, the second storage layer 213, the guiding-groove-and-pits-formed intermediate layer 214, the first storage layer 215, and the surface-coating layer 216 sequentially stacked on the optical disk substrate 211. This is not the only option available. For example, the optical disk 201 may be structured so that it includes the guiding-groove-and-pits-formed layer 212, the first storage layer 215, the guiding-groove-and-pits-formed intermediate layer 214, the second storage layer 213, and the surface-coating layer 216 sequentially stacked on the optical disk substrate 211, with the light beam 217 projected onto the optical disk substrate 211 as shown in FIG. 38. In this structure, the films constituting the first storage layer 215 and the second storage layer 213 are in the reverse order to those shown in FIG. 35.

An optical-disk-read/write apparatus (optical read/write apparatus) which reads/writes on the optical disk 201 was, as with the optical disk 1, described in reference to FIG. 5.

In the present embodiment, the optical-disk-read/write apparatus 31 reads from, or writes into, the second storage layer 213 after the recordable area 203 of the first storage layer 215 is fully recorded. The operations in this case are carried out under the control of the signal processing and controlling unit 35 on the optical system unit (illuminating means) 34 and the slide driving unit (illuminating means).

In the foregoing situation, the following will describe how the optical-disk-read/write apparatus 31 reads/writes on the optical disk 201, supposing that data is recorded in the first storage layer 215 of the optical disk 201, starting with the inner prepit area 206a in the recordable area 203 until data fills part of the recordable area 203 of the first storage layer 215, and then the operation moves to reading/writing in the second storage layer 213. It is also supposed that the optical disk 201 is a high-to-low medium such that the interval area is more reflective than the recording mark area and data is recorded by phase change.

Figure 39:
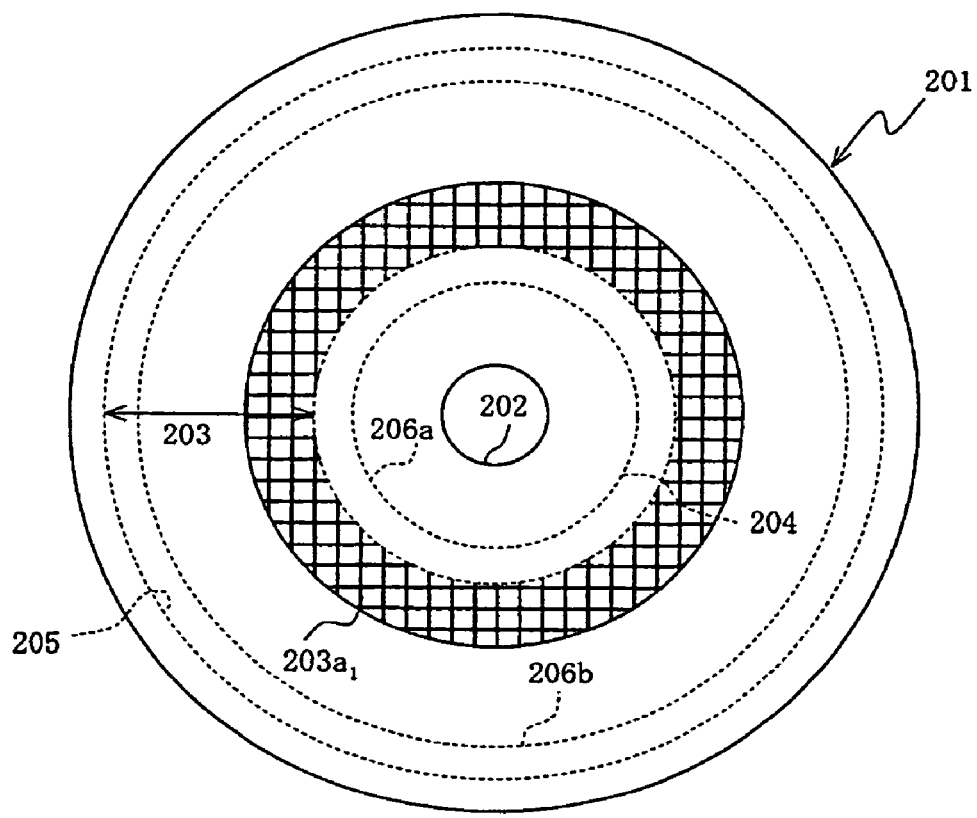
FIG. 39 is a plan view showing the first storage layer of the optical disk shown in FIG. 34 is partly recorded.
Figure 40:
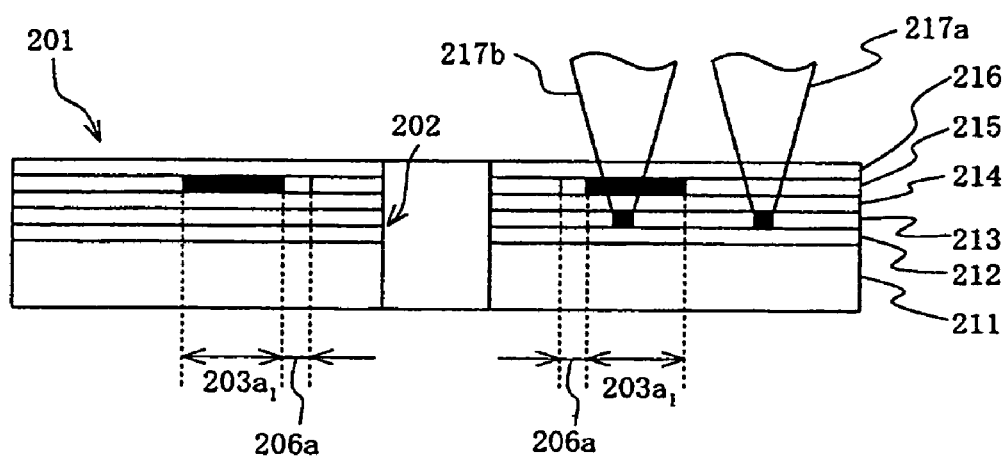
FIG. 40 is a vertical cross-sectional view showing light beams being transmitted through a recorded part and a non-recorded part of the optical disk shown in FIG. 39 before focused on the second storage layer.

As a result of recording in the first storage layer 215, as shown in FIG. 39 and FIG. 40, a recorded part 203a1 (shown by hatched lines) is produced covering the inner prepit area 206a of the recordable area 203 of the first storage layer 215 up to partway of the recordable area 203.

Here, the first storage layer 215 is more optically transmissive than in the recorded part 203a1 than other areas. As a result, the light beam 217 projected on the second storage layer 213 is more intense when it is concentrated on the second storage layer 213 if the light beam 217 (light beam 217b) has passed through the recorded part 203a1 than if the light beam 217 (light beam 217a) has passed through an area other than the recorded part 203a1 (non-recorded area). In other words, in recording data into the second storage layer 213, the light beam 217 varies in intensity when it reaches the second storage layer 213 after passing through the first storage layer 215, depending on whether it has come through the recorded part 203a1. In this case, to record data into the second storage layer 213, a complex write system is required which can vary the light beam 217 in intensity depending on whether there are any records stored in the first storage layer 215.

A similar difference develops in intensity of the light beam 217, and a similarly complex read system is required when data is read from the second storage layer 213, because the return light reflected off the second storage layer 213 changes in quantity depending on whether the light beam 217 has passed through the recorded part 203a1 of the first storage layer 215.

Figure 41:
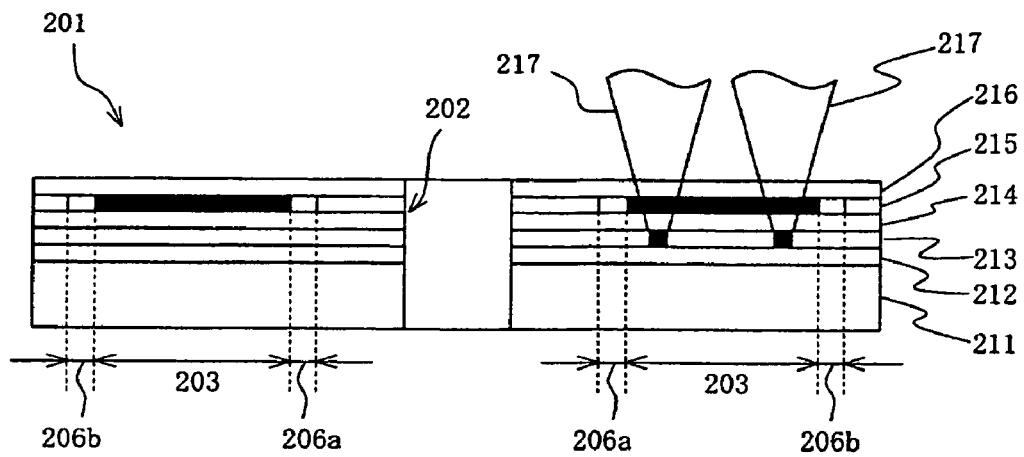
FIG. 41 is a vertical cross-sectional view showing light beams transmitted through the first storage layer which is fully recorded before being focused on the second storage layer, in the optical disk shown in FIG. 39.

Accordingly, in the optical-disk-read/write apparatus 31 of the present embodiment, as shown in FIG. 41, data is read/write from/into the second storage layer 213 only after the recordable area 203 of the first storage layer 215 is fully recorded. In other words, to record on the optical disk 201, the optical-disk-read/write apparatus 31 first writes data in the first storage layer 215, and only after the recordable area 203 of the first storage layer 215 is recorded to its full capacity, starts writing or reading data into/from the second storage layer 213.

The operation ensures that in the read/write operation as to the second storage layer 213, the light beam 217 projected on the second storage layer 213 always passes through the fully recorded, first storage layer 215 before entering the second storage layer 213. In both read and write operations, the light beam 217 has a constant intensity when it reaches the second storage layer 213, which eliminates the need to use a complex read/write system to control the intensity of the light beam 217. Stable read/write operations are thus achieved.

Figure 32:
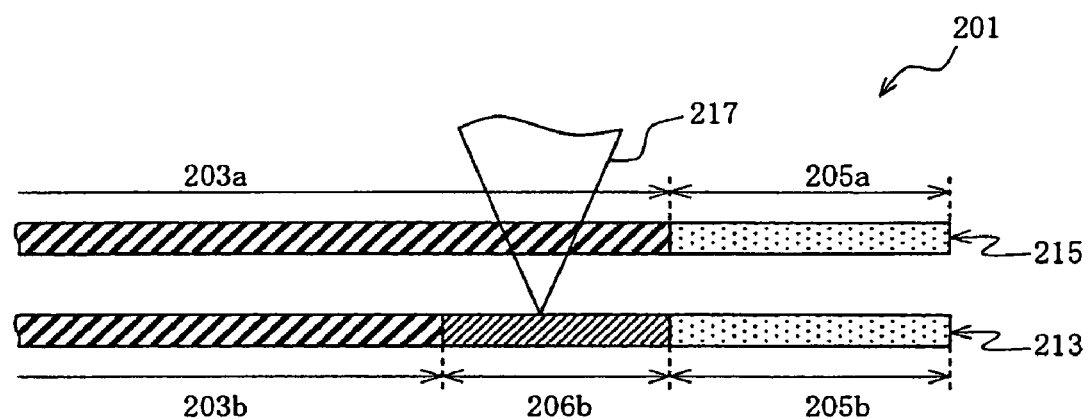
FIG. 32 is an enlarged vertical cross-sectional view showing the structure of a part of the first storage layer and the second storage layer which has a prepit area in an optical disk of another embodiment of the present invention.
Figure 33:
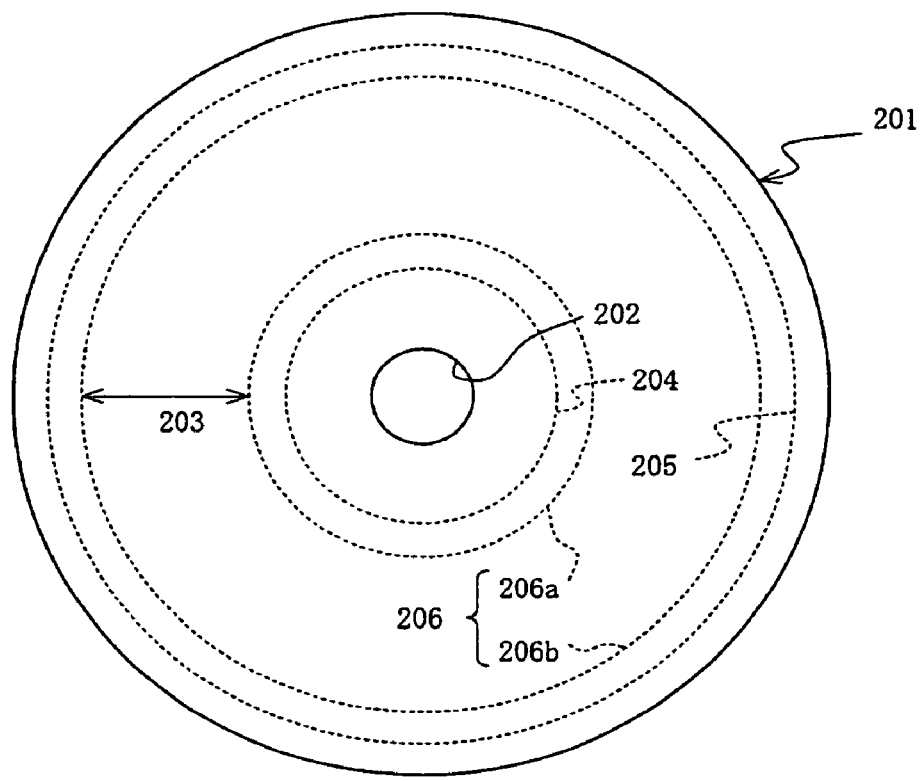
FIG. 33 is a plan view showing common features in the structure of optical disks of another embodiment of the present invention.

FIG. 32 shows the first storage layer 215 and the second storage layer 213 near the periphery of the optical disk 201 in their initial states. On the optical disk 201, the first storage layer 215 has an unrecorded recordable area 203a and a blank area 205a constituting the outermost part 205, and the second storage layer 213 has an unrecorded recordable area 203b, an outer prepit area 206a, and a blank area 205b constituting the outermost part 205. In this situation, the blank areas 205a, 205b are those areas where no guiding groove G or pits P are formed. The innermost part 204 of the first and second storage layers 215, 213 also has similar blank areas (not shown).

The optical disk 201 in this state exhibits uniform transmittance, since the recordable area 203a of the first storage layer 215 is unrecorded. Therefore, when prepit information is reproduced by concentrating the light beam 217 on the outer prepit area 206b of the second storage layer 213, the intensity of the reproduction signal does not vary. In addition, since the prepit area 206 is provided to the second storage layer 213, the second storage layer 213 is stably readable/writeable without being affected by the prepit area 206.

Figure 42:
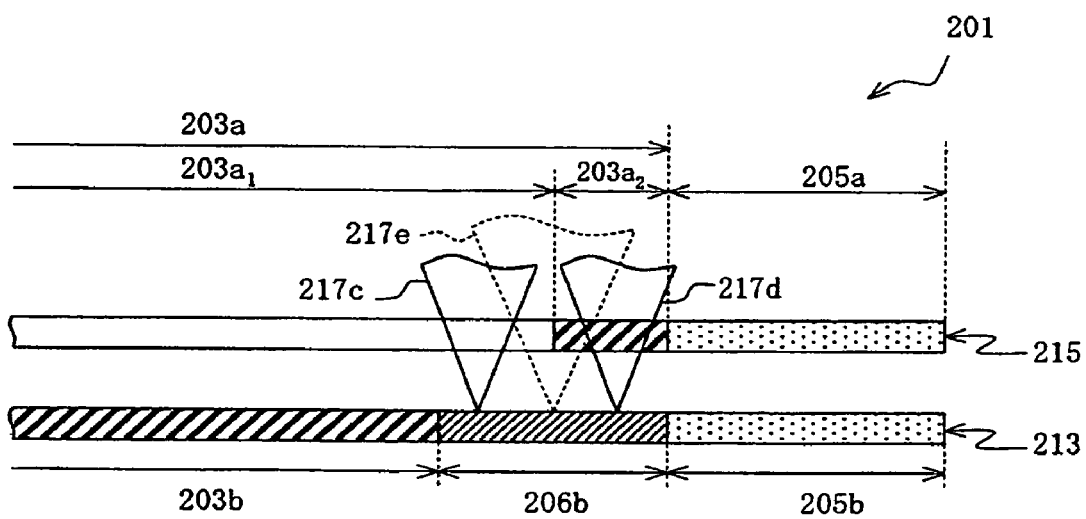
FIG. 42 is an enlarged vertical cross-sectional view showing a part of the optical disk shown in FIG. 39, where data is recorded on a part of a recordable area of the first storage layer, and light beams are focused on prepits on the second storage layer.
Figure 43:
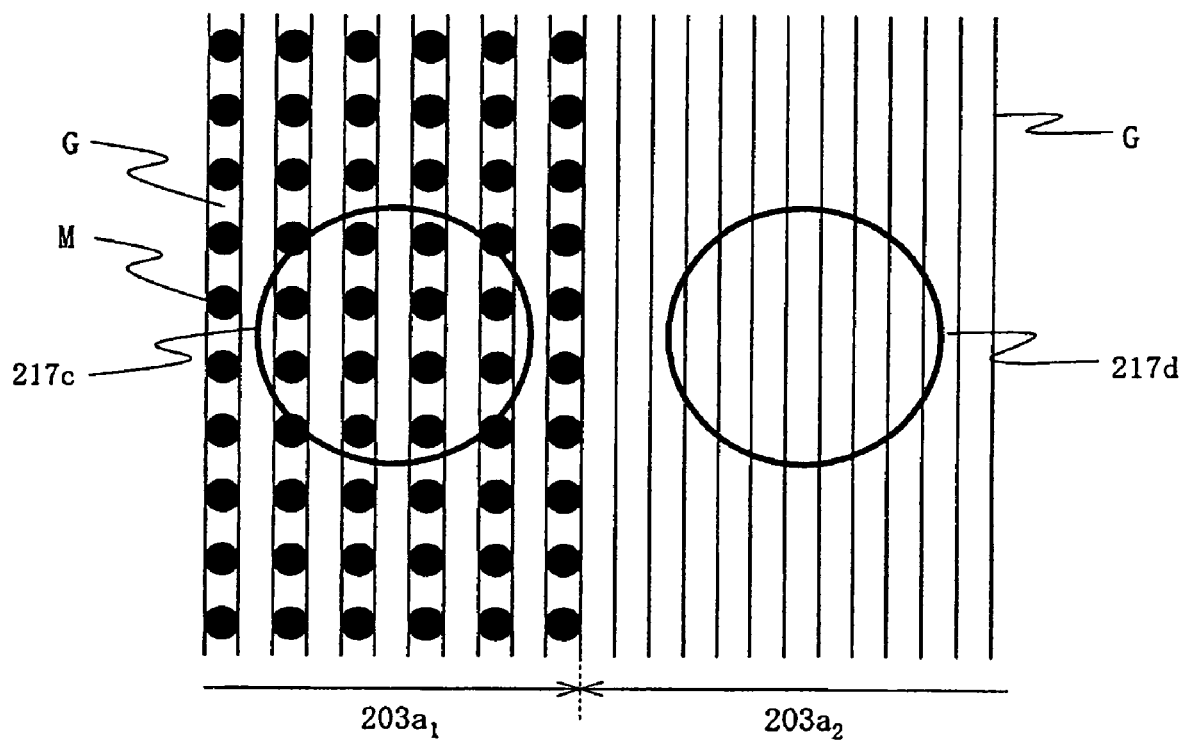
FIG. 43 is an enlarged plan view of FIG. 42.

Next, as shown in FIG. 42, writing in a part of the unrecorded recordable area 203a produces a recorded part 203a1 and leaves the other part as a non-recorded part 203a2. In this case, as shown in FIG. 43, in the recorded part 203a1, recording marks M with reduced transmittance are formed in the guiding groove G. In the non-recorded part 203a2, no recording marks M are formed and the transmittance remains unchanged. Therefore, the light beam 217c having passed through the recorded part 203a1 differs in intensity from the light beam 217d having passed through the non-recorded part 203a2. The reproduction signal of prepit information therefore differs in intensity between the light beams 217c and 217d.

In addition, as to the optical disk 201, typically, it is impossible to completely match the center of the spiral guiding groove G on the first storage layer 215 and the center of the spiral pit row on the second storage layer 213. Therefore, when the light beam 217e illuminates both a part of the recorded part 203a1 and a part of the non-recorded part 203a2 before being concentrated on the outer prepit area 206b of the second storage layer 213 as shown in FIG. 42, the boundary between the recorded part 203a1 and the non-recorded part 203a2 moves in the light beam 217e with the rotation of the optical disk.

Figure 44:
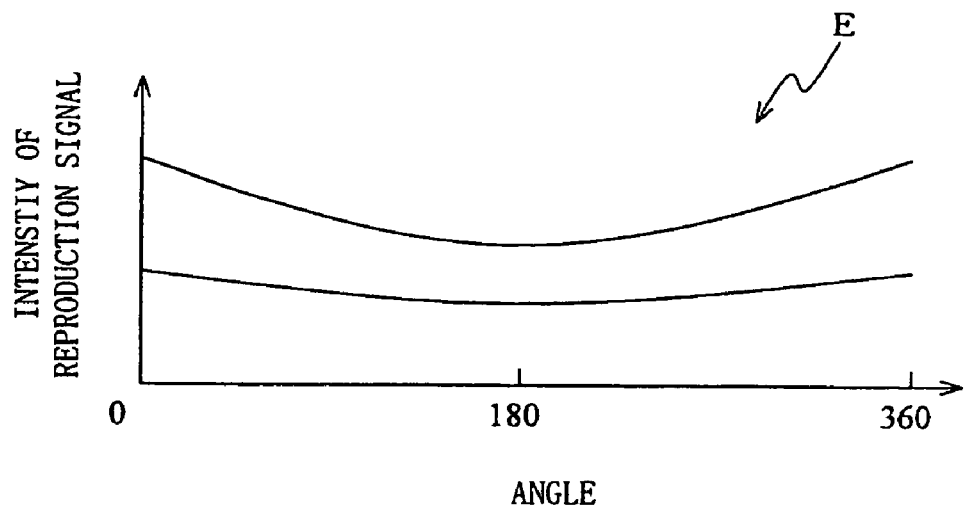
FIG. 44 is a graph showing, under the conditions illustrated in FIG. 42, the relationship between the angular position of an optical disk and the intensity (envelope) of a reproduction signal of prepit information when a light beam is projected partly covering both a recorded part and a non-recorded part in a recordable area of the first storage layer.
Figure 45:
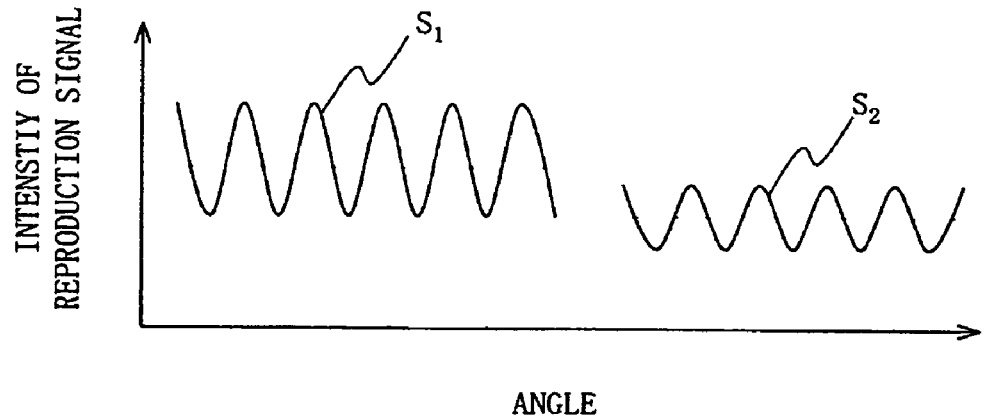
FIG. 45 is a waveform chart showing, under the conditions illustrated in FIG. 42, the relationship between the angular position (0 degrees and 180 degrees) of optical disk and the intensity of a reproduction signal of prepit information when a light beam is projected partly covering both a recorded part and a non-recorded part in a recordable area of the first storage layer.

Therefore, as shown in FIG. 44, the reproduction signal of the prepit information varies in intensity as the optical disk 201 rotates. FIG. 44 only shows the envelope E of the reproduction signal; the intensity of the reproduction signal is shown on the axis of ordinates and the angular position of the rotating optical disk 201 is shown on the axis of abscissas. FIG. 45 shows with the angle axis enlarged the reproduction signal Si of prepit information at the 0-degree angular position of FIG. 44 and the reproduction signal S2 of prepit information at the 180-degree angular position of FIG. 44. To convert the reproduction signals S1, S2 into digital signals, detection needs to carried out with the slice levels set to the mean levels to of the reproduction signals S1, S2. However, comparing the reproduction signal S1 with the reproduction signal S2 will show that the mean levels differ greatly, which makes it impossible to carry out detection using a single slice level.

Figure 46:
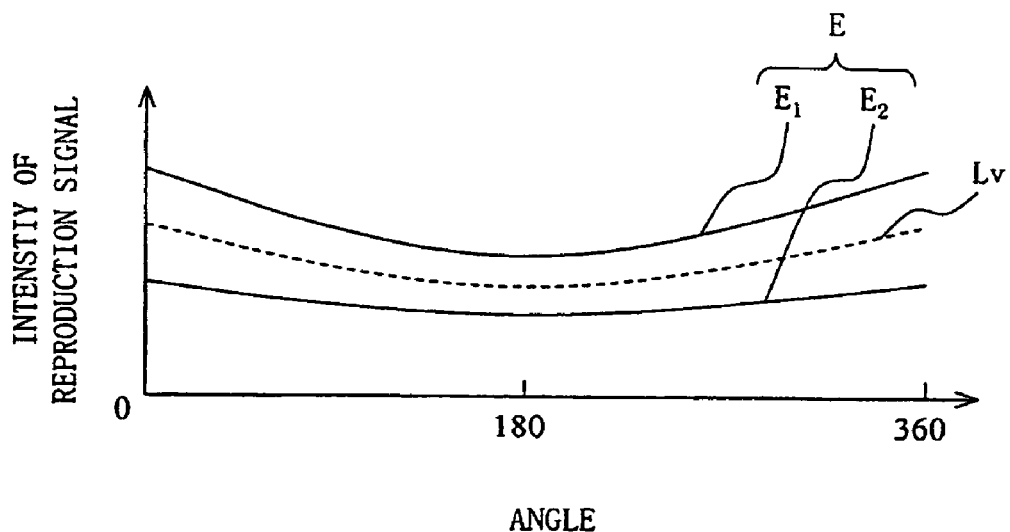
FIG. 46 is a waveform chart showing, under the conditions illustrated in FIG. 44, the relationship between the angular position of an optical disk and the intensity of a reproduction signal of prepit information, where the envelope has a mean, slice level.
Figure 47:
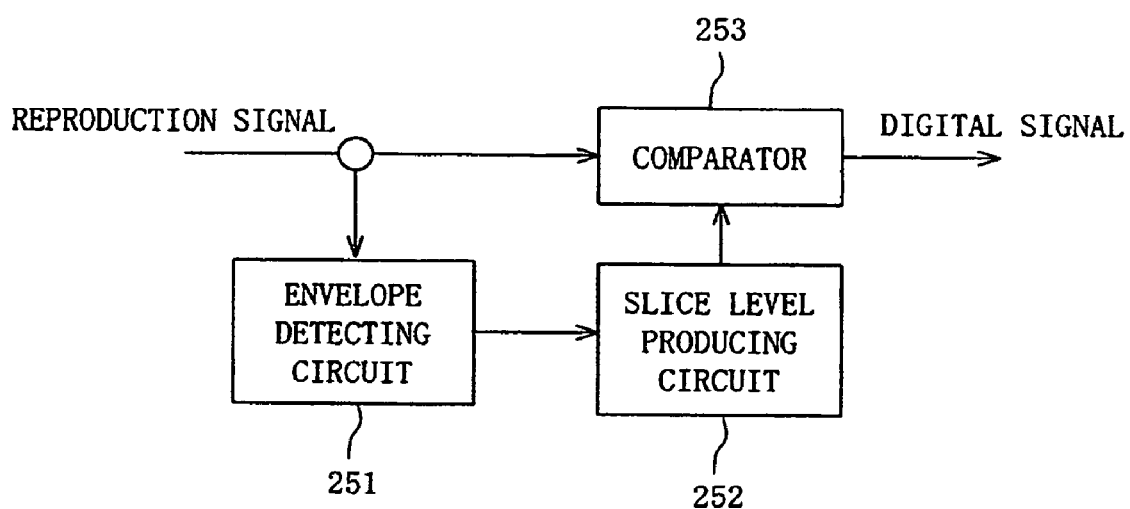
FIG. 47 is a block diagram showing the configuration of a reproduction circuit which produces a digital signal from a reproduction signal using the slice level shown in FIG. 46.

The problem can be solved by detecting the upper envelope E1 and lower envelope E2 which constitute the envelope E of the reproduction signal and setting the variable slice level Lv to their mean levels as shown in FIG. 46. FIG. 47 shows the configuration of a reproduction circuit producing a digital signal from the slice level Lv.

The reproduction circuit includes an envelope detecting circuit 251, a slice level producing circuit 252, and a comparator 253.

The envelope detecting circuit 251 as envelope detecting means is made of, for example, a peak-hold circuit and a bottom-hold circuit; the peak-hold circuit detects the upper envelope E1 and the bottom-hold circuit detects the lower envelope E2.

The slice level producing circuit 252 as mean level producing means produces a slice level Lv by outputting a mean value of values of the detected upper and lower envelopes E1, E2. The slice level producing circuit 252 is made of, for example, an operation circuit including an adder circuit for adding the values of the envelopes E1, E2 and a divider circuit for dividing the sum by 2.

The comparator 253 as digital converting means compares the reproduction signal with the slice level Lv produced by the slice level producing circuit 252 and converts the reproduction signal to a binary digital signal.

For example, the comparator 253 produces a 1 for output when the reproduction signal is above the slice level Lv and a 0 for output when the reproduction signal is below the slice level Lv.

In the reproduction circuit thus configured, the reproduction signal is fed to the envelope detecting circuit 251 and the comparator 253. The envelope detecting circuit 251 detects the upper envelope signal E1 and the lower envelope E2 of the reproduction signal. The slice level producing circuit 252 produces slice levels Lv from the envelope E1, E2. The comparator 253 produces a digital signal by comparing the reproduction signal with the slice level Lv.

Figure 48:
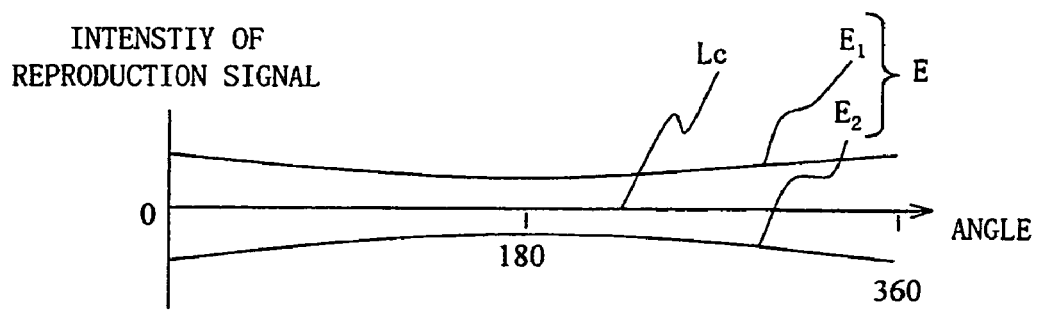
FIG. 48 is a graph showing, under the conditions illustrated in FIG. 42, the relationship between the angular position of an optical disk and the intensity (envelope) of a reproduction signal of prepit information when a light beam is projected partly covering both a recorded part and a non-recorded part in a recordable area of the first storage layer, where the reproduction signal is rid of low frequency variations.
Figure 49:
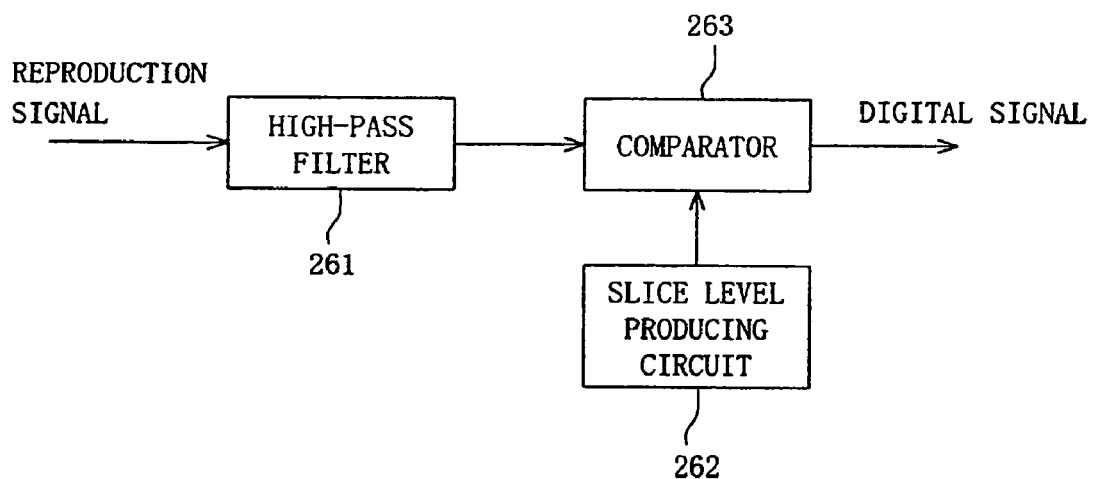
FIG. 49 is a block diagram showing the configuration of a reproduction circuit which produces a digital signal based on the envelope shown in FIG. 48.

In addition, FIG. 48 shows the relationship between the reproduction signal intensity and the angular position of the optical disk 201, as to the method to produce a digital signal from a reproduction signal by means of the reproduction circuit shown in FIG. 49. The reproduction circuit in FIG. 49 includes a high-pass filter 261, a slice level producing circuit 262, and a comparator 263.

The high-pass filter 261 as low frequency variation removing means removes low frequency variations from a reproduction signal and passes high frequency components. The slice level producing circuit 262 produces a slice level of a constant voltage. The comparator 263 as digital converting means compares the reproduction signal transmitted through the high-pass filter 261 to the slice level as is the case with the comparator 253 and converts into binary digital signal.

In the reproduction circuit thus configured, the incoming reproduction signal is first stripped of its low frequency variations by the high-pass filter 261. The reproduction signal, before being fed to the high-pass filter 261, includes low frequency variations, and therefore the mean level of the envelope E changes as shown in FIG. 46. However, the reproduction signal is past through the high-pass filter 261, and the mean level of the envelope E becomes constant regardless of the angle as shown in FIG. 48.

The comparator 263 compares the reproduction signal past through the high-pass filter 261 with the constant slice level Lc fed from the slice level producing circuit 262 and produces a digital signal.

Although the reproduction circuit and the slice level producing circuit 262 produce the slice level Lc in the foregoing, the slice level Lc may be set to 0 volts, because the mean levels of the upper envelope E1 and the lower envelope E2 are normally equal to 0 volts as the reproduction signal passes through the high-pass filter 261. Therefore, in this case, the slice level producing circuit 262 can be omitted.

As described in the foregoing, the provision of the prepit area 206 in the second storage layer 213 enables the optical disk 201 to read/write data from/into the second storage layer 213 without changing the read/write sensitivity of the recordable area 203. In addition, the use of the reproduction circuit shown in FIG. 47 or FIG. 49 ensures that a digital signal is derived stably from a reproduction signal, even if the reproduction signal of prepit information varies in intensity with the rotation of the optical disk 201 provided that the light beam 217e illuminates both the recorded part 203a1 and the non-recorded part 203a2 before being focused on the outer prepit area 206b of the second storage layer 213.

However, as mentioned earlier, the non-recorded part 203a2 exhibits a lower transmittance than the recorded part 203a1. When data is to be read from the prepit area 206 including the outer prepit area 206b using the light beam 217d traveling through the non-recorded part 203a2 of the first storage layer 215, as could be understood from FIG. 46 and FIG. 48, the reproduction signal has so small an amplitude that the prepit information cannot be reproduced stably. Accordingly, preferably, the part of the first storage layer 215 through which the light beam 217e is transmitted is fully recorded and thus exhibits a relatively high transmittance.

Figure 50:
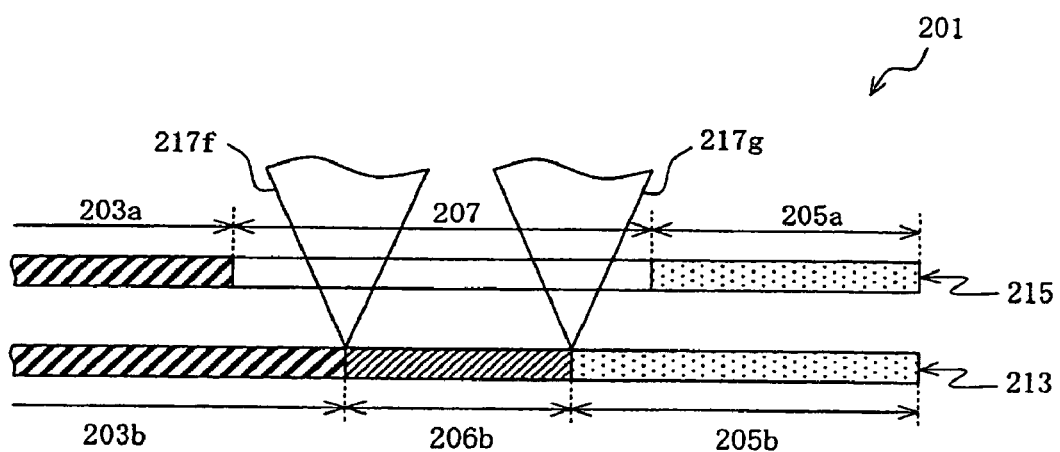
FIG. 50 is an enlarged vertical cross-sectional view showing the structure of a part of the optical disk shown in FIG. 42, where the first storage layer has a pseudo-recording area.

FIG. 50 shows a structure of the optical disk 201 capable of increasing the amplitude of the reproduction signal obtained from prepit area 206 (not shown except the outer prepit area 206b) on the second storage layer 213.

Figure 51:
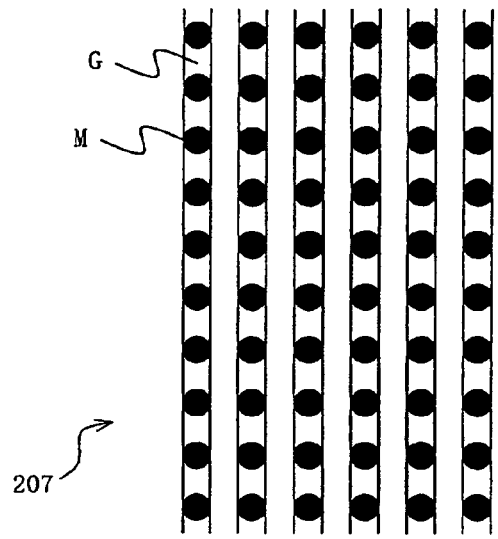
FIG. 51 is an enlarge plan view showing the structure of the pseudo-recording area.

The optical disk 201 has a pseudo-recording area 207 interposed between the recordable area 203a and the blank area 205a. The pseudo-recording area 207 is provided in a part of the first storage layer 215 which corresponds to the prepit area 206 of the first storage layer 215 and stores pseudo information in advance. In the pseudo-recording area 207, as in the recordable area 203, the transmittance lowers where recording marks M are formed in the guiding groove G as shown in FIG. 51. Thus, the pseudo-recording area 207 has as high a transmittance as the recordable area 203, and the light beam 217 passing through the pseudo-recording area 207 comes to have a high intensity. Thus, the amplitude of the reproduction signal of the prepit area 206 on the second storage layer 213 can be increased.

The recording marks M formed on the pseudo-recording area 207 differ from those formed on the recordable area 203; the former include no main recording information, but pseudo recording information. As pseudo recording information, no particular information needs be recorded, but nonsense or meaningless information may be recorded. Alternatively, if the pseudo-recording area 207 is to be formed in advance prior to the shipment of the optical disk 201, identification information, encryption information, and other kinds of information may be recorded in the pseudo-recording area 207 which is unique to individual optical disks 201.

In this situation, as shown in FIG. 50, preferably, the pseudo-recording area 207 is formed so that the light beams 217f, 217g always travel through the pseudo-recording area 207 of the first storage layer 215 even when data is read from the edges of the prepit area 206b of the second storage layer 213 in relation to the radius direction of the disk. Accordingly, the pseudo-recording area 207 is provided covering a wider area than the outer prepit area 206b of the second storage layer 213.

For example, supposing the first storage layer 215 is separated from the second storage layer 213 by a distance of 20 microns, the light beam 217 focused on the second storage layer 213 forms on the first storage layer 215 a spot having a radius of about 10 microns. Therefore, the pseudo-recording area 207 needs be formed at least about 10 microns wider than both ends of the prepit area 206 of the second storage layer 213. In addition, when the center of the guiding groove G formed on the first storage layer 215 does not match the center of the pit row formed on the second storage layer 213, hence eccentricity exists between the two centers, the pseudo-recording area 207 needs be widened by an amount equivalent to the eccentricity. For this reason, the pseudo-recording area 207 is preferably formed about 100 microns wider than both ends of the prepit area 206 of the second storage layer 213.

FIG. 50 shows an example in which the pseudo-recording area 207 is provided in the outer prepit area 206b. A similar pseudo-recording area may be provided in the inner prepit area 206a too.

In this situation, the pseudo-recording area 207 may be either formed prior to the shipment of the optical disk 201 or formed by the optical-disk-read/write apparatus 31 when an unused optical disk 201 is loaded in the optical-disk-read/write apparatus 31 for replay or recording. The provision of the pseudo-recording area 207 using an optical-disk-read/write apparatus eliminates the need to provide the pseudo-recording area 207 prior to the shipment of the optical disk, which enables reduction of the cost of the optical disk.

Figure 52:
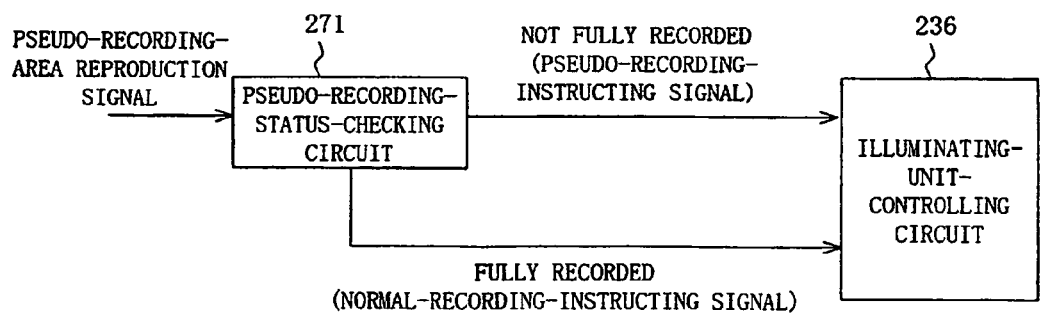
FIG. 52 is a block diagram showing the configuration by which the pseudo-recording area is formed.

FIG. 52 shows a configuration of pseudo recording circuit provided in the optical-disk-read/write apparatus 31 to form a pseudo-recording area 207. The configuration includes the aforementioned pseudo-recording-status-checking circuit 271 in the signal processing and controlling unit 35.

The pseudo-recording-status-checking circuit 271 as recording status checking means checks, based on the reproduction signal produced by a light-receiving element 47 from the reflection off the pseudo-recording area 207, whether the pseudo-recording area 207 already contains pseudo recording information. The pseudo-recording-status-checking circuit 271 includes a comparator and other circuits to check and determine whether the pseudo-recording area 207 contains any records, in accordance with whether or not the reproduction signal which represents the quantity of light reflected off the pseudo-recording area 207 exceeds a predetermined threshold value.

In the arrangement, the pseudo-recording area 207 is read immediately after the optical disk 201 is loaded in the optical-disk-read/write apparatus 31. The pseudo-recording-status-checking circuit 271 checks based on the reproduction signal whether the pseudo-recording area 207 is fully recorded or not.

If the pseudo-recording area 207 is not fully recorded, the pseudo-recording-status-checking circuit 271 regards the optical disk 201 as being never used, and feeds a pseudo writing-instruction signal to the illuminating-unit-controlling circuit 36 as pseudo-recording means provided in the signal processing and controlling unit 35. As a result, pseudo information is recorded in the pseudo-recording area 207 of the first storage layer 215 under the control of the illuminating-unit-controlling circuit 36. Meanwhile, if the pseudo-recording area 207 is fully recorded, the pseudo-recording-status-checking circuit 271 regards the loaded optical disk 201 as having been used, and feeds an ordinary writing-instruction signal to the illuminating-unit-controlling circuit 36. As a result, an ordinary recording operation is performed as to the optical disk 201 under the control of the illuminating-unit-controlling circuit 36.

Next, the following description will describe an optical disk 201 in which the first storage layer 215 has a prepit area 206. As a comparative example, an optical disk 281 is first described with which no consideration is given to the read/write sensitivity of the second storage layer 215.

Figure 53:
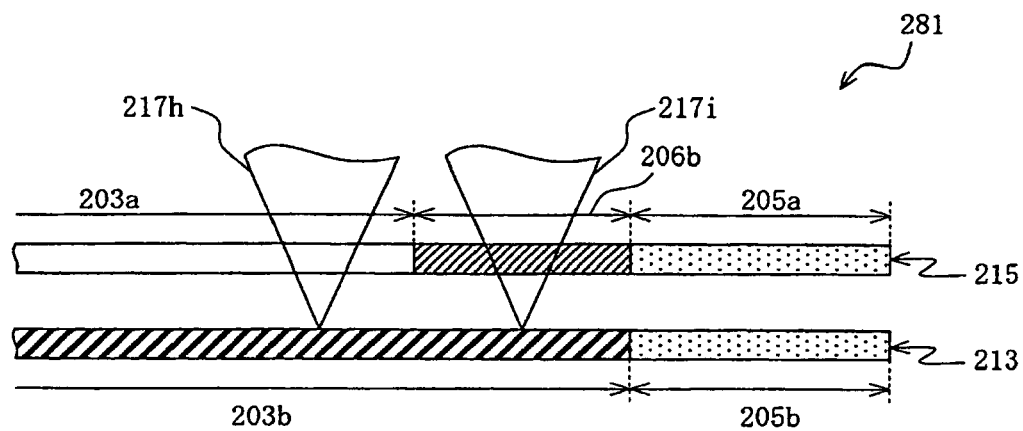
FIG. 53 is an enlarge vertical cross-sectional view showing the structure of a part of the optical disk of an embodiment of the present invention, where the first and second storage layers having a prepit area.

With the optical disk 281, as shown in FIG. 53, a blank area 205a of the first storage layer 215 is provided in the same range as a blank area 205b of the second storage layer 213. In the first storage layer 215, an outer prepit area 206b is provided between the recordable area 203a and the blank area 205a. In addition, an inner prepit area 206a (not shown) is also provided on the first storage layer 215.

Figure 70:
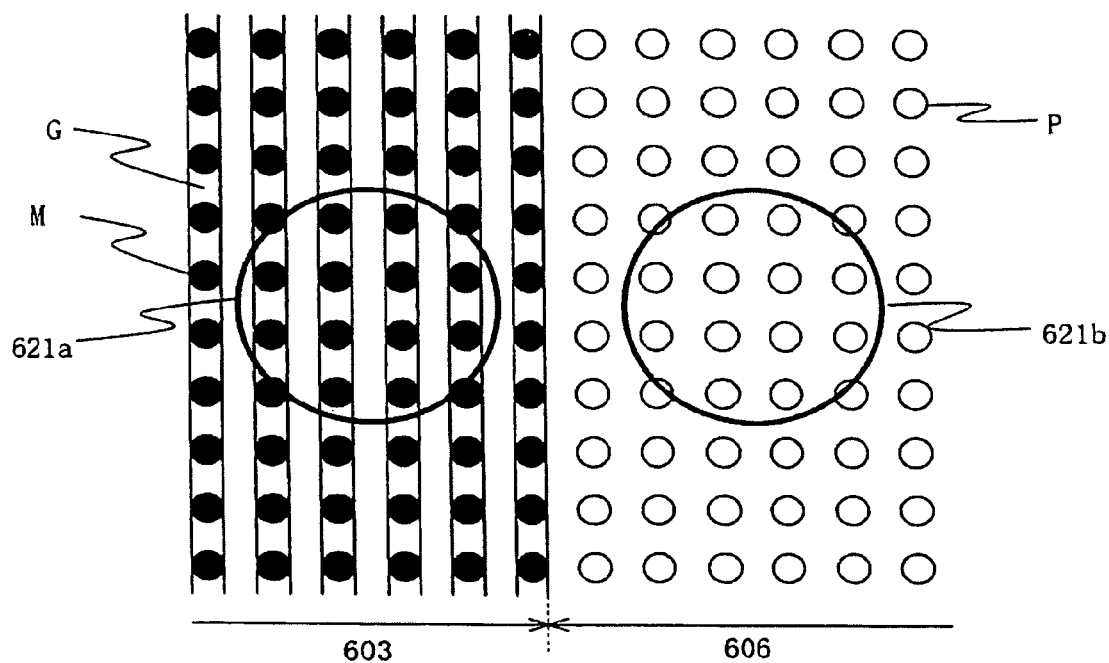
FIG. 70 is an enlarge plan view around the border between a recordable area and a prepit area of the first storage layer in the optical disk shown in FIG. 68.
Figure 71:
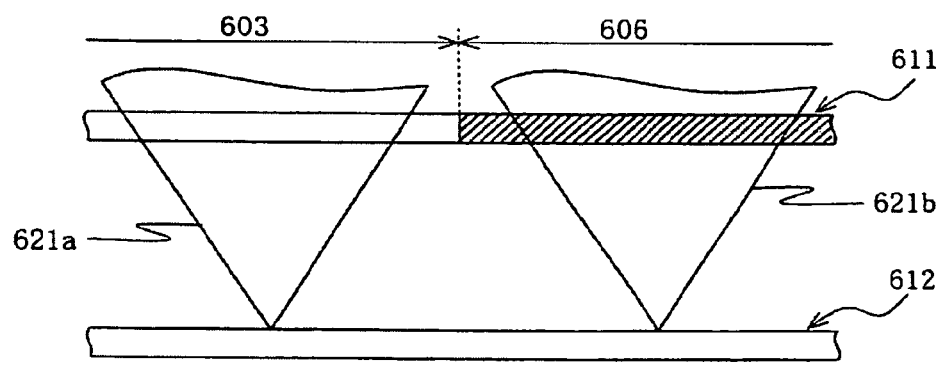
FIG. 71 is an enlarge plan view showing light beams being focused on the second storage layer after transmitted through the first storage layer in the optical disk shown in FIG. 69.

Since the prepit area 206 is located on the light-striking side of the optical disk 281 thus structured, the reproduction signal derived from the prepit area 206 never varies in intensity. The optical disk 281 is free from the problem that the reproduction signal derived from the prepit area 206 varies in intensity as shown in FIG. 42. However, the provision of the prepit area 206 on the first storage layer 215 causes the same problem as with the conventional optical disk (see FIG. 70). Concretely, the first storage layer 611 exhibits different optical transmittances between the recordable area 603 and the prepit area 606, resulting in variations in read/write sensitivity of the second storage layer 612. Now, the variations in recording sensitivity of the optical disk 281 are elaborately described.

As to the optical disk 281, the recordable area 203a of the first storage layer 215 is first fully recorded by a recording operation of the optical-disk-read/write apparatus 31. In this situation, the fully recorded, recordable area 203a includes high-transmittance recording marks M, and the light beam 217h concentrated on the second storage layer 213 after passing through the recordable area 203a exhibits a relatively high intensity. Meanwhile, the light beam 217i concentrated on the second storage layer 213 after passing through the prepit area 206 with no recording marks M exhibits a relatively low intensity.

Next, to record data in the recordable area 203b of the second storage layer 213, the light beam 217h and the light beam 217i, although originally of the same intensity, differs in intensity when they reach the second storage layer 213. Therefore, the recording sensitivity varies depending upon where recording takes place, which makes it extremely difficult to perform stable recording. Further, if a light beam passes through a boundary between the fully recorded recordable area 203a and the prepit area 206 before concentrated on the second storage layer 213, since there exists eccentricity which is defined as the displacement in position between the center of the guiding groove G on the first storage layer 215 and the center of the guiding groove G on the second storage layer 213, the recording sensitivity undesirably varies with rotation of the optical disk 281.

Figure 54:
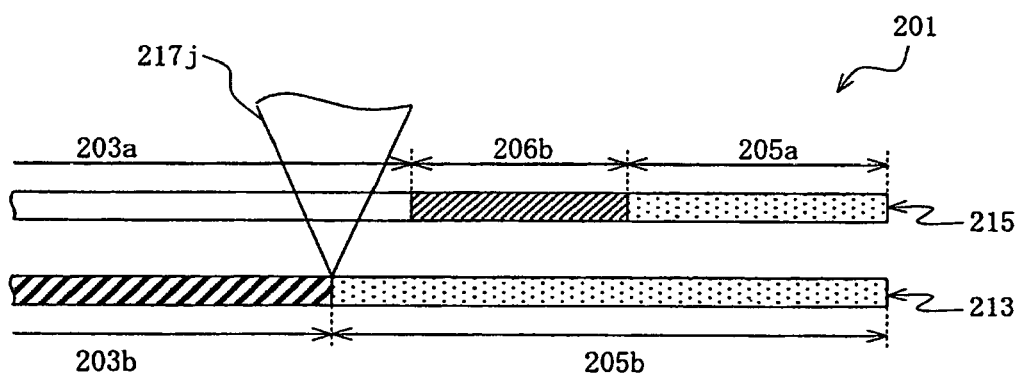
FIG. 54 is an enlarged vertical cross-sectional view showing the structure of a part of the optical disk of FIG. 53, where the second storage layer has an extended blank area.

By contrast, the optical disk 201 shown in FIG. 54 provides means to solve these problems by expanding the blank area 205b. The following will describe such an optical disk 201.

As to the optical disk 201 shown in FIG. 54, the blank area 205b the second storage layer 213 is expanded inwards, and a light beam 217j entering the optical disk 201 always passes through the fully recorded recordable area 203a of the first storage layer 215 before concentrated on the second storage layer 213. In this manner, as to the optical disk 201, the recordable area 203a of the first storage layer 215 is formed wider than the recordable area 203b of the second storage layer 213, and the prepit area 206 is formed along the outer circumference of the recordable area 203a. The configuration makes the intensity of the light beam 217j always constant on the second storage layer 213 and thus achieves stable recording to the second storage layer 213 and stable reproduction of prepit information from the first storage layer 215.

Now, it will be described how much wider the recordable area 203a of the first storage layer 215 should be than the recordable area 203b of the second storage layer 213. Assuming that the first storage layer 215 is separated from the second storage layer 213 by a distance of 20 microns, the light beam 217j focused on the second storage layer 213 forms on the first storage layer 215 a spot having a radius of about 10 microns. Therefore, the recordable area 203b needs be formed at least about 10 microns wider than the width of the recordable area 203a. In addition, when the center of the guiding groove G formed on the first storage layer 215 does not match the center of the guiding groove G formed on the second storage layer 213, hence eccentricity exists between the two centers, the recordable area 203a needs be widened by an amount equivalent to the eccentricity. Therefore, in this case, the recordable area 203a is preferably formed about 100 microns wider than the width of the recordable area 203b.

As to the optical disk 201, the recordable area 203b of the second storage layer 213 narrows down and the storage capacity decreases. By contrast, the optical disk 201 shown in FIG. 55 and FIG. 56 has such a structure to add to the storage capacity while preventing the prepit area 206 from reducing the recording sensitivity.

Figure 55:
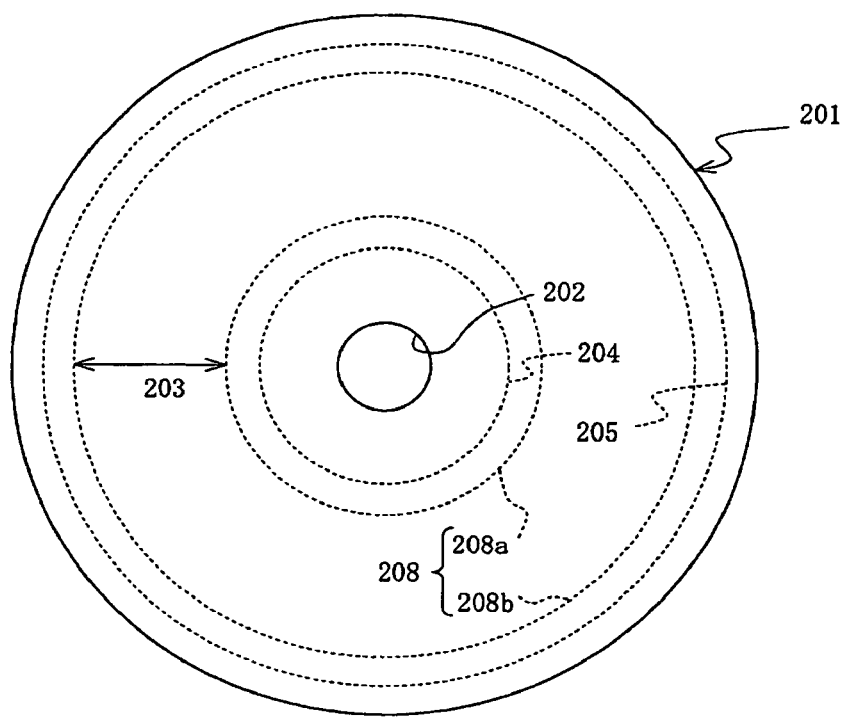
FIG. 55 is a plan view showing the structure of a part of the optical disk shown in FIG. 33, where the prepit area is replaced by a prepit area in which is there provided a continuous storage area.

The optical disk 201 has in place of the aforementioned prepit area 206 a prepit area 208 made of an inner prepit area 208a and an outer prepit area 208b, as shown in FIG. 55. The prepit area 208 has an optical transmittance which is equal to that of the fully recorded recordable area 203a of the first storage layer 215 shown in FIG. 56.

Figure 57:
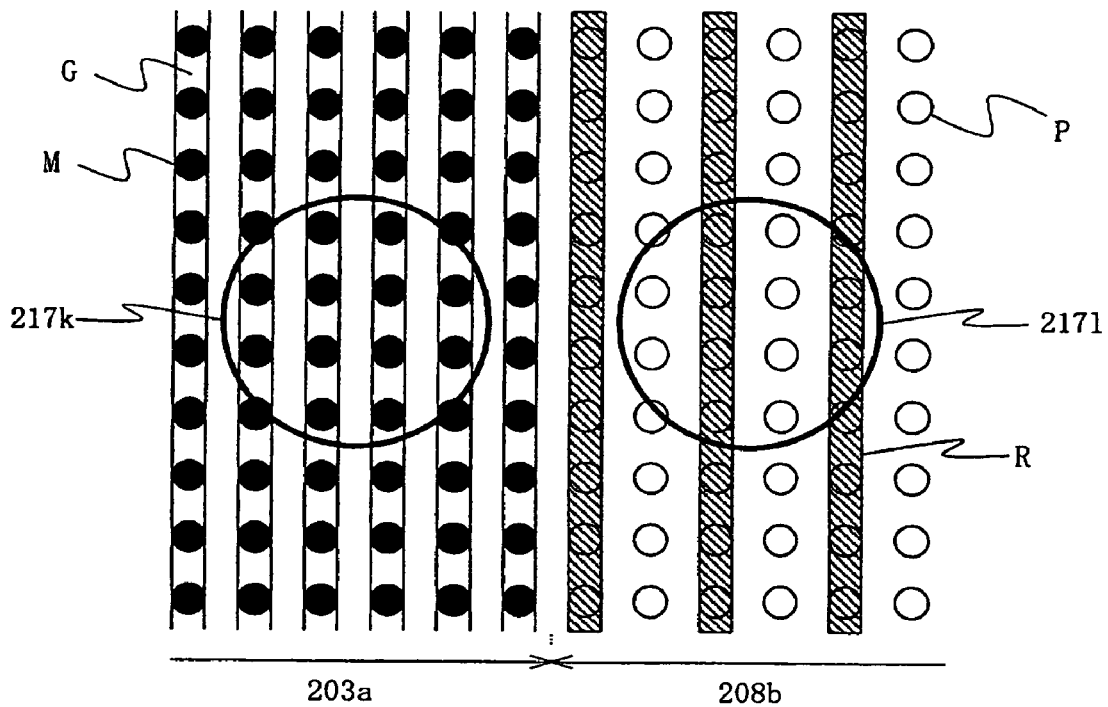
FIG. 57 is an enlarged plan view around the border between a recordable area and a prepit area of the first storage layer in the optical disk shown in FIG. 55.

As shown in FIG. 57, in the prepit area 208, alternate pit rows of pits P which are spirally (or concentrically) arranged have a continuously recorded, continuous storage area R. In the continuous storage area R, the pits P and the intervals between the pits P are continuously in the same state, i.e., have the same transmittance, as the recording marks M in the recordable area 203a.

In the recorded recordable area 203a, a fully recorded portion (recording mark M) and a non-fully-recorded portions are formed alternately in the guiding groove G. In practice, the lengths of the fully recorded and non-fully-recorded portions along the guiding groove G alters depending on recording information. However, as to the guiding groove G, recording is done so that the recorded portions and the non-fully-recorded portions are formed at a substantially equal ratio. In addition, the depression area (land area) between any adjacent guiding grooves G are non-recorded areas and formed substantially as wide as the guiding groove G. Therefore, the sum of the areas of the recording marks M is equal to ¼ the net area of the recordable area 203a.

Meanwhile, in the prepit area 208, the non-recorded area between any adjacent pit rows is formed substantially as wide as the diameter of the pit P. Therefore, to form a recorded portion (¼ the net prepit area 208) which has an area substantially equal to the recorded portion of the recordable area 203a, recording needs be done so that a continuous storage area R can be formed for alternate pit rows.

Other than guiding groove recording schemes, to employ a land and groove recording scheme whereby recording marks M are formed not only in the guiding groove G, but also in land areas, the sum of the areas of the recording marks M formed in the recordable area 203a is ½ the net area of the recordable area 203a. Therefore, to form a recorded portion having an area substantially equal to the recorded portion (½ the net area of the prepit area 208) of the recordable area 203a, recording needs be done so that a continuous storage area R can be formed continuously along a pit row.

Figure 58:
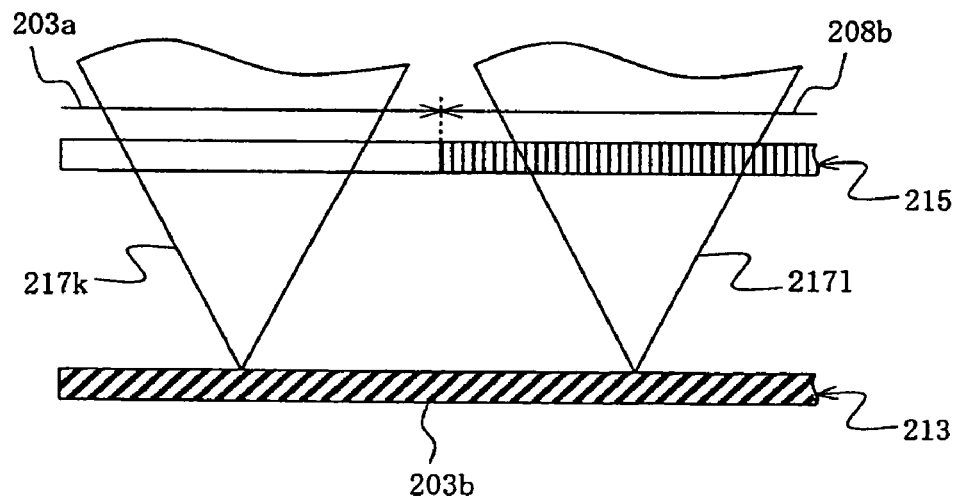
FIG. 58 is an enlarged vertical cross-sectional view around the border shown in FIG. 57, where light beams pass through a recordable area and a prepit area of the first storage layer before being focused on the second storage layer.

As mentioned in the foregoing, the continuous storage area R exhibits as high an optical transmittance as the recording mark M. Therefore, as shown in FIG. 58, the fully recorded portions formed on the first storage layer 15 in the spots of a light beam 217k passing through the fully recorded recordable area 203a before being concentrated on the second storage layer 213 and a light beam 217l passing through the outer prepit area 208b before being concentrated on the second storage layer 213 have the substantially equal areas. This makes the intensities of the light beams 217k, 217l on the second storage layer 213 substantially equal, and the second storage layer 213 no longer varies in recording sensitivity even when the prepit area 208 is provided. Therefore, expanding the recordable area 203b of the second storage layer 213 adds to the storage capacity as compared to the optical disk 201 in FIG. 54.

Figure 56:
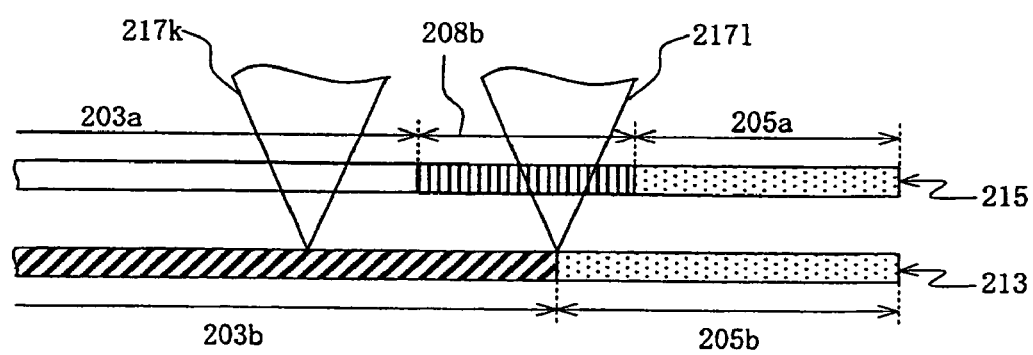
FIG. 56 is an enlarged vertical cross-sectional view showing the structure of a part of the first and second storage layer in the optical disk shown in FIG. 55.

In this situation, the blank areas 205a, 205b are unrecorded and exhibit low optical transmittance. The ends of the recordable area 203b of the second storage layer 213 therefore need be determined so that the light beam 217l reaching the second storage layer 213 always passes through the outer prepit area 208b, as shown in FIG. 56.

In this manner, as to the optical disk 201, in the prepit area 208 of the first storage layer 215, alternate pit rows have a continuous storage area R, and the outer periphery of the outer prepit area 208b is positioned further outside the outer periphery of the recordable area 203b of the second storage layer 213. In the case of the inner prepit area 208a, its inner periphery is positioned further inside the inner periphery of the recordable area 203b of the second storage layer 213. Thus, the light beams 217k, 217l always have equal intensities on the second storage layer 213. Therefore, data is stably written to the second storage layer 213, and the optical disk 201 comes to have a further increased capacity.

Now, it will be described how much closer to the outer periphery the periphery of the outer prepit area 208b should be positioned than the recordable area 203b. Assuming that the first storage layer 215 is separated from the second storage layer 213 by a distance of 20 microns, the light beam focused on the second storage layer 213 forms on the first storage layer 215 a spot having a radius of about 10 microns. Therefore, the outer prepit area 208b needs be formed so that its periphery is positioned at least about 10 microns closer to the outer periphery than the periphery of the recordable area 203b. Likewise, the inner prepit area 208a needs be formed so that its periphery is positioned at least about 10 microns closer to the inner periphery than the periphery of the recordable area 203b.

Further, if the center of the guiding groove G on the first storage layer 215 does not match the center of the guiding groove G on the second storage layer 213, and hence eccentricity exists, the outer prepit area 208b needs be expanded by an amount equivalent to the eccentricity. In this case, the outer prepit area 208b is preferably formed so that its edges are positioned about 100 microns closer to the outer periphery than the edges of the recordable area 203b. Preferably, the inner prepit area 208a is formed likewise.

In this situation, the continuous storage area R may be formed in the pit row in the prepit area 208 either prior to the shipment of the optical disk 201 or by using the optical-disk-read/write apparatus 31 when an unused optical disk 201 is loaded into the optical-disk-read/write apparatus 31. The formation of the continuous storage area R using the optical-disk-read/write apparatus 31 eliminates the need to form the continuous storage area R prior to the shipment of the optical disk 201, and reduces the cost of the optical disk 201.

Figure 59:
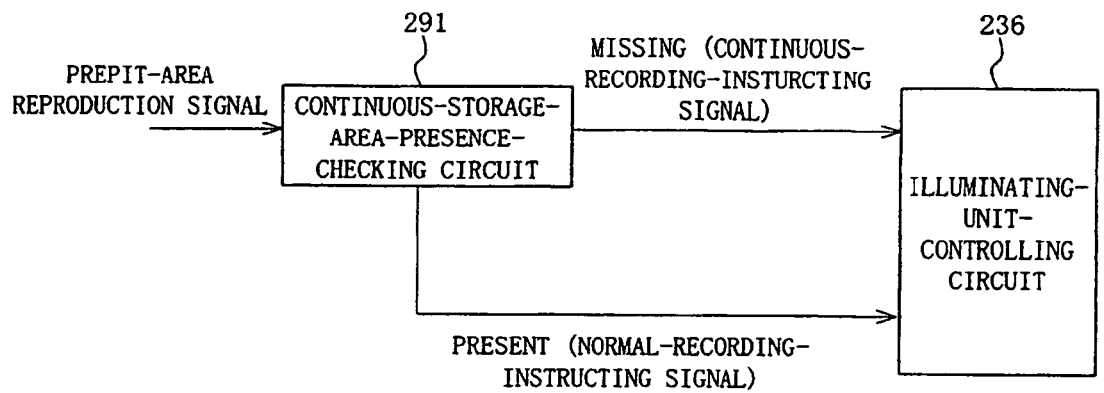
FIG. 59 is a block diagram showing a configuration by which the continuous storage area is formed.

FIG. 59 shows a configuration to form a continuous storage area R in the pit row in the prepit area 208 using the optical-disk-read/write apparatus 31 in the foregoing manner. The configuration includes the aforementioned continuous-storage-area-presence-checking circuit 291 provided in the signal processing and controlling unit 35.

The continuous-storage-area-presence-checking circuit 291 as continuous storage area checking means checks and determines based on the reproduction signal produced by the light-receiving element 47 from the reflection off the prepit area 208 whether the prepit area 208 contains a continuous storage area R as mentioned in the foregoing. The continuous-storage-area-presence-checking circuit 291 includes a comparator and other circuits to check and determine whether the pseudo-recording area 207 contains any records, in accordance with whether or not the reproduction signal which represents the quantity of reflected light reflected off the prepit area 208 exceeds a predetermined threshold value.

In the arrangement, to check the presence of the continuous storage area R, the prepit area 208 is read immediately after the optical disk 201 is loaded in the optical-disk-read/write apparatus 31. Here, a light beam is projected on the prepit area 208 for tracking under the control of the illuminating-unit-controlling circuit 36 in the signal processing and controlling unit 35. Here, the pit row acts as a tracking guide which is a rough equivalent to the guiding groove G.

When there is already formed a continuous storage area R, the quantity of light reflected off the prepit area 208 changes for alternate pit rows, and the reproduction signal representative of the quantity of reflected light varies accordingly. In the continuous-storage-area-presence-checking circuit 291, as mentioned in the foregoing, the varying reproduction signal is converted to a signal of a constant level by a low-pass filter and compared with a predetermined reference value by the comparator. In this case, the signal is larger than the reference value, the continuous-storage-area-presence-checking circuit 291 regards the loaded optical disk 201 as having been used and feeds an ordinary writing-instruction signal to the illuminating-unit-controlling circuit 36. As a result, under the control of the illuminating-unit-controlling circuit 36, ordinary recording takes place on the optical disk 201.

Meanwhile, when there is formed no continuous storage area R, the quantity of light reflected off the prepit area 208 does not vary. Neither does the reproduction signal. Therefore, the signal having passed through the low-pass filter is smaller than the reference value, the continuous-storage-area-presence-checking circuit 291 regards the loaded optical disk 201 as being never used, and feeds a continuous-recording-instructing signal to the illuminating-unit-controlling circuit 36 as continuous recording means. As a result, under the control of the illuminating-unit-controlling circuit 36, recording takes place on the optical disk 201 so that a continuous storage area R is formed in the prepit area 208.

So far, the description was limited only to the optical disk 201 with only two data storage layers. Instead, the optical disk 201 may include three or more data storage layers. The following will describe such an optical disk 201 with three data storage layers.

Figure 60:
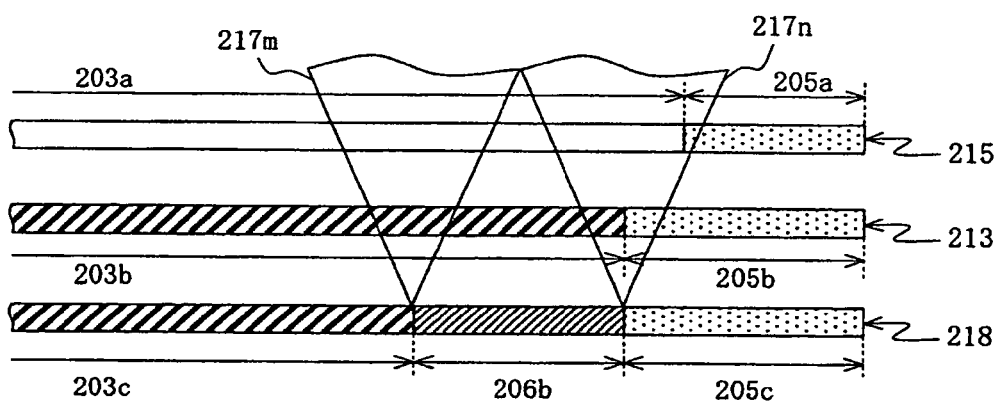
FIG. 60 is an enlarged vertical cross-sectional view showing the structure of a part of the first and second storage layers, as well as the third storage layer having a prepit area, of an optical disk of another embodiment of the present invention.

In addition to a first storage layer 215 and a second storage layer 213, the optical disk 201 includes a third storage layer 218 as a last data storage layer which is most distanced from a light-entering surface, as shown in FIG. 60. The prepit area 206 is provided not in the first storage layer 215 or the second storage layer 213, but only in the third storage layer 218, between a recordable area 203c and a blank area 205c.

As to the optical disk 201, similarly to the optical disk 201 shown in FIG. 62, in reading data from a prepit area 206 in the third storage layer 218. The quantity of light reflected off a prepit area 206 varies depending upon whether the first storage layer 215 and the second storage layer 213 through which light beams 217m, 217n pass are fully recorded or not. However, a slice level can be produced from the envelope of a reproduction signal by using the reproduction circuit shown in FIG. 47. Obtaining a digital signal with the slice level as a reference, prepit information can be reproduced stably. In addition, by using the reproduction circuit shown in FIG. 49, prepit information can be reproduced stably by obtaining a digital signal by comparing with a constant slice level a reproduction signal of the prepit area 206 from which low frequency components are removed by a high-pass filter.

In this situation, in recording data on the optical disk 201, the recording on the second storage layer 213 is started after the first storage layer 215 is fully recorded, and the recording on the third storage layer 218 is started after the second storage layer 213 is fully recorded. In addition, in focusing a light beam on the second storage layer 213, the light beam needs always be transmitted through a recorded area 203a of the first storage layer 215 so that a light beam of constant intensity reaches the second storage layer 213. To this end, the recordable area 203a is formed wider than the recordable area 203b both on the inner and outer peripheries.

Figure 61:
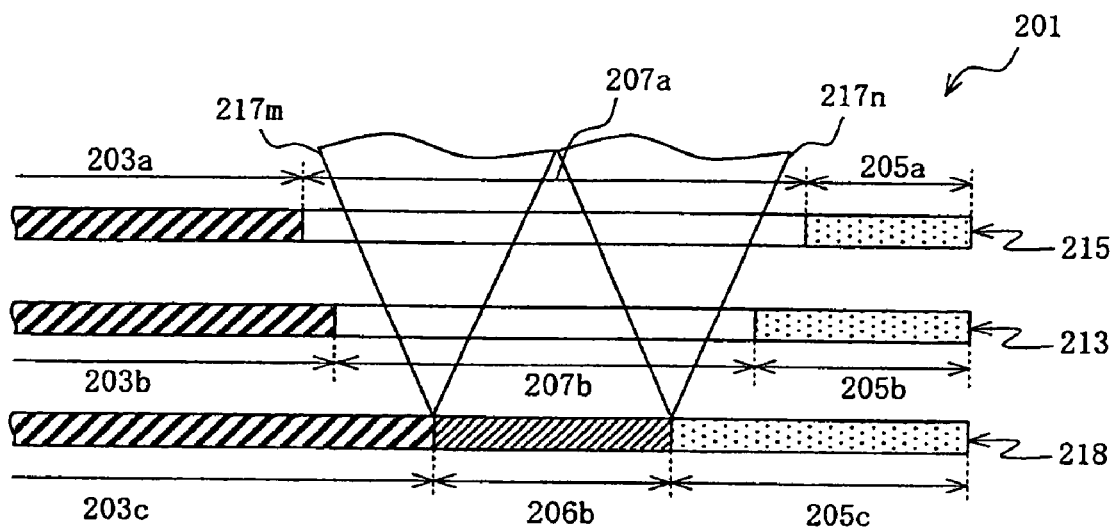
FIG. 61 is an enlarged vertical cross-sectional view showing the structure of a part of the optical disk shown in FIG. 60, where the first and second storage layers have a pseudo-recording area.

Next, as to the optical disk 201 shown in FIG. 61, the third storage layer 218 has the prepit area 206, and the first storage layer 215 and the second storage layer 213 have respective pseudo-recording areas 207a, 207b where pseudo information is recorded. As to the optical disk 201, the pseudo-recording areas 207a, 207b are formed at such positions that the light beams. 217m, 217l focused on the prepit area 206 of the third storage layer 218 are always transmitted through the pseudo-recording areas 207a, 207b before reaching the prepit area 206.

Using such an optical disk 201, similarly to the optical disk 201 shown in FIG. 50, due to relatively high optical transmittance of the pseudo-recording area 207a, 207b, the intensities of the light beams 217m, 217n passing through the pseudo-recording areas 207a, 207b can be maintained at high values. Therefore, it becomes possible to increase the amplitude of the reproduction signal derived from the prepit area 206 of the third storage layer 218 and eliminate the variations of the reproduction signal along the direction of the circumference.

The pseudo-recording areas 207a, 207b may be formed prior to the shipment of the optical disk 201 or using the optical-disk-read/write apparatus 31 in the aforementioned manner.

Further, the optical disk 201 shown in FIG. 62 has the prepit area 206 only in the first storage layer 215 which is located close to the light-entering surface. Such an optical disk 201, since the prepit area 206 is located close to the light-entering surface, is free from variations in the quantity of light reflected off the prepit area 206 and its prepit information can be stably reproduced.

In addition, to eliminate variations from recording sensitivity, similarly to the case in FIG. 54, in reading or writing in the recordable area 203b of the second storage layer 213, a light beam 217o needs to always pass through a fully recorded recordable area 203a of the first storage layer 215 before reaching the second storage layer 213; and in reading or writing in the third storage layer 218, a light beam 217p needs to always pass through the fully recorded recordable areas 203a, 203b of the first storage layer 215 and the second storage layer 213, respectively, before reaching the third storage layer 218. To this end, the recordable area 203b is formed wider than the recordable area 203c and the recordable area 203a is formed wider than the recordable area 203b.

The optical disk 201 shown in FIG. 63 has the prepit area 208 (only the outer prepit area 208b is shown) in place of the prepit area 206 in the first storage layer 215 of the optical disk 201 shown in FIG. 62. The optical disk 201, similarly to the optical disk 201 in FIG. 56, has: the prepit area 208 where the optical transmittance is high; the inner prepit area 208a whose inner edge is positioned further inwards than the inner edges of the recordable areas 203b, 203c; and the outer prepit area 208b whose outer edge is positioned further outwards than the outer edges of the recordable areas 203b, 203c.

This makes always constant the intensities of a light beam 217r reaching the second storage layer 213 and the light beam 217s reaching the third storage layer 218. Therefore, it data is recorded stably in the second storage layer 213 and the third storage layer 218, and the optical disk 201 is more capacious.

As described in the foregoing, an optical read/write apparatus of the present invention causes a read/write light beam from an illuminating section to strike only one side of an optical storage medium including stacked data storage layers each of which is readable/writeable separately from the other layers, and the apparatus includes a controlling section for controlling the illuminating section so that data is read/written from/into a recordable area of a second data storage layer after a recordable area of a first data storage layer is fully recorded, and the first data storage layer is one of the data storage layers which is located closest to a light-striking surface of the medium, and the second data storage layer is another of the data storage layers which is located next to the first data storage layer, opposite the light-striking surface.

Further, an optical read/write method of the present invention causes a read/write light beam to strike only one side of an optical storage medium including stacked data storage layers each of which is readable/writeable separately from the other layers, and the method includes the step of reading/writing data from/into a second data storage layer after fully recording a recordable area of a first data storage layers which is located closest to a light-striking surface of the medium, and the second data storage layer is another of the data storage layers which is located next to the first data storage layer, opposite the light-striking surface.

According to the arrangement, after fully recording the recordable area of the first data storage layer on the light-striking side, data is read/written from/into the second data storage layer which is located next to the first data storage layer, opposite the light-striking surface.

Therefore, when data is read/written from/into the second data storage layer, substantially all the read/write light striking the second data storage layer after passing through the first data storage layer passes through the recordable area of the first data storage layer that has been recorded. Thus, even when an optical transmittance in the recordable area of the first data storage layer varies depending on whether the recordable area holds any record or not, it is possible to illuminate light having uniform intensity to the substantially entire recordable area of the second data storage layer. As a result, it is possible to realize a desirable reading/writing property without using a complex read/write system.

An optical read/write apparatus of the present invention causes a read/write light beam from illuminating means to strike only one side of the optical storage medium and is arranged so as to include controlling means for controlling the illuminating means so that an extended area is fully recorded prior to recording in an area other than the extended area in a recordable area in a first data storage layer of the optical storage medium.

In addition, an optical read/write method of the present invention is arranged to include the steps of preparing an optical storage medium and fully recording an extended area prior to recording in an area other than the extended area in a recordable area in a first data storage layer of the optical storage medium.

According to the arrangement, since an optical storage medium is used which has an extended area in a recordable area of a first data storage layer, as mentioned earlier, light can be projected at uniform intensity on substantially all recordable areas of the second data storage layer. Therefore, desirable read/write characteristics can be imparted without using a complex read/write system.

In addition, the area other than the extended area in the recordable area of the first data storage layer is as large as a recordable area in a second data storage layer. The position of the illuminating means relative to the optical storage medium can be controlled in the same manner with respect to read/write in the area other than the extended area in the recordable area of the first data storage layer and with respect to read/write in the recordable area of the second data storage layer.

An optical read/write apparatus of the present invention causes a read/write light beam from illuminating means to strike only one side of an optical storage medium and is arranged so as to include: identification information storing means for storing identification information which is unique to the optical read/write apparatus and by which the optical read/write apparatus is distinguished from other optical read/write apparatuses; and controlling means for controlling the illuminating means so that the optical storage medium holds the identification information in an extended area.

In addition, an optical read/write method of the present invention is arranged to include the steps of preparing the optical storage medium and storing in an extended area identification information which is unique to an individual optical read/write apparatus capable of reading/writing on the optical storage medium and by which the optical read/write apparatus is distinguished from other optical read/write apparatuses.

According to the arrangement, an optical storage medium can store in its extended area identification information by which the optical read/write apparatus having read or written the storage medium can be distinguished. Therefore, if in reading/writing an optical storage medium, for example, the optical read/write apparatus first reads the identification information from the extended area, and only when the identification information readout matches the identification information assigned to the apparatus, is allowed to read or read or write the medium, the illegal copying and other uses of the optical storage medium can be prevented.

The optical read/write apparatus may be arranged so that checking means for checking whether the identification information retrieved from the extended area of the optical storage medium matches the identification information of the optical read/write apparatus stored in the identification information storing means, wherein the controlling means controls the illuminating means in reproducing data from the optical storage medium so as to read identification information stored in the extended area of the optical storage medium, and only when the checking means determines that the two sets of identification information match, allows data to be read from the recordable area other than the extended area of any data storage layer.

The optical read/write method may be arranged so as to include the steps of, in reproducing data from the optical storage medium, reading the identification information from the extended area of the optical storage medium, checking whether the identification information retrieved from the extended area matches the identification information of the optical read/write apparatus, and only when the two sets of identification information match each other as a result of the checking, starts data to be read from the recordable area other than the extended area of any data storage layer.

According to the arrangement, in reading data from the optical storage medium, the optical read/write apparatus first reads the identification information from the extended area of the optical storage medium and only when the identification information readout and the identification information assigned to the apparatus, allows data to be read from the optical storage medium. The illegal copying and other uses of the optical storage medium can be surely prevented.

An optical read/write apparatus of the present invention causes a read/write light beam from illuminating means to strike only one side of an optical storage medium and is arranged so as to include: encryption information storing means for storing encryption information by which data is encrypted before being recorded on the optical storage medium; and controlling means for controlling the illuminating means so that the optical storage medium holds the encryption information in the extended area.

An optical read/write method of the present invention is arranged to include the steps of: preparing the optical storage medium; preparing encryption information by which data is encrypted before being stored in the optical storage medium; and storing the encryption information in the extended area.

According to the arrangement, the extended area of the optical storage medium can hold encryption information by which data is encrypted before being stored in the optical storage medium. Therefore, if when the optical read/write apparatus records information on the optical storage medium, encryption information is read out from the extended area and information is encrypted based on the encryption information before being stored on the optical storage medium, it is only the optical read/write apparatus which can decrypt the encryption information that can decrypt the information read out from the optical storage medium. Therefore, the illegal copying and other uses of the optical storage medium can be prevented.

The optical read/write apparatus may be arranged so as to further include encrypting means for encrypting data recorded on the optical storage medium in reference to encryption information in the extended area, wherein the controlling means controls the illuminating means so that recording information encrypted by the encrypting means is stored in the data storage layer.

The optical read/write method may be arranged so as to further include the steps of encrypting data to be recorded on the optical storage medium in reference to the encryption information in the extended area and recording the encrypted recording information in the data storage layer.

According to the arrangement, based on the encryption information stored in the extended area of the optical storage medium, information to be recorded on the optical storage medium is encrypted before being recorded on the optical storage medium.

The optical read/write apparatus may be further arranged so that the controlling means allows reproduction of only the recording information which is encrypted based on the same encryption information as the encryption information stored in the encryption information storing means.

The optical read/write method may be further arranged so that only the recording information encrypted based on the same encryption information as the encryption information prepared in advance.

According to the arrangement, only the information can be reproduced which is encrypted using the same encryption information as the encryption information assigned to the optical read/write apparatus. Thus, the illegal copying and other uses of the optical storage medium can be prevented if optical read/write apparatuses other than the optical read/write apparatus provided with the encryption information are used.

An optical read/write apparatus of the present invention causes a read/write light beam from illuminating means to strike only one side of the optical storage medium and is arranged so as to include controlling means for controlling the illuminating means so as to test write data in the extended area.

An optical read/write method of the present invention is arranged to include the steps of preparing the optical storage medium, and test writing data in the extended area.

According to the arrangement, the extended area can be utilized as a test write area to determine the most suitable light beam intensity in, for example, writing on the optical storage medium. This eliminates the need to provide a separate test write area in the recordable area other than the extended area of the optical storage medium and allows for more efficient use of the recordable area of the optical storage medium.

The optical storage medium may be arranged so that the extended area constitutes a fully prerecorded pseudo-recording area.

According to the arrangement, the pseudo-recording area provides the functions of the extended area. Further, the recordable area other than the pseudo-recording area of the first data storage layer is as large as the recordable area of the second data storage layer, and the position of the illuminating means relative to the optical storage medium can be controlled in the same manner with respect to read/write in the recordable area of the first data storage layer and with respect to read/write in the recordable area of the second data storage layer.

The optical storage medium may be arranged so that the pseudo-recording area stores identification information which is unique to an individual optical storage medium and by which the optical storage medium is distinguished from other optical storage media.

According to the arrangement, in reading or writing data on the optical storage medium using an optical read/write apparatus, the optical storage medium is readable/writeable only with the optical read/write apparatus which matches the identification information. Thus, the illegal copying and other uses of the optical storage medium can be prevented.

The optical storage medium may be arranged so that the pseudo-recording area stores encryption information to encrypt information to be stored on the optical storage medium.

According to the arrangement, when the optical read/write apparatus records information on the optical storage medium, the optical read/write apparatus first reads the encryption information from the pseudo-recording area, encrypts the information based on the encryption information before the information is stored on the optical storage medium; thus, it is only the optical read/write apparatus that can decrypt the encryption information that can decrypt the information read out from the optical storage medium. Therefore, the illegal copying and other uses of the optical storage medium can be prevented.

An optical read/write apparatus of the present invention causes a read/write light beam from illuminating means to strike only one side of the optical storage medium, and is arranged so as to include: encrypting means for encrypt data recorded on the optical storage medium in reference to the encryption information in the pseudo-recording area; and controlling means for controlling the illuminating means so that the recording information encrypted by the encrypting means is recorded in the data storage layer.

An optical read/write method of the present invention is arranged to include the steps of preparing the optical storage medium; encrypting data recorded on the optical storage medium in reference to the encryption information in the pseudo-recording area; and recording the encrypted recording information in the data storage layer.

According to the arrangement, information can be encrypted based on the encryption information recorded in the pseudo-recording area of the optical storage medium before being recorded on the optical storage medium.

The optical storage medium may be arranged so that the pseudo-recording area is not rewriteable.

According to the arrangement, the identification information and the encryption information stored in the optical storage medium Opseudo-recording area can be protected. The illegal copying and other uses of the optical storage medium is better prevented.

In addition, as described earlier, in the present invention, in an arrangement whereby: a lumped address scheme is used, multiple data storage layers are readable/writeable using a light incident to only one side; and the optical transmittance varies due to the recording using incident light, attempts are made to achieve desirable read/write characteristics.

To this end, for example, the optical disk 101 includes stacked data storage layers each of which is readable/writeable separately from the other data storage layers and each data storage layer has an address area 104 in which address pits 112 are collectively formed. The second data storage layer of the optical disk 101 is readable/writeable using light transmitted through the first data storage layer. The address area 104 of the first data storage layer has a continuous storage area 114 where the transmittance has varied and a non-recorded area where the transmittance has not varied. Thus, the quantity of light transmitted through the address area 104 is made closer to the quantity of light transmitted through the non-address area 105.

An optical storage medium of the present invention includes stacked multiple data storage layer each of which is readable/writeable separately from the other data storage layers by means of only a light beam striking one side of the optical storage medium, each of the data storage layers having address tracks and at least one address area where there are collectively formed address information portions representing address information, the optical storage medium exhibiting an optical transmittance which varies when data is written by means of the incident light, and is arranged so that one of every adjacent two of the address tracks in the address area of a first data storage layer is continuously recorded by means of the incident light, and the other is unrecorded, the first data storage layer being one of the data storage layers which is located closest to a light-striking surface of the optical storage medium, a second data storage layer being another of the data storage layers which is located next to the first data storage layer, opposite the light-striking surface.

In addition, an optical read/write apparatus of the present invention causes a read/write light beam from illuminating means to strike only one side of an optical storage medium including multiple stacked data storage layers each of which is readable/writeable separately from the other data storage layers by means of only a light beam striking one side of the optical storage medium, each of the data storage layers having multiple address tracks and at least one address area where there are collectively formed address information portions representing address information, the optical storage medium exhibiting an optical transmittance which varies when data is written by means of the light beam, and is arranged so that the optical read/write apparatus includes controlling means for controlling the illuminating means so that one of every adjacent two of the address tracks in the address area of a first data storage layer is continuously recorded by means of the incident light, and the other one is unrecorded, the first data storage layer being one of the data storage layers which is located closest to a light-striking surface of the medium, a second data storage layer being another of the data storage layers which is located next to the first data storage layer, opposite the light-striking surface.

In addition, an optical read/write method of the present invention includes the step of causing a read/write light beam to strike only one side of an optical storage medium including multiple stacked data storage layers each of which is readable/writeable separately from the other data storage layers by means of only a light beam striking one side of the optical storage medium, each of the data storage layers having multiple address tracks and at least one address area where there are collectively formed address information portions representing address information, the optical storage medium exhibiting an optical transmittance which varies when data is written by means of the light beam, and is arranged so as to further include the step of continuously recording one of every adjacent two of the address tracks in the address area of a first data storage layer by means of the incident light, while leaving the other one unrecorded, the first data storage layer being one of the data storage layers which is located closest to a light-striking surface of the medium, a second data storage layer being another of the data storage layers which is located next to the first data storage layer, opposite the light-striking surface.

According to the arrangement, one of every adjacent two of the address tracks in the address area of the first data storage layer located close to the light-striking surface of the optical storage medium is continuously recorded by means of the incident light, and the other is unrecorded. Therefore, in reading/writing in the second data storage layer, in a case where the light projected to focus on the second data storage layer forms a light spot on the first data storage layer, the recorded area encompassed in the light spot of a non-address area in the recordable area of the first data storage layer, for example, the sum of the areas of the recording marks, is substantially equal to the sum of the continuously recorded areas encompassed in the light spot in the address area of the first data storage layer.

Thus, the intensity of light projected on the second data storage layer after passing through the address area of the first data storage layer of the optical storage medium can be made substantially equal to the intensity of light projected on the second data storage layer after passing through the non-address area in the recordable area of the first data storage layer. As a result, read/write operations on the second data storage layer become more stable and desirable.

In addition, if the address area of the first data storage layer of the optical storage medium is continuously recorded using the optical read/write apparatus of the present invention or the optical read/write method in the aforementioned manner, the cost of the optical disk can be reduced by reducing the manufacturing steps of the optical disk.

The optical read/write apparatus may be arranged so that the controlling means, after reproducing the address information, controls the illuminating means based on the obtained address information so that one of every adjacent two of the address tracks is continuously recorded and the other one is unrecorded.

The optical read/write method may be arranged so that after reproducing the address information, one of every adjacent two of the address tracks is continuously recorded and the other one is unrecorded, based on the obtained address information.

According to the arrangement, one of every adjacent two of the address tracks is continuously recorded and the other one is unrecorded, based on the address information derived from the address area. Therefore, the optical storage medium does not require a particular arrangement to determine whether the address track is to be continuously recorded or unrecorded.

An optical storage medium of the present invention includes multiple stacked data storage layers each of which is readable/writeable separately from the other data storage layers by means of only a light beam striking one side of the optical storage medium, each of the data storage layers having address tracks and at least one address area where there are collectively formed address information portions representing address information, the optical storage medium exhibiting an optical transmittance which varies when data is written by means of the light beam, and is arranged so that each of the address tracks in the address area of a first data storage layer has a judgement mark to show whether the address track is to be continuously recorded or left unrecorded, the first data storage layer being one of the data storage layers which is located closest to a light-striking surface of the medium, a second data storage layer being another of the data storage layers which is located next to the first data storage layer, opposite the light-striking surface.

In addition, an optical read/write apparatus of the present invention causes a read/write light beam from illuminating means to strike only one side of the optical storage medium, and is arranged so as to include controlling means for determining based on information reproduced from the judgement mark whether each of the address tracks in the address area is to be continuously recorded or left unrecorded and controlling the illuminating means according to a result of the determination so that each of the address tracks is to be either continuously recorded or left unrecorded.

In addition, an optical read/write method of the present invention includes the step of causing a read/write light beam to strike only one side of the optical storage medium, and is arranged so as to further include the steps of determining based on information reproduced from the judgement mark whether each of the address tracks in the address area is to be continuously recorded or left unrecorded and controlling according to a result of the determination so that each of the address tracks is to be continuously recorded by means of the incident light or left unrecorded.

According to the arrangement, each of the address tracks in the address area of the first data storage layer located on the light-striking side of the optical storage medium has a judgement mark showing whether the address track should be continuously recorded or left unrecorded. The optical read/write apparatus in which the optical storage medium is loaded can readily form based on the judgement mark a continuously recorded area in an address area of the first data storage layer of the optical storage medium.

In addition, the optical read/write apparatus can immediately determine based on the judgement mark whether to continuously record the address track and therefore quickly complete the process to continuously record the address track in the address area.

In addition, the judgement mark is specified to change into the following state, provided that an area in a non-address area is continuously recorded based on an instruction from the judgement mark. That is, the judgement mark is specified so that in reading/writing in the second data storage layer, in a case where the light projected to focus on the second data storage layer forms a light spot on the first data storage layer, the recorded area encompassed in the light spot of a non-address area in the recordable area of the first data storage layer, for example, the sum of the areas of the recording marks, is substantially equal to the sum of the continuously recorded areas encompassed in the light spot in the address area of the first data storage layer. To this end, the judgement mark shows that, for example, one of every adjacent two of the address tracks in, for example, the first data storage layer is continuously recorded and the other one is left unrecorded. As a result, using the optical storage medium of the present invention, read/write operations on the second data storage layer become more stable and desirable.

In addition, according to the optical read/write apparatus of the present invention or the optical read/write method, the process of continuously recording the address area of the first data storage layer of the optical storage medium can be implemented after the shipment of the optical storage medium in the aforementioned manner, and the cost of the optical storage medium can be reduced by reducing the manufacturing steps of the optical storage medium.

An optical storage medium of the present invention includes multiple stacked data storage layers each of which is readable/writeable on both a land and a groove formed on the data storage layer separately from the other data storage layers by means of only a light beam striking one side of the optical storage medium, each of the data storage layers having multiple address tracks and at least one address area where there are collectively formed address information portions representing address information, the optical storage medium exhibiting an optical transmittance which varies when data is written by means of the light beam, and is arranged so that: among the address tracks in the address area of a first data storage layer, either those address tracks which extend from the land or those address tracks which extend from the groove are continuously recorded by means of the incident light, and the others are unrecorded, the first data storage layer being one of the data storage layers which is located closest to a light-striking surface of the medium, a second data storage layer being another of the data storage layers which is located next to the first data storage layer, opposite the light-striking surface.

In addition, an optical read/write apparatus of the present invention causing a read/write light beam from illuminating means to strike only one side of an optical storage medium including multiple stacked data storage layers each of which is readable/writeable on both a land and a groove formed on the data storage layer separately from the other data storage layer by means of a light beam striking one side of the optical storage medium, each of the data storage layers having multiple address tracks and at least one address area where there are collectively formed address information portions representing address information, the optical storage medium exhibiting an optical transmittance which varies when data is written by means of the light beam, and is arranged to include controlling means for controlling the illuminating means so that in the address area of a first data storage layer, either those address tracks which extend from the land or those which extend from the groove are continuously recorded by means of the incident light, and the others are unrecorded, the first data storage layer being one of the data storage layers which is located closest to a light-striking surface of the medium, a second data storage layer being another of the data storage layers which is located next to the first data storage layer, opposite the light-striking surface.

In addition, an optical read/write method of the present invention includes the step of causing a read/write light beam to strike only one side of an optical storage medium including multiple stacked data storage layers each of which is readable/writeable on both a land and a groove formed on the data storage layer separately from the other data storage layers by means of only a light beam striking one side of the optical storage medium, each of the data storage layers having multiple address tracks and at least one address area where there are collectively formed address information portions representing address information, the optical storage medium exhibiting an optical transmittance which varies when data is written by means of the light beam, and is arranged so that in the address area of a first data storage layer, either those address tracks which extend from the land or those which extend from the groove are continuously recorded by means of the incident light, and there others are unrecorded, the first data storage layer being one of the data storage layers which is located closest to a light-striking surface of the medium, a second data storage layer being another of the data storage layers which is located next to the first data storage layer, opposite the light-striking surface.

According to the arrangement, in the address area of the first data storage layer on the light-striking side, either those address tracks which extend from the land or those which extend from the groove are continuously recorded when data is written by means of incident light, and the others are left unrecorded. Therefore, in reading/writing on the second data storage layer, in a case where the light projected to focus on the second data storage layer forms a light spot on the first data storage layer, the recorded area encompassed in the light spot of a non-address area in the recordable area of the first data storage layer, for example, the sum of the areas of the recording marks, is substantially equal to the sum of the continuously recorded areas encompassed in the light spot in the address area of the first data storage layer.

Thus, the intensity of light transmitted through the address area of the first data storage layer before reaching the second data storage layer can be made substantially equal to the intensity of light transmitted through the non-address area in the recordable area of the first data storage layer before reaching the second data storage layer. As a result, read/write operations on the second data storage layer become more stable and desirable.

An optical storage medium of the present invention includes multiple stacked data storage layers each of which is readable/writeable on both a land and a groove formed on the data storage layer separately from the other data storage layers by means of only a light beam striking one side of the optical storage medium, each of the data storage layers having multiple address tracks and at least one address area where there are collectively formed address information portions representing address information, the optical storage medium exhibiting an optical transmittance when data is written by means of the light beam, and is arranged so that: in a first data storage layer, the address area has a first address area and a second address area which are adjacent to each other along tracks, the first data storage layer being one of the data storage layers which is located closest to a light-striking surface of the medium, a second data storage layer being another of the data storage layers which is located next to the first data storage layer, opposite the light-striking surface; the address information portions in either the first and second address areas are formed in those address tracks which extend from the land, and the address information portions in the other one of the first and second address areas are formed in those address tracks which extend from the groove; and either an area where the address information portions are formed or an area where no address information portions are formed is continuously recorded.

In addition, an optical read/write apparatus of the present invention causes a read/write light beam from illuminating means to strike only one side of an optical storage medium including multiple stacked data storage layers each of which is readable/writeable on both a land and a groove formed on the data storage layer separately from the other data storage layers by means of only a light beam striking one side of the optical storage medium, each of the data storage layers having multiple address tracks and at least one address area where there are collectively formed address information portions representing address information, the optical storage medium exhibiting an optical transmittance which varies when data is written by means of the light beam, and is arranged so as to include controlling means for controlling the illuminating means so that: in a first data storage layer, the address area has a first address area and a second address area which are adjacent to each other along tracks, the first data storage layer being one of the data storage layers which is located closest to a light-striking surface of the medium, a second data storage layer being another of the data storage layers which is located next to the first data storage layer, opposite the light-striking surface; and when the address information portions in either one of the first and second address areas are formed in those address tracks which extend from the land, and the address information portions in the other one of the first and second address areas are formed in those address tracks which extend from the groove, either an area where the address information portions are formed or an area where no address information portions are formed is continuously recorded in the first and second address areas.

In addition, an optical read/write method of the present invention comprises the step of causing a read/write light beam to strike only one side of an optical storage medium including multiple stacked data storage layers each of which is readable/writeable on both a land and a groove formed on the data storage layer by means of only a light beam striking one side of the optical storage medium, each of data storage layers having multiple address tracks and at least one address area where there are collectively formed address information portions representing address information, the optical storage medium exhibiting an optical transmittance which varies when data is written by means of the light beam, and is arranged so that: in a first data storage layer, the address area has a first address area and a second address area which are adjacent to each other along tracks, the first data storage layer being one of the data storage layers which is located closest to a light-striking surface of the medium, a second data storage layer being another of the data storage layers which is located next to the first data storage layer, opposite the light-striking surface; and the method further comprises the steps of, when the address information portions in either one of the first and second address areas are formed in those address tracks which extend from the land, and the address information portions in the other one of the first and second address areas are formed in those address tracks which extend from the groove, continuously recording either an area where the address information portions are formed or an area where no address information portions are formed in the first and second address areas by means of the incident light.

According to the arrangement, the address area of the first data storage layer located on the light-striking side of the optical storage medium is made of a first address area and a second address area which are adjacent to each other along tracks; the address information portions in either one of the first and second address areas are formed in those address tracks which extend from the land, and the address information portions in the other one of the first and second address areas are formed in those address tracks which extend from the groove; and either an area where the address information portions are formed or an area where no address information portions are formed is continuously recorded. Therefore, in reading/writing on the second data storage layer, in a case where the light projected to focus on the second data storage layer forms a light spot on the first data storage layer, the recorded area encompassed in the light spot of a non-address area in the recordable area of the first data storage layer, for example, the sum of the areas of the recording marks, is substantially equal to the sum of the continuously recorded areas encompassed in the light spot in the address area of the first data storage layer.

Thus, the intensity of light transmitted through the address area of the first data storage layer before reaching the second data storage layer can be made substantially equal to the intensity of light transmitted through the non-address area in the recordable area of the first data storage layer before reaching the second data storage layer. As a result, read/write operations on the second data storage layer become more stable and desirable.

In addition, if the address area of the first data storage layer of the optical storage medium is continuously recorded using the optical read/write apparatus of the present invention or the optical read/write method in the aforementioned manner, the cost of the optical storage medium can be reduced by reducing the manufacturing steps of the optical storage medium.

In addition, the present invention enables stable read/write of information on an optical disk with two or more storage layers without being affected by prepit areas.

To this end, the optical disk 201 includes a first storage layer 215 and a second storage layer 213, an outer prepit area 206b as a prepit area is provided outside the outer periphery the recordable area 203b of the second storage layer 213. Predetermined information is stored in the outer prepit area 206b in advance using pits. Prepit information is reproduced by transmitting a light beam 217 through a recordable area 203b of the first storage layer 215 where the optical transmittance is high due to recording to the full capacity and then focusing on the outer prepit area 206b. The provision of the outer prepit area 206b on the second storage layer 213 enables data to be read from and write into the second storage layer 213 without being affected by prepit areas.

An optical storage medium of the present invention is preferably such that each of the data storage layers except for the last data storage layer has a pseudo-recording area at such a position that allows light to be transmitted to the prepit area, the pseudo-recording area, when fully prerecorded, exhibiting a higher optical transmittance than other areas.

In this manner, a pseudo-recording area, when fully prerecorded, exhibiting a higher optical transmittance than other areas is provided at such a position that allows light to be transmitted to the prepit area, the pseudo-recording area; therefore, the light striking the light-striking side storage layer can reach the prepit area after passing through the pseudo-recording area of any data storage layer, but the last data storage layer. Therefore, the intensity of the reproduction signal of the prepit information reproduced from prepit area does not fall. Therefore, the amplitude of the reproduction signal of the prepit information can be made greater.

Another optical read/write apparatus of the present invention causes a read/write light beam from illuminating means to strike only one side of the optical storage medium, and is arranged so as to include: low frequency variation removing means for removing low frequency variations from the reproduction signal obtained from the prepit area; and digital converting means for converting the reproduction signal from which the low frequency variations are removed to a digital signal using the constant voltage as a reference.

In addition, an optical read/write method of the present invention includes the step of causing a read/write light beam from illuminating means to strike only one side of the optical storage medium, and is arranged so as to further include the steps of removing low frequency variations from the reproduction signal obtained from the prepit area; and converting the reproduction signal from which the low frequency variations are removed to a digital signal using a constant voltage as a reference.

According to the apparatus and method, the reproduction signal obtained from reading off the prepit area is rid of low frequency variations by low frequency variation removing means. The reproduction signal, from which low frequency variations are removed, has an envelope whose mean level is substantially constant. Thereafter, the reproduction signal is converted to a digital signal by digital converting means using the constant voltage as a reference. In this manner, the envelope comes to have a substantially constant mean level, in converting a reproduction signal to a digital signal, the constant voltage can be used as a reference. Therefore, the digital conversion can be carried out without being affected by variations in amplitude of the reproduction signal. For example, as mentioned in the foregoing, incident light illuminating a recorded part and a non-recorded part of the first storage layer is focused on the second storage layer, a digital signal can be produced stably from the reproduction signal even if the intensity of the reproduction signal of the prepit information varies with the rotation of the optical storage medium. Therefore, the prepit information of the second storage layer of the optical storage medium can be stably reproduced.

An optical read/write apparatus of the present invention causes a read/write light beam from illuminating means to strike only one side of the storage medium having the pseudo-recording area, and is arranged so as to include: recording status checking means for checking whether the pseudo-recording area is fully recorded or not based on a reproduction signal obtained from the pseudo-recording area; and pseudo-recording means for fully recording data in the pseudo-recording area if the pseudo-recording area is not fully recorded.

In addition, an optical read/write method of the present invention includes the step of causing a read/write light beam from illuminating means to strike only one side of the storage medium with the pseudo-recording area, and is arranged so as to further include the steps of fully recording the pseudo-recording area so that the pseudo-recording area transmits light therethrough to the prepit area.

According to the apparatus and method, the recording status checking means checks whether or not the pseudo-recording area is fully recorded. If the check turns out that the pseudo-recording area is not fully recorded, the pseudo-recording means fully recorded the pseudo-recording area. Thus, the pseudo-recording area of the optical storage medium is formed by the optical read/write apparatus, and there is no need to form a pseudo-recording area on the optical storage medium in advance before shipment. Therefore, the cost of the optical storage medium can be reduced.

Another optical storage medium of the present invention includes: one light-striking side storage layer provided as a data storage layer on a light-striking side; and one or more opposite-side storage layers provided as data storage layers opposite the light-striking side from the light-striking side storage layer, and is arranged so that: the light-striking side storage layer has a prepit area which includes preformed pits representative of data: and an optically transparent recordable area of the light-striking side storage layer is formed wider than the optically transparent recordable areas of the opposite-side storage layers.

With the arrangement, the recordable areas of the opposite-side storage layers are smaller than the recordable area on the light-striking side. Therefore, in a case where the prepit area is provided adjacent to the recordable area on the light-striking side storage layer, light transmitted through the prepit area does not enter the recordable areas of the opposite-side storage layers. In addition, since light transmitted near the border between the recordable area of the light-striking side storage layer and the prepit area is focused on the recordable areas of the opposite-side storage layers, even if the recordable areas of the opposite-side storage layers are small as mentioned in the foregoing, the light can be transmitted only through the recordable area of the light-striking side storage layer and focused on the recordable areas of the opposite-side storage layers. Therefore, data can be stably read from and written into the last data storage layer without being affected by the prepit area.

Another optical storage medium of the present invention includes: one light-striking side storage layer provided as a data storage layer on a light-striking side; and one or more opposite-side storage layers provided as data storage layers opposite the light-striking side from the light-striking side storage layer, and is arranged so that: the light-striking side storage layer has a prepit area which includes preformed pits representative of data; and the prepit area allows transmission of light so that light reaches the opposite-side storage layers, at a transmittance substantially equal to that of a recordable area of the light-striking side storage layer.

With the arrangement, since the prepit area allows light to be transmitted at a transmittance substantially equal that as the transmittance of the recordable area of the light-striking side storage layer, the light passing through the recordable area and through the prepit area has substantially the same intensity. Therefore, data can be read from and written to the last data storage layer stably without being affected by the prepit area.

The storage medium in which the prepit area is provided in the light-striking side storage layer is preferably such that the recordable areas of the data storage layers except for the last data storage layer which is most distanced from the light-striking side storage layer exhibit, when fully recorded, higher optical transmittances than other areas.

With the arrangement, in projecting read/write light to the recordable areas of the data storage layers except for the last data storage layer, the recordable areas come to have higher optical transmittances than other areas upon completion of recording. Therefore, keeping the recordable area fully recorded enables the light passing through the recordable areas to remain sufficiently intense until it reaches a target data storage layer. Therefore, data can be stably read and written on an optical storage medium with multiple storage layers.

An optical read/write apparatus causing a read/write light beam from illuminating means to strike only one side of the optical storage medium includes controlling means for controlling the illuminating means so that the recordable area of the light-striking side storage layer is fully recorded before the recordable areas of the opposite-side storage layers which are adjacent to the light-striking side storage layer is read/written.

In addition, an optical read/write method including the step of causing a read/write light beam from illuminating means to strike only one side of the optical storage medium includes the steps of fully recording the recordable area of the light-striking side storage layer and subsequently reading or writing in the recordable areas of the opposite-side storage layers which are adjacent to the light-striking side storage layer.

In reading or writing on the optical storage medium using such an apparatus or method, the controlling means controls the illuminating means so that the recordable area of the light-striking side storage layer fully recorded before the recordable area of a target opposite-side storage layer is read or written. Therefore, in reading or writing the opposite-side storage layers, the light passing through the light-striking side storage layer remains sufficiently intense until it reaches the opposite-side storage layers. Therefore, data can be stably read and written on the optical storage medium.

An optical storage medium having the transparent prepit area is preferably such that the prepit area, under such illumination to fully record the prepit area substantially identically to the recordable area, exhibits a high optical transmittance substantially equal to that of the recordable area.

With such an arrangement, the prepit area, when fully recorded under illumination, comes to exhibit a similar optical transmittance to that of the recordable area. Therefore, the light passing through the recordable area and through the prepit area has substantially the same intensity. Therefore, data can be read from and written to the last data storage layer stably.

With this optical storage medium, preferably, on a pit row of the pits in the prepit area, there is formed a continuous, fully recorded storage area with neither the pits nor intervening portions between the pits left unrecorded, so that a fully recorded portion occupies a substantially equal area in a part where light is concentrated in the recordable area and in a part where light is concentrated in the prepit area.

With the arrangement, light forms a beam spot in both the recordable area and the prepit area as it strikes the recordable area and the prepit area of the light-striking side storage layer. The continuous storage area is formed on the pit row so that the area of the recorded portion in a part where light is concentrated in the beam spot is substantially equal between the recordable area and the prepit area. Therefore, light transmitted through the recordable area and the prepit area has similar intensity. Therefore, data can be stably read from or written into the last data storage layer.

An optical read/write apparatus causing a read/write light beam from illuminating means to strike only one side of the optical storage medium of which the prepit area exhibits a high optical transmittance under illumination includes: continuous storage area checking means for checking based on a signal reproduced from the prepit area whether or not the prepit area has a continuous storage area where areas interposed between the pits are continuously and fully recorded as to a pit row of the pits; and continuous recording means for performing such recording that on the pit row in the prepit area where the continuous storage area is not present, there is formed the continuous storage area so that a fully recorded portion occupies a substantially equal area in a part where light is concentrated in the recordable area and in a part where light is concentrated in the prepit area.

In addition, an optical read/write method including the step of causing a read/write light beam from illuminating means to strike only one side of the optical storage medium further includes the step of performing such recording that on the pit row in the prepit area where the continuous storage area is not present, there is formed the continuous storage area where areas interposed between the pits are continuously and fully recorded as to a pit row of the pits so that a fully recorded portion occupies a substantially equal area in a part where light is concentrated in the recordable area and in a part where light is concentrated in the prepit area.

With the apparatus and method, the continuous storage area checking means checks whether there is a continuous storage area. If the check turns out that there is a continuous storage area, the continuous recording means performs recording to form a continuous storage area. Thus, the formation of a continuous storage area on the optical storage medium using the optical read/write apparatus eliminates the need to form a continuous storage area on the optical storage medium in advance before shipment. Therefore, the cost of the optical storage medium can be reduced.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical storage medium, formed in a disk shape, comprising stacked data storage layers each of which is readable/writeable separately from the other layers by means of a light beam striking one side of the optical storage medium, wherein
   a recordable area of a first data storage layer including at least one recordable extended area portion is provided above a second data storage layer in a direction in which the first and second data storage layers are stacked, and said at least one recordable extended area portion extends in a radial direction of said optical storage medium past an entire recordable area of the second data storage layer, wherein a length of said at least one recordable extended area portion in the radial direction of said optical storage medium is equal to or longer than a thickness of an intermediate layer, which is provided between the first data storage layer and the second data storage layer, plus an amount equivalent to an eccentricity between the first data storage layer and the second data storage layer, and, further, wherein
   said second data storage layer is located furthest from said light-striking surface of said optical storage medium, and the first data storage layer is located next to the second data storage layer, closer to said light striking surface, wherein
   at least one of said at least one extended area portion is assigned as a test write area.

2. An optical read/write method comprising the steps of:
   providing a read/write apparatus comprising:
      illumination means for supplying a read/write light beam;
      optimal storage medium mounting means for supporting an optical storage medium
         such that said read/write light beam from said illuminating means strikes only a light-striking side of said optical storage medium,
      said optical storage medium, formed in a disk shape, including stacked data storage layers each of which is readable/writeable separately from the other layers by means of a light beam striking said light-striking side of said optical storage medium, wherein
   said optical storage medium is structured and configured such that a recordable area of the first data storage layer including at least one recordable extended area portion is provided above a second data storage layer in a direction in which the first and second data storage layers are stacked, and said at least one recordableable extended area portion extends in a radial direction of said optical storage medium past an entire recordable area of the second data storage layer, wherein a length of said at least one recordable extended area portion in the radial direction of said optical storage medium is equal to or longer than an thickness of an intermediate layer, which is provided between the first data storage layer and the second data storage layer, plus an amount equivalent to an eccentricity between the first data storage layer and the second data storage layer, and, further, wherein
   said second data storage layer is located furthest from said light-striking surface of said optical storage medium, and the first data storage layer is located next to the second data storage layer, closer to said light-striking surface; and
   reading and/or writing data from/to at least one of the stacked data storage layers.

3. An optical read method comprising the steps of:
   providing a reading apparatus comprising:
      illumination means for supplying a read light beam;
      optical storage medium mounting means for supporting an optical storage medium such that said read light beam from said illuminating means strikes only a light-striking side of said optical storage medium,
      said optical storage medium, formed in a disk shape, including stacked data storage layers each of which is readable/writeable separately from the other layers by means of a light beam striking said light-striking side of said optical storage medium, wherein:
   said optical storage medium is structured and configured such that a recordable area of a first data storage layer including at least one extended area portion is provided above a second data storage layer in a direction in which the first and second data storage layers are stacked, and said at least one recordable extended area portion extends in a radial direction of said optical storage medium past an entire recordable area of the second data storage layer, wherein a length of said at least one recordable extended areas portion in the radial direction of the optical storage medium is equal to or longer than a thickness of an intermediate layer, which is provided between the first data storage layer and the second data storage layer, plus an amount equivalent to an eccentricity between the first data storage layer and the second data storage layer, and, further, wherein
   the second data storage layer is located furthest from said light-striking surface of said optical storage medium, and the first data storage layer is located next to the second data storage layer, closer to said light-striking surface; and
   reading data from at least one of the stacked data storage layers.

* * * * *